United States Patent
Zhou et al.

(10) Patent No.: US 10,939,382 B2
(45) Date of Patent: Mar. 2, 2021

(54) POWER CONTROL FOR WIRELESS COMMUNICATIONS ASSOCIATED WITH PREEMPTED RESOURCES

(71) Applicant: Comcast Cable Communications, LLC, Philadelphia, PA (US)

(72) Inventors: Hua Zhou, Herndon, VA (US); Esmael Hejazi Dinan, McLean, VA (US); Ali Cirik, Herndon, VA (US); Alireza Babaei, Fairfax, VA (US); Hyoungsuk Jeon, Centreville, VA (US); Kyungmin Park, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/370,433

(22) Filed: Mar. 29, 2019

(65) Prior Publication Data

US 2019/0306801 A1    Oct. 3, 2019

Related U.S. Application Data

(60) Provisional application No. 62/650,874, filed on Mar. 30, 2018.

(51) Int. Cl.
*H04W 52/04* (2009.01)
*H04W 52/44* (2009.01)
(Continued)

(52) U.S. Cl.
CPC ........... *H04W 52/04* (2013.01); *H04W 52/44* (2013.01); *H04W 52/146* (2013.01); *H04W 52/281* (2013.01); *H04W 84/042* (2013.01)

(58) Field of Classification Search
CPC . H04W 52/04; H04W 52/146; H04W 52/281; H04W 52/44; H04W 84/042
(Continued)

(56) References Cited

U.S. PATENT DOCUMENTS

2013/0010720 A1*  1/2013  Lohr ............... H04L 1/0046
                                                       370/329
2013/0152096 A1*  6/2013  Park ............... G06F 9/4887
                                                       718/102
(Continued)

FOREIGN PATENT DOCUMENTS

CA       2576532 A1    11/2006
CA       2576532 C      7/2013
(Continued)

OTHER PUBLICATIONS

Aug. 13, 2019—European Extended Search Report—EP 19166241.0.
(Continued)

*Primary Examiner* — Tan H Trinh
(74) *Attorney, Agent, or Firm* — Banner & Witcoff, Ltd.

(57) ABSTRACT

Systems, apparatuses, and methods are described for wireless communications. A wireless device may have different capabilities for preemption. A base station may use a signaling format to indicate a transmission power command and a preemption indicator. A wireless device may receive the signaling format and may determine, based on the transmission power command and the preemption indicator, whether to stop a transmission or to reduce a transmission power.

21 Claims, 33 Drawing Sheets

(51) Int. Cl.
*H04W 84/04* (2009.01)
*H04W 52/28* (2009.01)
*H04W 52/14* (2009.01)

(58) Field of Classification Search
USPC .... 455/69, 522, 450, 552.1, 115.1; 370/230, 370/329
See application file for complete search history.

(56) References Cited

U.S. PATENT DOCUMENTS

| | | | | |
|---|---|---|---|---|
| 2016/0337984 | A1* | 11/2016 | Takeda | H04W 52/146 |
| 2017/0013565 | A1* | 1/2017 | Pelletier | H04W 52/343 |
| 2017/0290004 | A1* | 10/2017 | Yang | H04W 72/0446 |
| 2018/0027567 | A1* | 1/2018 | Saghir | H04W 4/08 370/230 |
| 2018/0035332 | A1 | 2/2018 | Agiwal et al. | |
| 2018/0035459 | A1* | 2/2018 | Islam | H04W 74/04 |
| 2018/0139770 | A1* | 5/2018 | Ozturk | H04L 5/0078 |
| 2018/0145795 | A1* | 5/2018 | Yi | H04L 1/1819 |
| 2018/0152939 | A1* | 5/2018 | Lee | H04W 72/0413 |
| 2018/0199346 | A1* | 7/2018 | Hou | H04W 4/70 |
| 2019/0074882 | A1* | 3/2019 | Zhou | H04W 16/32 |
| 2019/0074929 | A1* | 3/2019 | Aiba | H04W 76/27 |
| 2019/0246419 | A1* | 8/2019 | Sun | H04L 5/0096 |
| 2019/0306848 | A1* | 10/2019 | Zhou | H04W 72/08 |
| 2019/0320395 | A1* | 10/2019 | Wong | H04W 52/265 |
| 2020/0015119 | A1* | 1/2020 | Takeda | H04L 1/1887 |

FOREIGN PATENT DOCUMENTS

| | | |
|---|---|---|
| EP | 1773077 A1 | 4/2007 |
| EP | 1773077 A4 | 2/2008 |
| EP | 1773077 B1 | 3/2009 |
| EP | 2487937 A1 | 8/2012 |
| EP | 2487937 B1 | 8/2016 |
| EP | 2903364 B1 | 5/2017 |
| WO | 2018019085 A1 | 2/2018 |
| WO | 2018129017 A2 | 7/2018 |
| WO | 2018175420 A1 | 9/2018 |

OTHER PUBLICATIONS

3GPP TSG RAN WG1 Meeting 90bis: "Remaining issues on pre-emption indication for downlink", Oct. 9, 2017.
3GPP TSG RAN WG1 Meeting #92: "UL multiplexing between URLLC and eMBB", Feb. 26, 2018.
3GPP TSG RAN WG1 Meeting #92: "On eMBB and URLLC multiplexing in UL", Feb. 26, 2018.
Jul. 4, 2019—European Extended Search Report—EP 19166158.6.
3GPP TSG RAN WG1 Meeting #90bis: "Remaining details of pre-emption indication", Oct. 9, 2017.
3GPP TSG RAN WG1 Ad Hoc Meeting: "On pre-emption indication for DL multiplexing of URLLC and eMBB", Sep. 18, 2017.
3GPP TSG-RAN WG2 NR Ad hoc 0118: "RNTIs in MAC specification", Jan. 22, 2018.
3GPP TRG WG1 meeting #92; Athens, Greece, Feb. 26-Mar. 2, 2018; Title: RAN1 Chairman's Notes.
R1-1801356 3GPP TSG RAN WG1 Meeting #92; Athens, Greece, Feb. 26-Mar. 2, 2018; Source: Huawei, HiSilicon; Title: UL multiplexing between URLLC and eMBB.
R1-1802424 3GPP TSG RAN WG1 Meeting #92; Athens, Greece, Feb. 26-Mar. 2, 2018; Source: Intel Corporation; Title: Handling UL transmissions with different reliability requirements.
R1-1802627 3GPP TSG WG1 Meeting #92; Athens, Greece, Feb. 26-Mar. 2, 2018; Source: InterDigital Inc.; Title: On eMBB and URLLC multiplexing in UL.
R1-1802120 3GPP TSG RAN WG1 Meeting #92; Athens, Greece, Feb. 26-Mar. 2, 2018; Source: OPPO; Title: Low-Latency transmission for uplink.
R1-1717398 3GPP TSG RAN WG1 Meeting 90bis; Prague, Czech Republic, Oct. 9-13, 2017; Source: Intel Corporation; Title: Multiplexing of different data channel durations.
R1-1717502 3GPP TSG RAN WG1 Meeting 90bis; Prague, Czech Republic, Oct. 9-13, 2017; Source: vivo; Title: Multiplexing data with different transmission durations.
R1-1717722 3GPP TSG RAN WG1 Meeting 90bis; Prague, Czech Republic, Oct. 9-13, 2017; Source: Fujitsu; Title: On eMMB and urll Multiplexing.
R1-1718403 3GPP TSG RAN WG1 Meeting 90bis; Prague, Czech Republic, Oct. 9-13, 2017; Source: AT&T; Title: Scheduling aspects of mini-slots.
R1-1719402 3GPP TSG RAN WG1 Meeting #91; Reno, USA, Nov. 27-Dec. 1, 2017; Source: Huawei, HiSilicon; Title: Remaining aspects on pre-emption indication for DL multiplexing of URLL and eMBB.
R1-1719798 3GPP TSG RAN WG1 Meeting 91; Reno, USA, Nov. 27-Dec. 1, 2017; Source: vivo; Title: Remaining issues on multiplexing data with different transmission.
R1-1720463 3GPP TSG RAN WG1 Meeting #91; Reno, USA, Nov. 27-Dec. 1, 2017; Source: Sony; Title: Remaining issues in Pre-emption Indicator.
R1-1801550 3GPP TSG RAN WG1 Meeting #92; Athens, Greece, Feb. 26-Mar. 2, 2018; Source: vivo; Title: Discussion on handling UL multiplexing of transmissions with different reliability requirements.
R1-1801566 3GPP TSG RAN WG1 Meeting #92; Athens, Greece, Feb. 26-Mar. 2, 2018; Source: Ericsson; Title: On Pre-emption un Uplink.
R1-1801634 3GPP TSG RAN WG1 Meeting #91; Athens, Greece, Feb. 26-Mar. 2, 2018; Source: ZTE, Sanechips; Title: Study of handling UL multiplexing of transmissions with different reliability requirements.
R1-1801674 3GPP TSG RAN WG1 Meeting #92; Athens, Greece, Feb. 26-Mar. 2, 2018; Source: MediaTek Inc.; Title: On UL multiplexing of transmissions with different reliability targets.
R1-1801751 3GPP TSG RAN WG1 Meeting #92; Athens, Greece, Feb. 26-Mar. 2, 2018; Source: CATT; Title: Multiplexing of UL transmissions of different reliability requirements.
R1-1801894 3GPP TSG RAN WG1 Meeting #92; Athens, Greece, Feb. 26-Mar. 2, 2018; Source: Fujitsu; Title: On UL multiplexing of transmissions with different reliability requirements.
R1-1801908 3GPP TSG RAN WG1 Meeting #92; Athens, Greece, Feb. 26-Mar. 2, 2018; Source: CATR; Title: UL multiplexing for eMBB and URLLC.
R1-1802002 3GPP TSG RAN WG1 Meeting #92; Athens, Greece, Feb. 26-Mar. 2, 2018; Source: Samsung; Title: Multiplexing of UL Transmissions with Different Reliability Requirements.
R1-1802017 3GPP TSG RAN WG1 Meeting #92; Athens, Greece, Feb. 26-Mar. 2, 2018; Source: ASUSTeK; Title: Multiplexing of UL eMBB and URLLC in NR.
R1-1802046 3GPP TSG RAN WG1 Meeting #92; Athens, Greece, Feb. 26-Mar. 2, 2018; Source: CMCC; Title: Discussion on collision handling for UL URLLC transmission.
R1-1802063 3GPP TSG RAN WG1 Meeting #92; Athens, Greece, Feb. 26-Mar. 2, 2018; Source: Sony; Title: Considerations on UL pre-emption in NR.
R1-1802093 3GPP TSG RAN WG1 Meeting #92; Athens, Greece, Feb. 26-Mar. 2, 2018; Source: ITRI; Title: Discussion on URLLC Multiplexing.
R1-1802145 3GPP TSG RAN WG1 Meeting #92; Athens, Greece, Feb. 26-Mar. 2, 2018; Source: ETRI Title: UCI multiplexing of different usage scenario.
R1-1802228 3GPP TSG RAN WG1 Meeting #92; Athens, Greece, Feb. 26-Mar. 2, 2018; Source: LG Electronics; Title: Discussion on multiplexing UL transmission with different requirements.
R1-1802243 3GPP TSG RAN WG1 Meeting #92; Athens, Greece, Feb. 26-Mar. 2, 2018; Source: NEC; Title: On UL multiplexing of transmissions with different reliability.
R1-1802245 3GPP TSG RAN WG1 Meeting #92; Athens, Greece, Feb. 26-Mar. 2, 2018; Source: Institute for Information Industry (III) Title: On eMBB and URLLC Uplink Multiplexing.

(56) References Cited

OTHER PUBLICATIONS

R1-1802289 3GPP TSG RAN WG1 Meeting #92; Athens, Greece, Feb. 26-Mar. 2, 2018; Source: Apple Inc. Title: Discussion on handling of UL multiplexing of transmissions with different reliability.
R1-1802496 3GPP TSG RSN WG1 Meeting #92; Athens, Greece, Feb. 26-Mar. 2, 2018; Source: NTT DOCOMO, INC. Title: Handling UL multiplexing of transmissions with different reliability.
R1-1802549 3GPP TSG RAN WG1 Meeting #92; Athens, Greece, Feb. 26-Mar. 2, 2018; Source: Nokia, Nokia Shanghai Bell; Title: On UL multiplexing between eMBB and URLLC.
R1-1802657 3GPP TSG RAN WG1 Meeting #92; Athens, Greece, Feb. 26- Mar. 2, 2018; Source: Mitsubishi Electric; Title: Discussion on UL multiplexing.
R1-1802680 3GPP TSG RAN WG1 Meeting #92; Athens, Greece, Feb. 26-Mar. 2, 2018; Source: Motorola Mobility, Lenovo; Title: Multiplexing of URLLC and eMBB uplink channels.
R1-1802854 3GPP TSG RAN WG1 Meeting #92; Athens, Greece, Feb. 26-Mar. 2, 2018; Source: Qualcomm Incorporated; Title: eMBB and URLLC dynamic multiplexing and preemption indication on the uplink.
R1-1802876 3GPP TSG RANWG1 Meeting #92; Athens, Greece, Feb. 26-Mar. 2, 2018; Source KT Corp., Title: Consideration on UL UE preemptions.
R1-1802885 3GPP TSG RAN WG1 Meeting #92; Athens, Greece, Feb. 26-Mar. 2, 2018; Source: Sequans; Title: Considerations for UL multiplexing with different transmission durations.
R1-1802926 3GPP TSG RAN WG1 Meeting #92; Athens Greece, Feb. 26-Mar. 2, 2018; Source: KDDI; Title: On uplink multiplexing of transmissions with different reliability requirements.
R1-1803357 3GPP TSG RAN WG1 Meeting #92; Athens, Greece, Feb. 26-Mar. 2, 2018; Source: Huawei, HiSilicon; Title: Summary of 7.2.2 Study of necessity of a new DCI format.
R1-1803359 3GPP TSG RAN WG1 Meeting #92; Athens, Greece, Feb. 26-Mar. 2, 2018; Source: vivo; Title: Summary of handling UL multiplexing of transmission with different reliability requirements.
R1-1803361 3GPP TSG RAN WG1 Meeting #92; Athens Greece, Feb. 26-Mar. 2, 2018; Source: Qualcomm; Title: Summary of 7.2.3 Study of necessity of PDCCH repetition.
U.S. Appl. No. 16/370,324, Wireless Communications for Uplink Preemption and Downlink Preemption, filed Mar. 29, 2019.
Jun. 9, 2020—European Office Action—EP 19166241.0.

\* cited by examiner

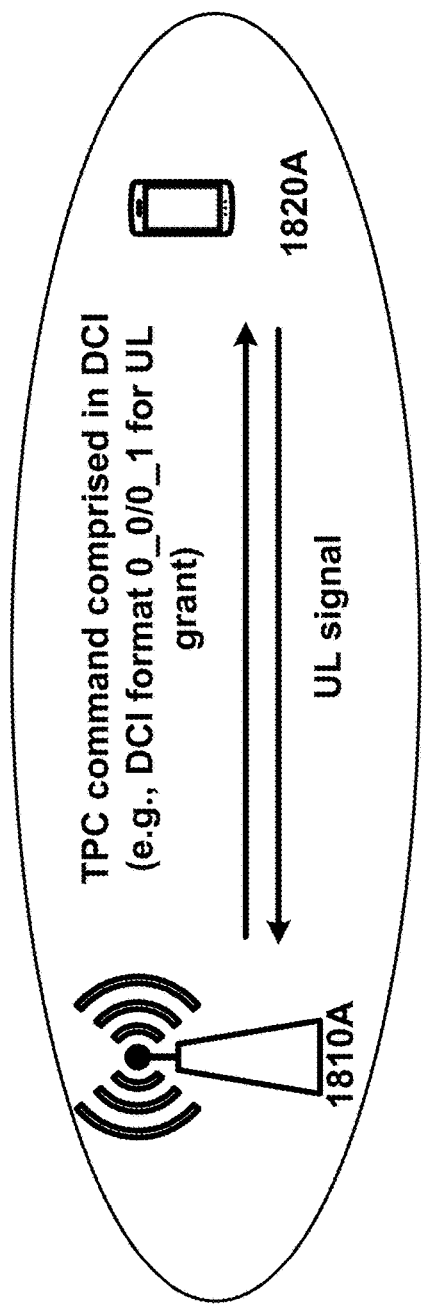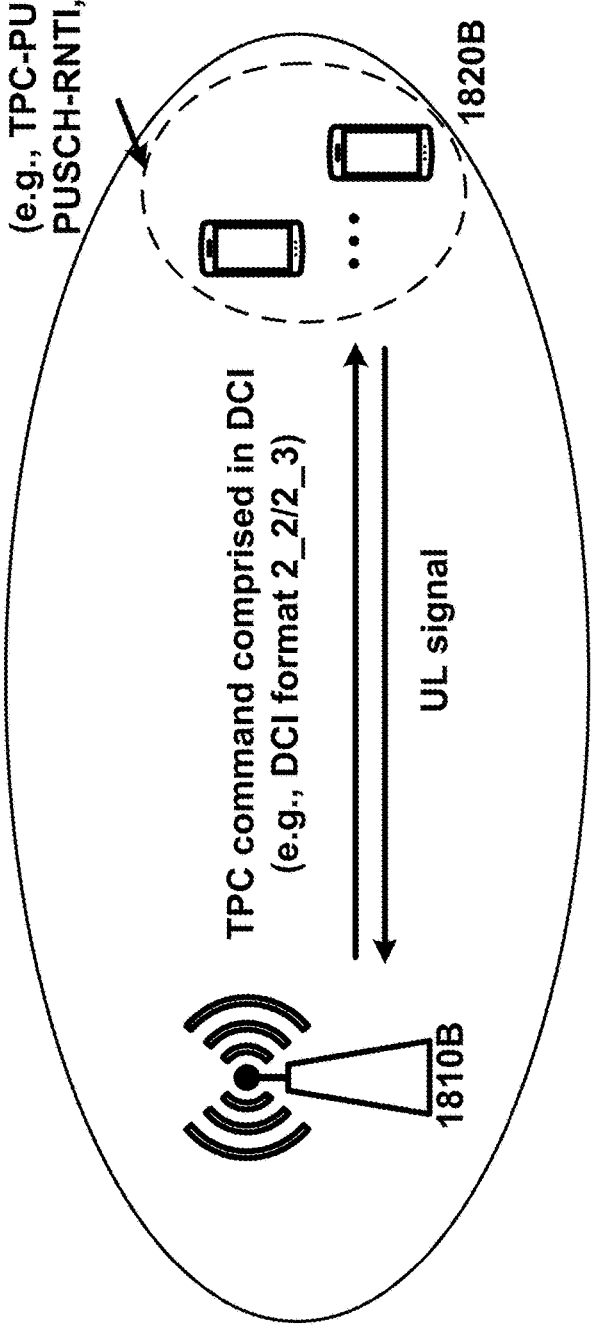
FIG. 18A
FIG. 18B

POWER CONTROL FOR WIRELESS COMMUNICATIONS ASSOCIATED WITH PREEMPTED RESOURCES

CROSS-REFERENCE TO RELATED APPLICATIONS

This application claims the benefit of U.S. Provisional Application No. 62/650,874, titled "Power Control of Multiplexing URLLC and eMBB Transmission in Uplink" and filed on Mar. 30, 2018. The above-referenced application is hereby incorporated by reference in its entirety.

BACKGROUND

A base station may communicate with a wireless device via uplink and downlink channels. Wireless communications may be associated with various services, such as for ultra reliable low latency communications (URLLC), enhanced mobile broadband (eMBB) communications, and/or other communications. Some wireless communications may be preempted over other wireless communications or may be transmitted using power levels different from other wireless communications, for example, based on service type(s) and/or other information. It is desired to improve wireless communications without adversely increasing signaling overhead and/or decreasing spectral efficiency.

SUMMARY

The following summary presents a simplified summary of certain features. The summary is not an extensive overview and is not intended to identify key or critical elements.

Systems, apparatuses, and methods are described for multiplexing wireless communications. A base station may communicate with a wireless device via uplink and downlink channels. A base station and/or a wireless device may have different capabilities for processing multiplexed data, preemption indication, and/or other signaling. Different downlink control signaling formats may be used to indicate a preemption for stopping an uplink transmission or to indicate a power reduction associated with a preemption, for example, based on different device capabilities. Using different downlink control signaling formats may increase downlink signal overhead and/or power consumption. An enhanced downlink control information format may be used to indicate a preemption for stopping an uplink transmission and/or to indicate a power reduction associated with a preemption. The downlink control information format may comprise a power control field and a preemption indicator field. The power control field may be associated with the preemption indicator field. A wireless device may determine to stop an uplink transmission or to reduce power for an uplink transmission on one or more preempted resources, for example, based on the power control field and the preemption indicator field. A wireless device may determine preempted resource(s) based on one or more locations of the preemption indicator field. The wireless device may reduce an uplink power on the preempted resource(s) or may stop an uplink transmission on the preempted resource(s).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 18A shows an example of a power control command transmission.

FIG. 18B shows an example of a power control command transmission.

DETAILED DESCRIPTION

Figure 1:
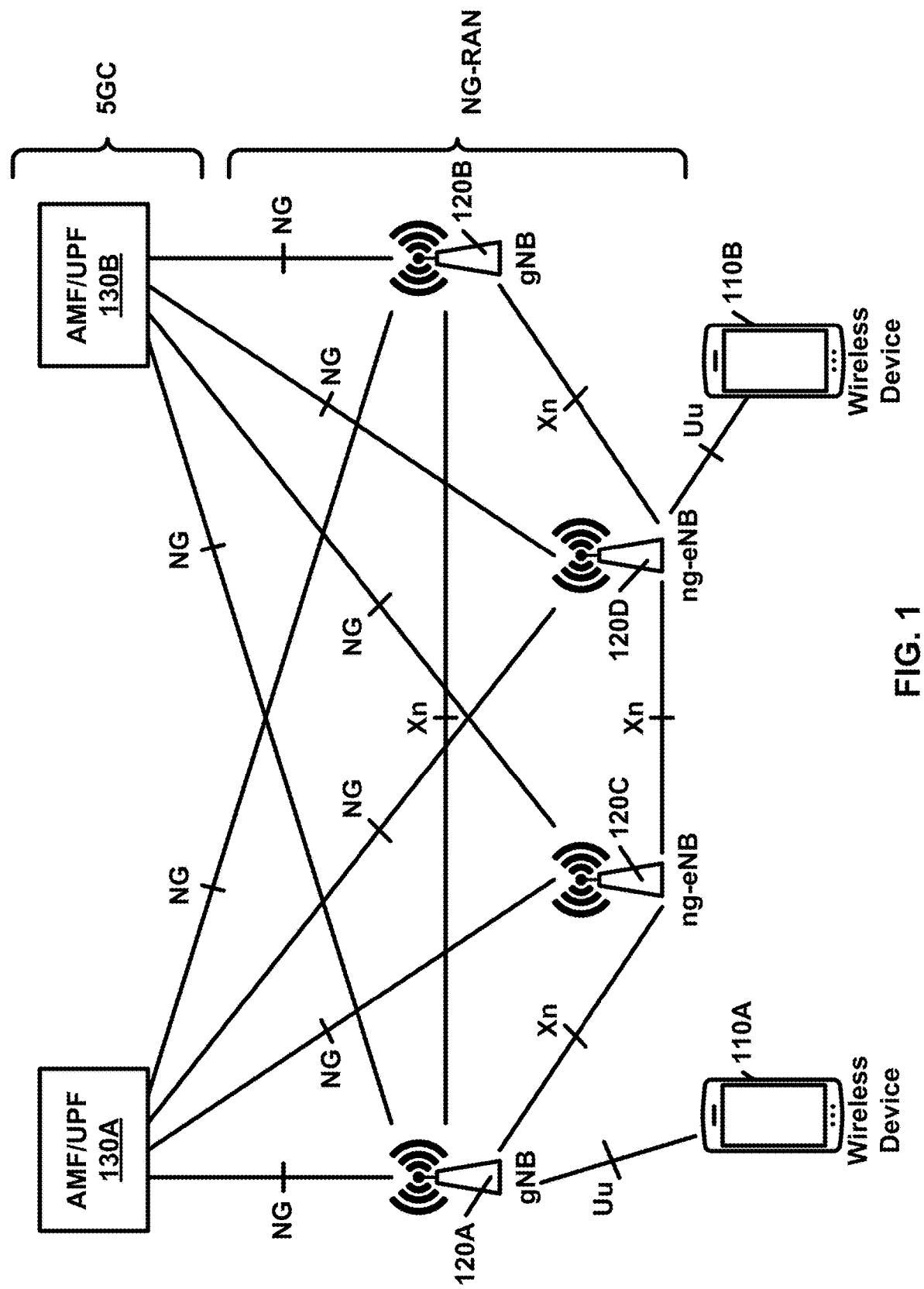
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to multiplexing data transmissions for wireless communications.

The following acronyms are used throughout the drawings and/or descriptions, and are provided below for convenience although other acronyms may be introduced in the detailed description:

| | |
|---|---|
| 3GPP | 3rd Generation Partnership Project |
| 5GC | 5G Core Network |
| ACK | Acknowledgement |
| AMF | Access and Mobility Management Function |
| ARQ | Automatic Repeat Request |
| AS | Access Stratum |
| ASIC | Application-Specific Integrated Circuit |
| BA | Bandwidth Adaptation |
| BCCH | Broadcast Control Channel |
| BCH | Broadcast Channel |
| BPSK | Binary Phase Shift Keying |
| BWP | Bandwidth Part |
| CA | Carrier Aggregation |
| CC | Component Carrier |
| CCCH | Common Control CHannel |
| CDMA | Code Division Multiple Access |
| CN | Core Network |
| CP | Cyclic Prefix |
| CP-OFDM | Cyclic Prefix- Orthogonal Frequency Division Multiplex |
| C-RNTI | Cell-Radio Network Temporary Identifier |
| CS | Configured Scheduling |
| CSI | Channel State Information |
| CSI-RS | Channel State Information-Reference Signal |
| CQI | Channel Quality Indicator |
| CSS | Common Search Space |
| CU | Central Unit |
| DC | Dual Connectivity |
| DCCH | Dedicated Control Channel |
| DCI | Downlink Control Information |
| DL | Downlink |
| DL-SCH | Downlink Shared CHannel |
| DM-RS | DeModulation Reference Signal |
| DRB | Data Radio Bearer |
| DRX | Discontinuous Reception |
| DTCH | Dedicated Traffic Channel |
| DU | Distributed Unit |
| EPC | Evolved Packet Core |
| E-UTRA | Evolved UMTS Terrestrial Radio Access |
| E-UTRAN | Evolved-Universal Terrestrial Radio Access Network |
| FDD | Frequency Division Duplex |
| FPGA | Field Programmable Gate Arrays |
| F1-C | F1-Control plane |
| F1-U | F1-User plane |
| gNB | next generation Node B |
| HARQ | Hybrid Automatic Repeat reQuest |
| HDL | Hardware Description Languages |
| IE | Information Element |
| IP | Internet Protocol |
| LCID | Logical Channel Identifier |
| LTE | Long Term Evolution |
| MAC | Media Access Control |
| MCG | Master Cell Group |
| MCS | Modulation and Coding Scheme |
| MeNB | Master evolved Node B |
| MIB | Master Information Block |
| MME | Mobility Management Entity |
| MN | Master Node |
| NACK | Negative Acknowledgement |
| NAS | Non-Access Stratum |
| NG CP | Next Generation Control Plane |
| NGC | Next Generation Core |
| NG-C | NG-Control plane |
| ng-eNB | next generation evolved Node B |
| NG-U | NG-User plane |
| NR | New Radio |
| NR MAC | New Radio MAC |
| NR PDCP | New Radio PDCP |
| NR PHY | New Radio PHYsical |
| NR RLC | New Radio RLC |
| NR RRC | New Radio RRC |
| NSSAI | Network Slice Selection Assistance Information |
| O&M | Operation and Maintenance |
| OFDM | Orthogonal Frequency Division Multiplexing |
| PBCH | Physical Broadcast CHannel |
| PCC | Primary Component Carrier |
| PCCH | Paging Control CHannel |
| PCell | Primary Cell |
| PCH | Paging CHannel |
| PDCCH | Physical Downlink Control CHannel |
| PDCP | Packet Data Convergence Protocol |
| PDSCH | Physical Downlink Shared CHannel |
| PDU | Protocol Data Unit |
| PHICH | Physical HARQ Indicator CHannel |
| PHY | PHYsical |
| PLMN | Public Land Mobile Network |
| PMI | Precoding Matrix Indicator |
| PRACH | Physical Random Access CHannel |
| PRB | Physical Resource Block |
| PSCell | Primary Secondary Cell |
| PSS | Primary Synchronization Signal |
| pTAG | primary Timing Advance Group |
| PT-RS | Phase Tracking Reference Signal |
| PUCCH | Physical Uplink Control CHannel |
| PUSCH | Physical Uplink Shared CHannel |
| QAM | Quadrature Amplitude Modulation |
| QFI | Quality of Service Indicator |
| QoS | Quality of Service |
| QPSK | Quadrature Phase Shift Keying |
| RA | Random Access |
| RACH | Random Access CHannel |
| RAN | Radio Access Network |
| RAT | Radio Access Technology |
| RA-RNTI | Random Access-Radio Network Temporary Identifier |
| RB | Resource Blocks |
| RBG | Resource Block Groups |
| RI | Rank indicator |
| RLC | Radio Link Control |
| RRC | Radio Resource Control |
| RS | Reference Signal |
| RSRP | Reference Signal Received Power |
| SCC | Secondary Component Carrier |
| SCell | Secondary Cell |
| SCG | Secondary Cell Group |
| SC-FDMA | Single Carrier-Frequency Division Multiple Access |
| SDAP | Service Data Adaptation Protocol |
| SDU | Service Data Unit |
| SeNB | Secondary evolved Node B |
| SFN | System Frame Number |
| S-GW | Serving GateWay |
| SI | System Information |
| SIB | System Information Block |
| SMF | Session Management Function |
| SN | Secondary Node |
| SpCell | Special Cell |
| SRB | Signaling Radio Bearer |
| SRS | Sounding Reference Signal |

| | |
|---|---|
| SS | Synchronization Signal |
| SSS | Secondary Synchronization Signal |
| sTAG | secondary Timing Advance Group |
| TA | Timing Advance |
| TAG | Timing Advance Group |
| TAI | Tracking Area Identifier |
| TAT | Time Alignment Timer |
| TB | Transport Block |
| TC-RNTI | Temporary Cell-Radio Network Temporary Identifier |
| TDD | Time Division Duplex |
| TDMA | Time Division Multiple Access |
| TTI | Transmission Time Interval |
| UCI | Uplink Control Information |
| UE | User Equipment |
| UL | Uplink |
| UL-SCH | Uplink Shared CHannel |
| UPF | User Plane Function |
| UPGW | User Plane Gateway |
| VHDL | VHSIC Hardware Description Language |
| Xn-C | Xn-Control plane |
| Xn-U | Xn-User plane |

Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
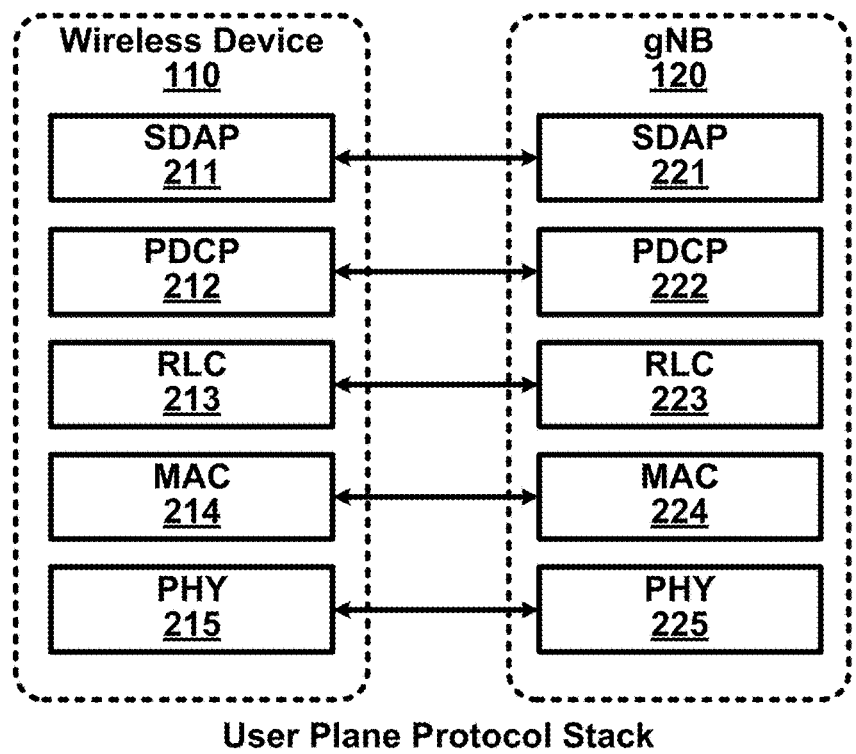
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TB s)

delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
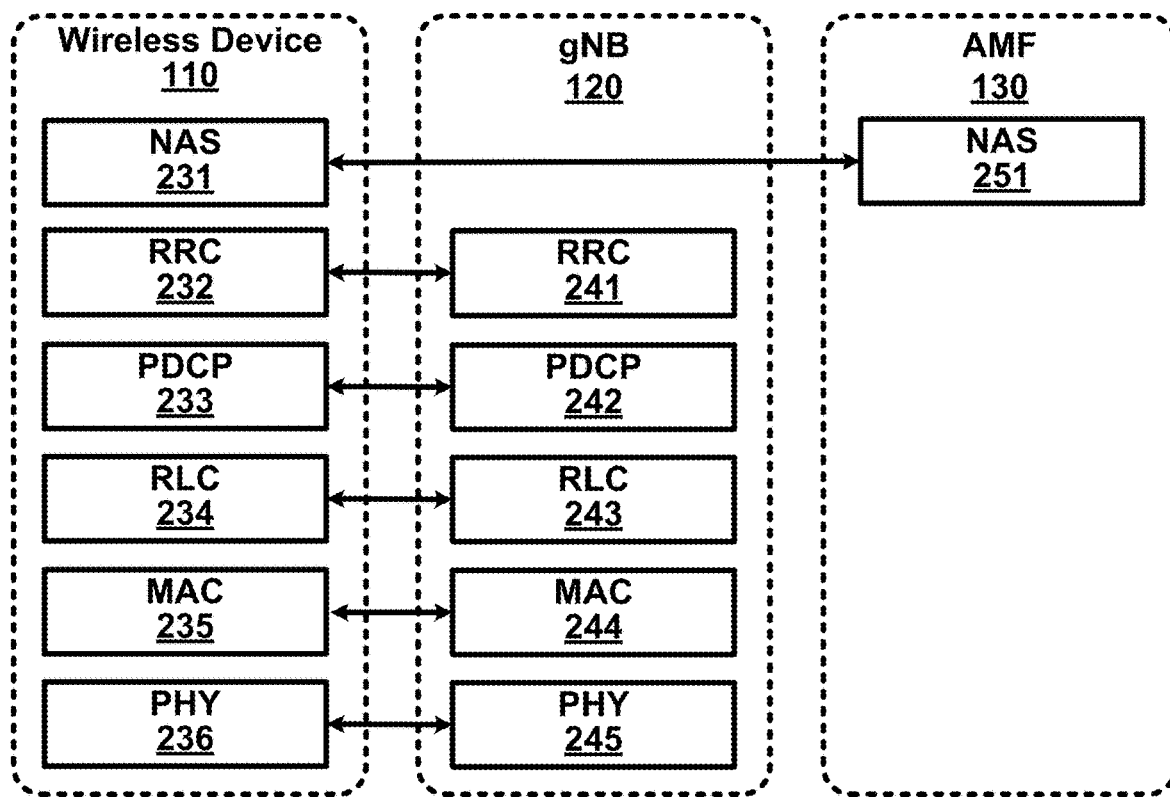
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MA CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
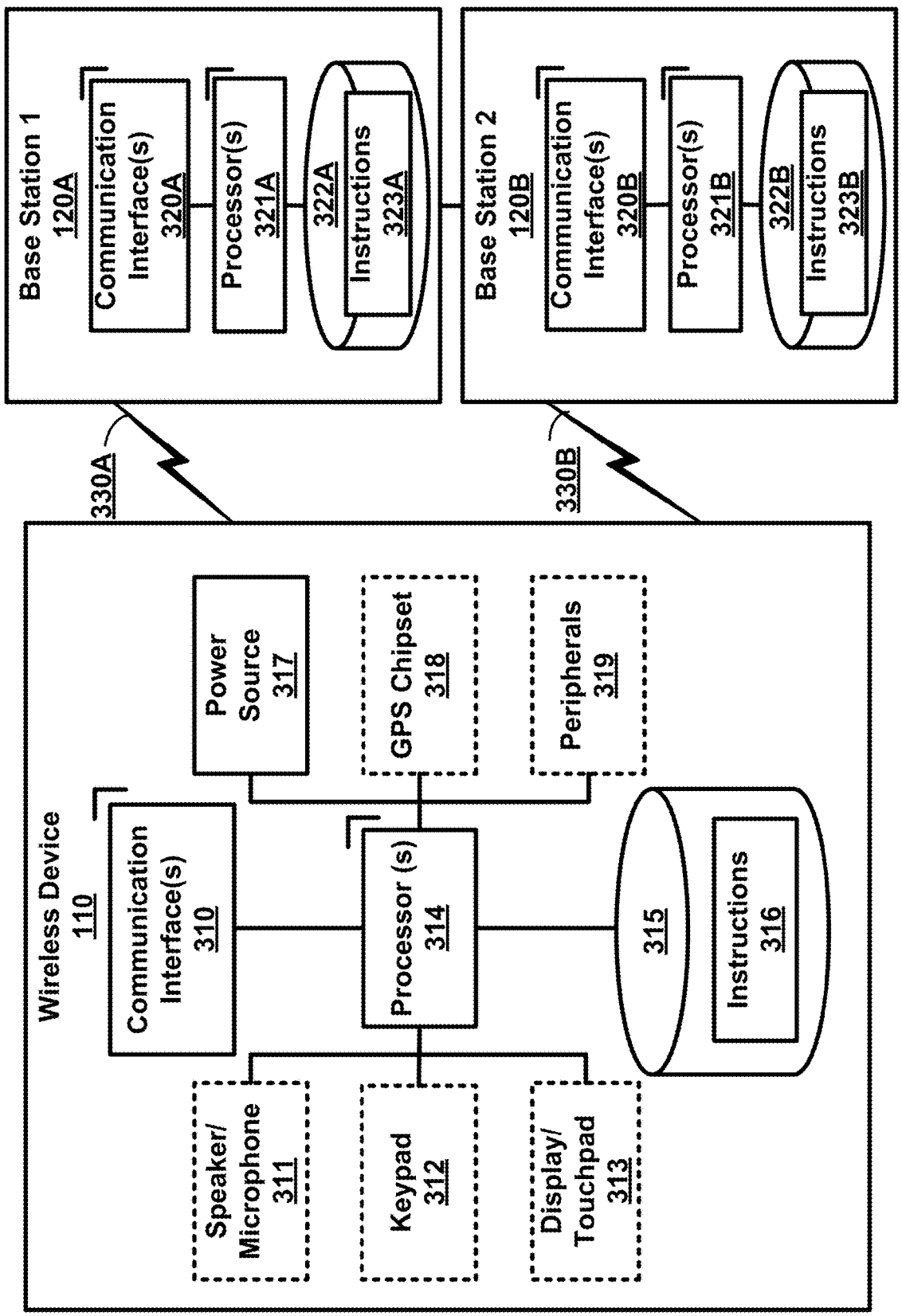
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 4A:
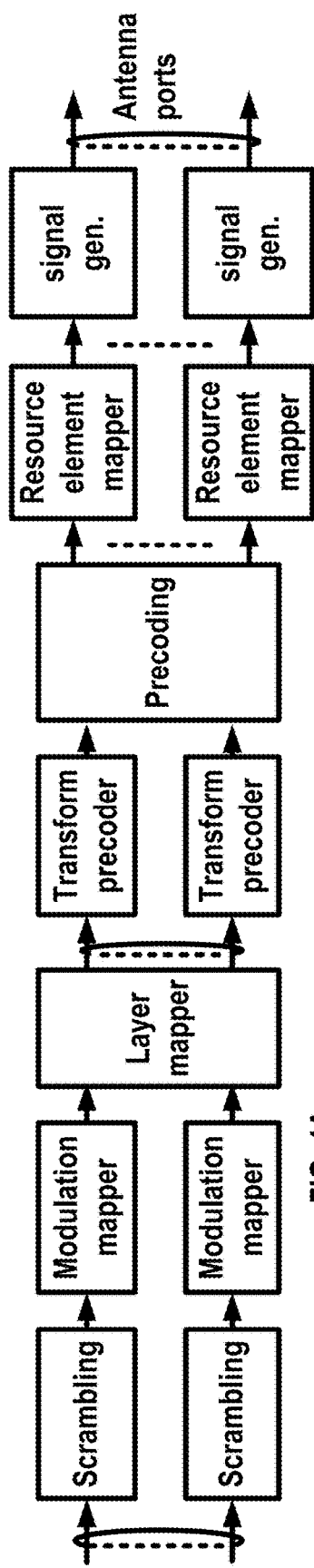
FIG. 4A, FIG. 4B, FIG. 4C and FIG. 4D show examples of uplink and downlink signal transmission.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

Figure 4B:
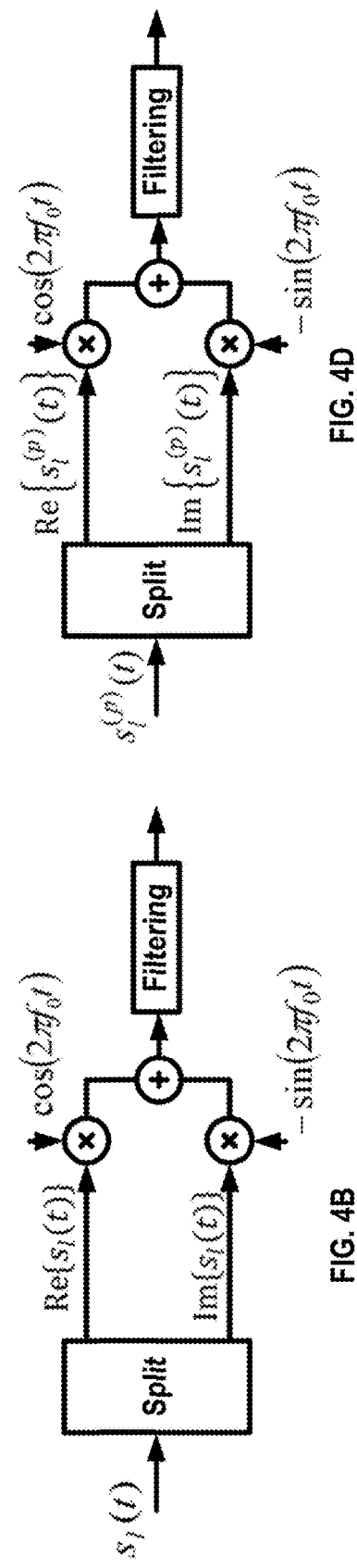

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

Figure 4D:
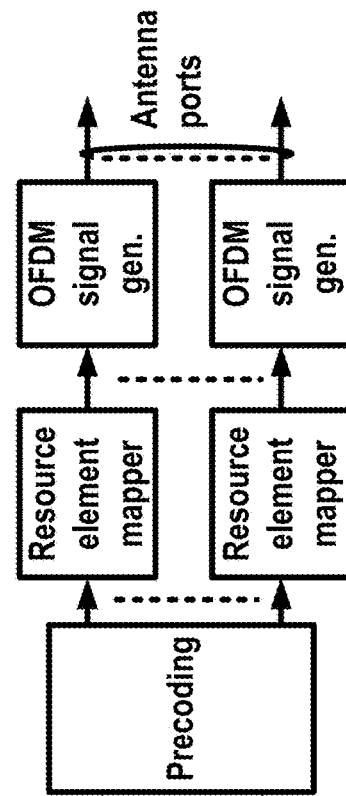
Figure 4C:
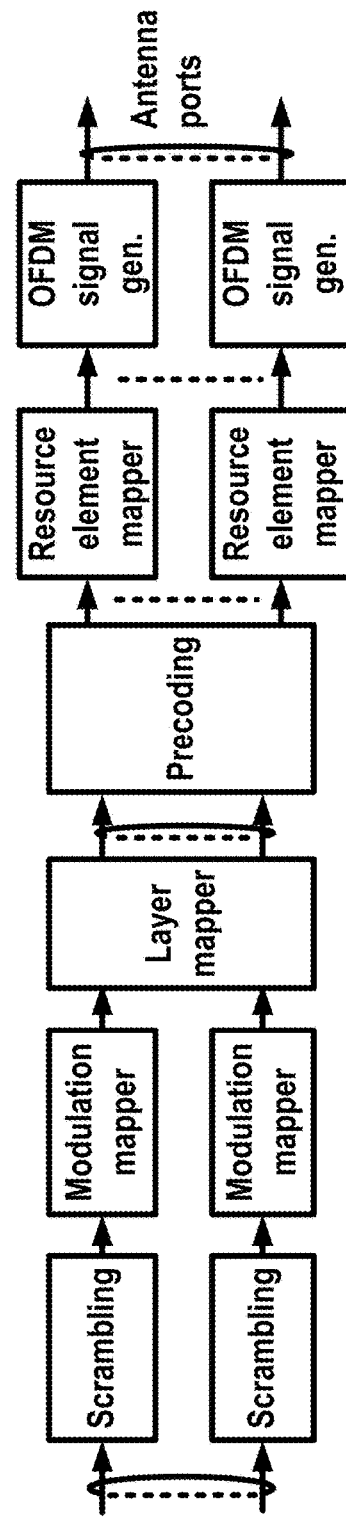

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
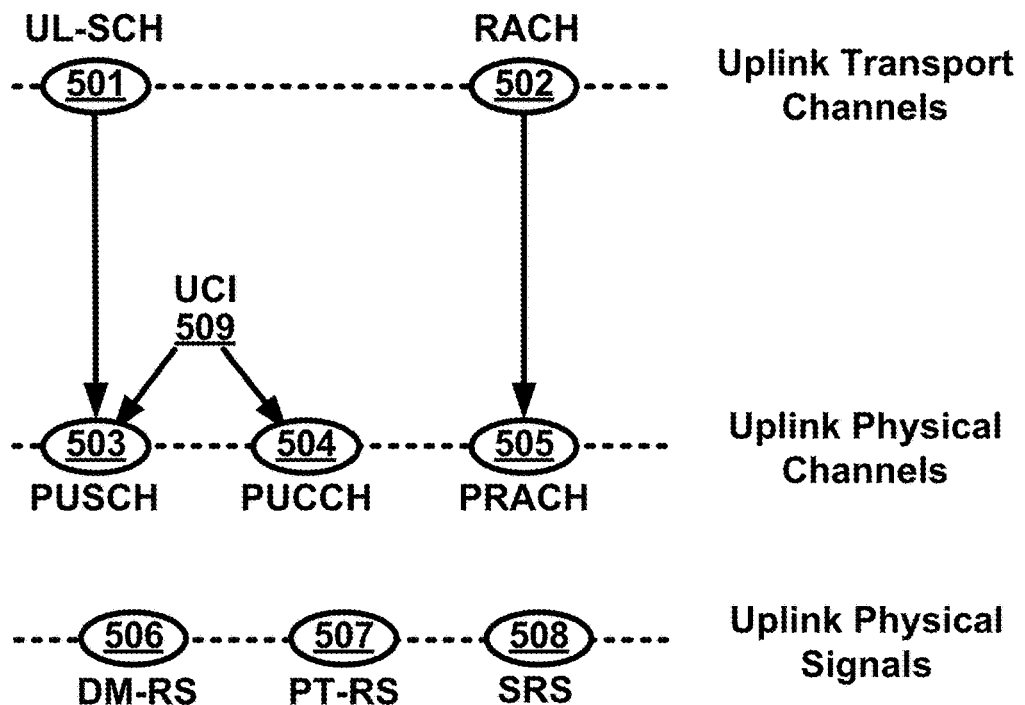
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
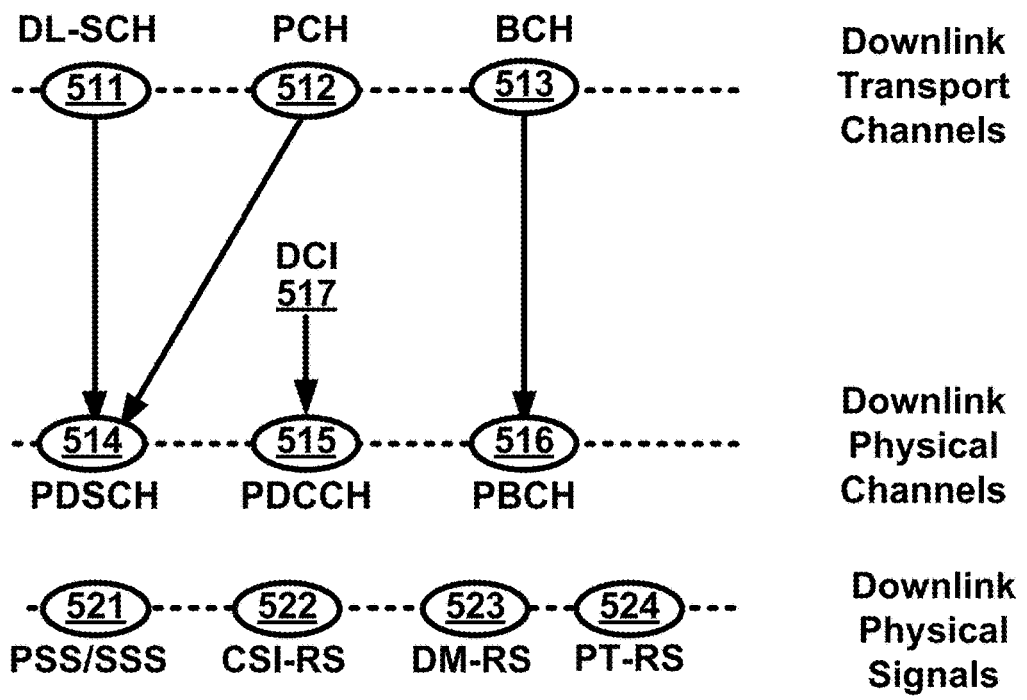
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
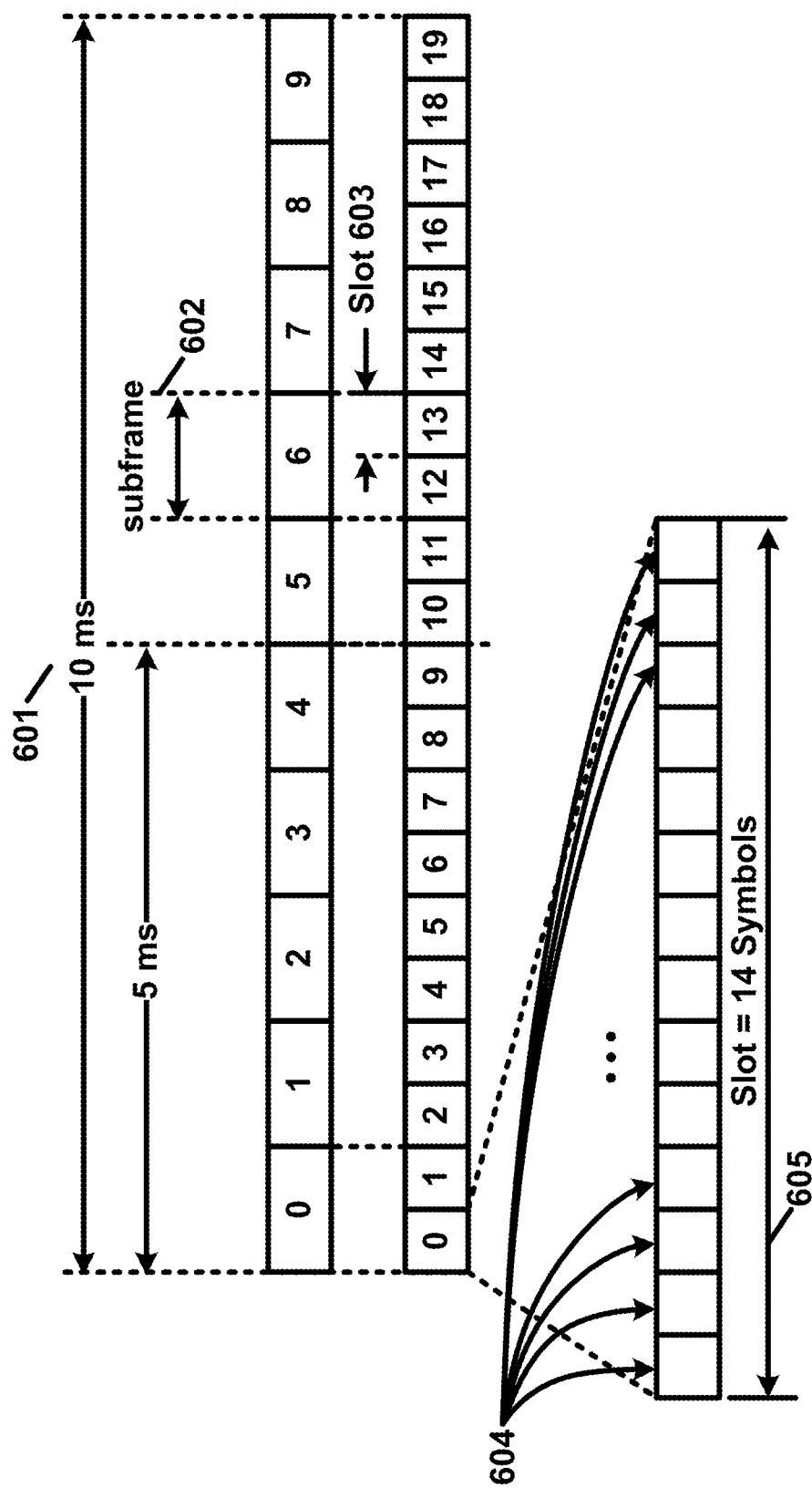
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG.

6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
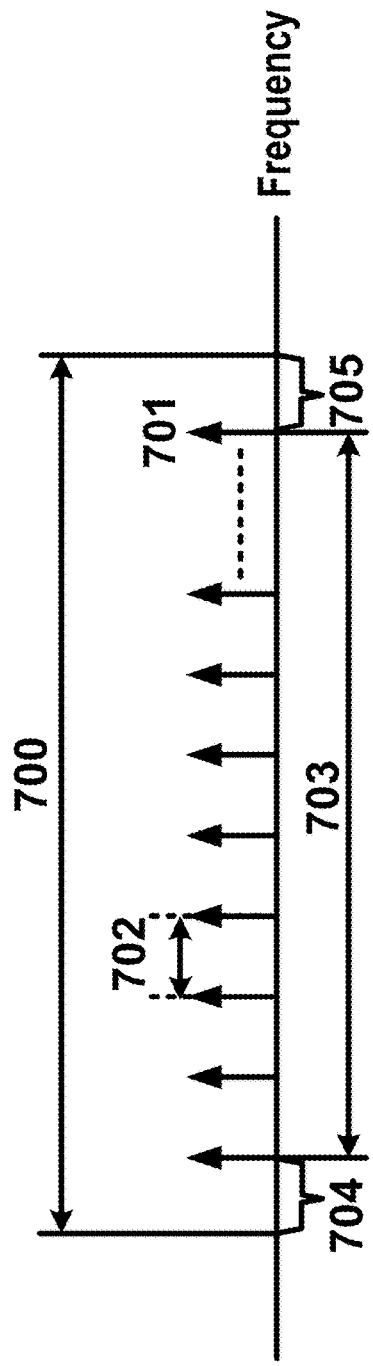
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
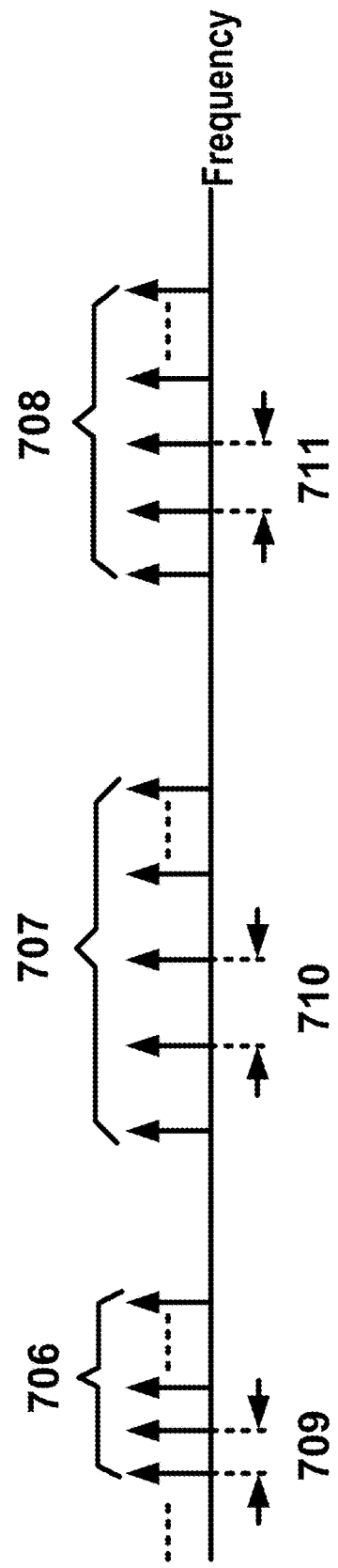

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
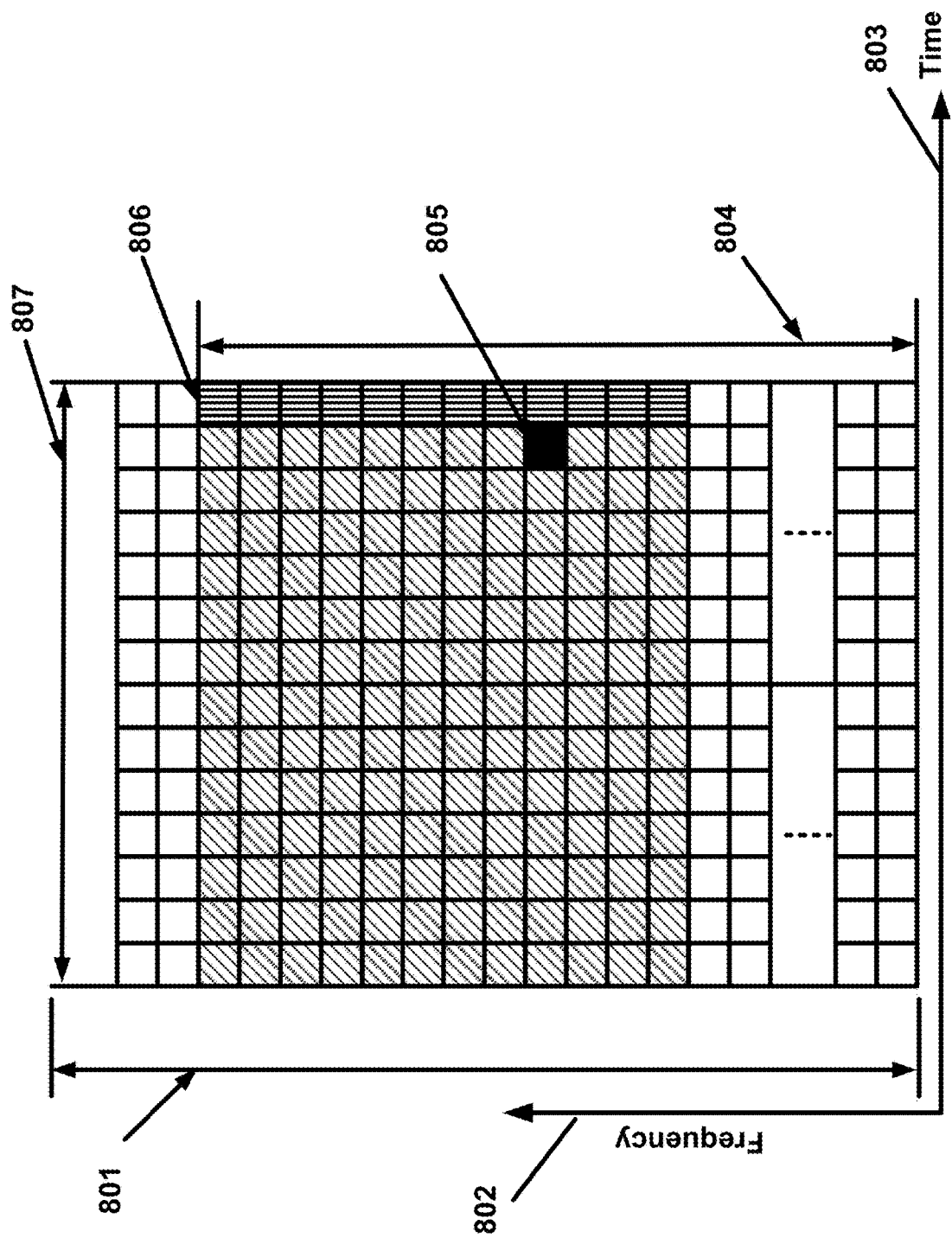
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message (s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI)

activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
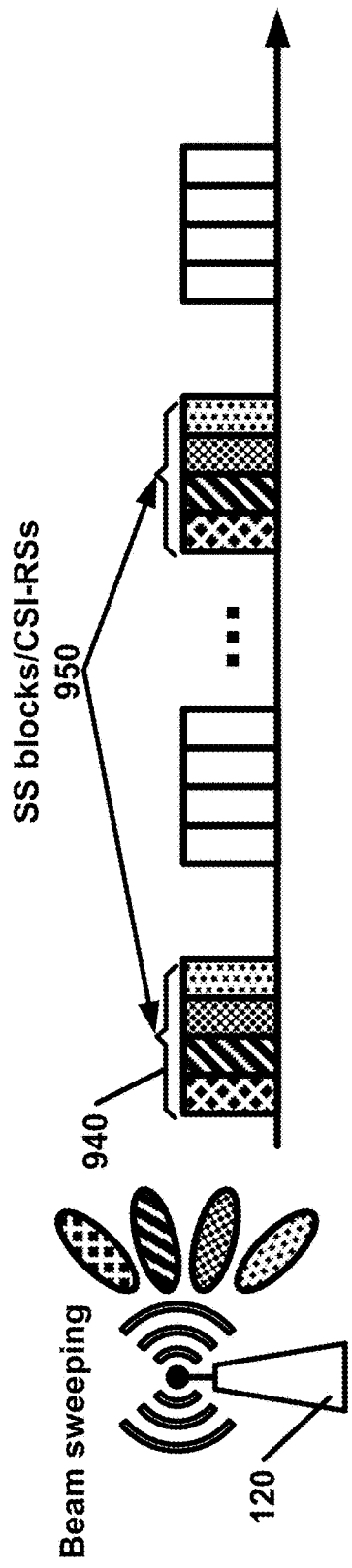
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
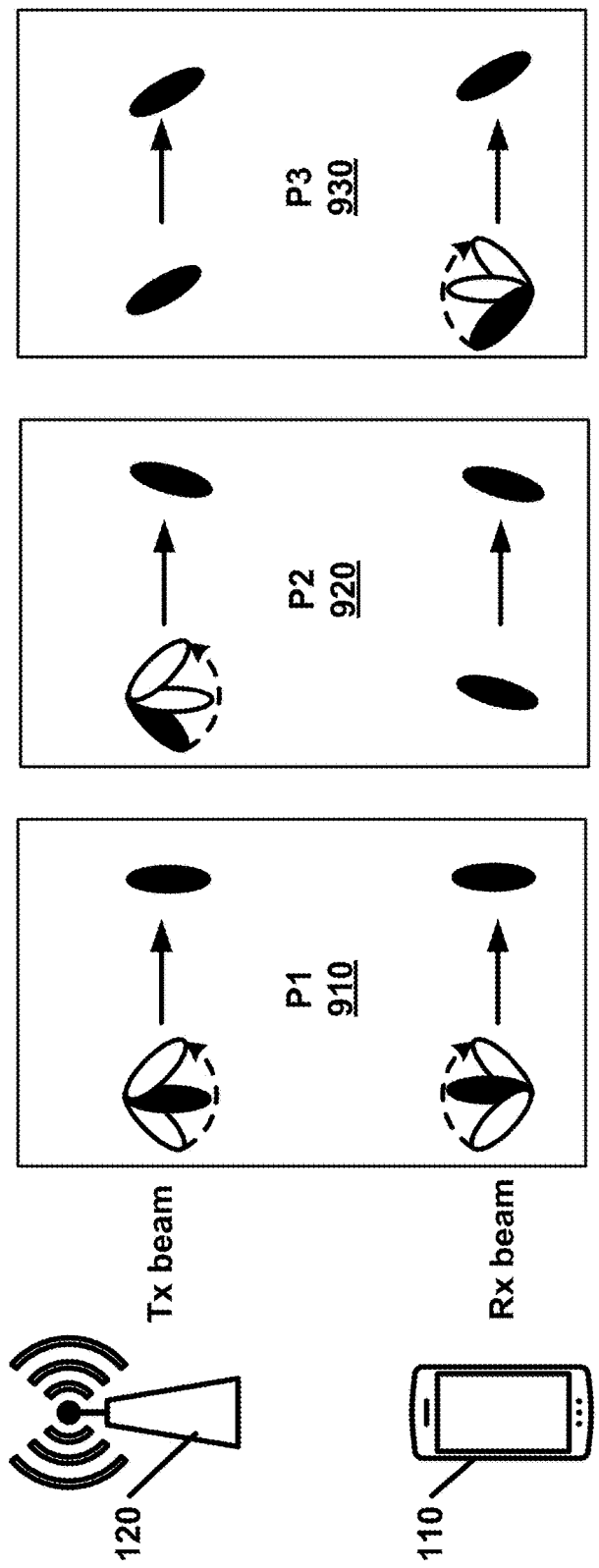
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
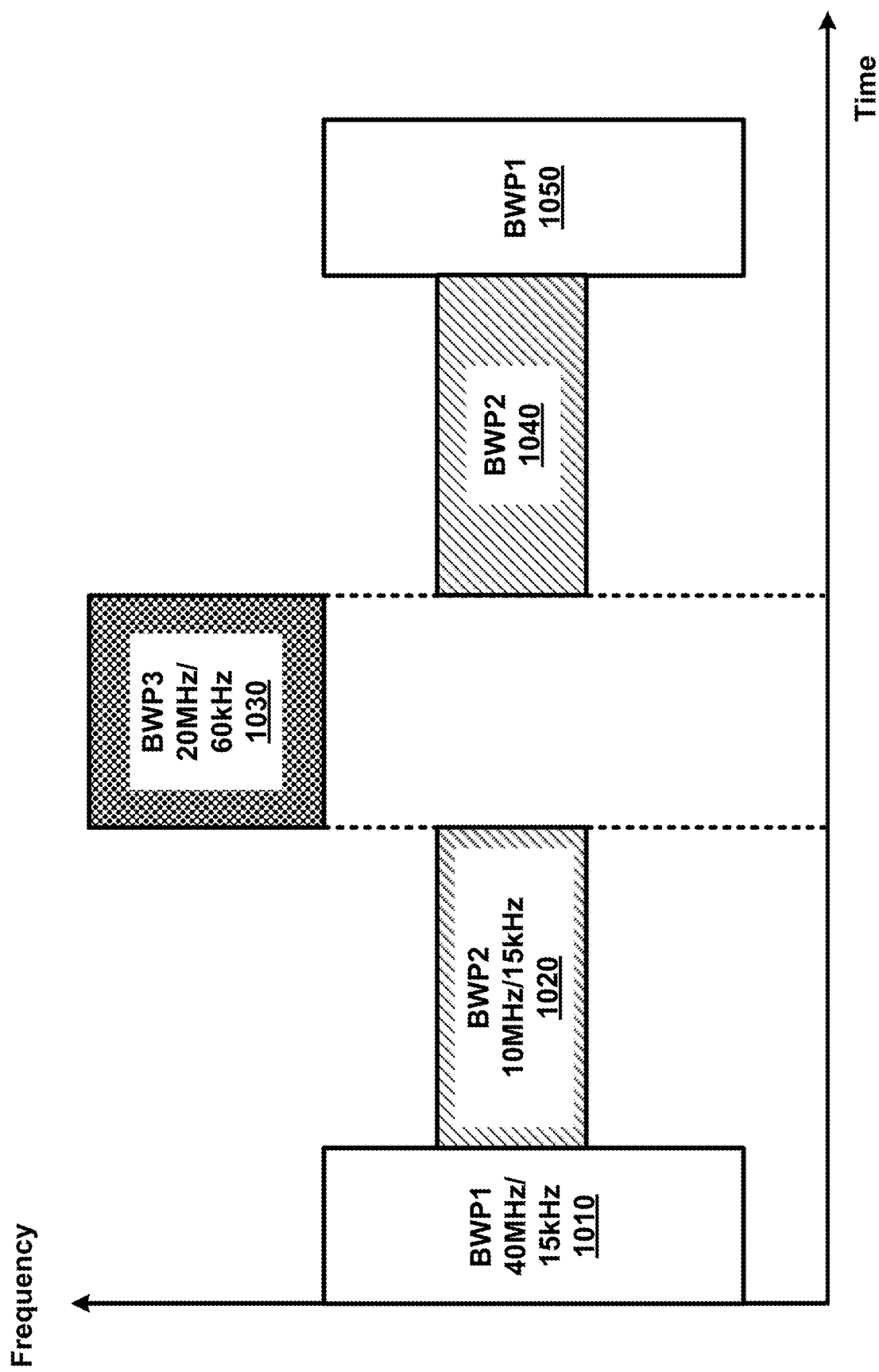
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base statin may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
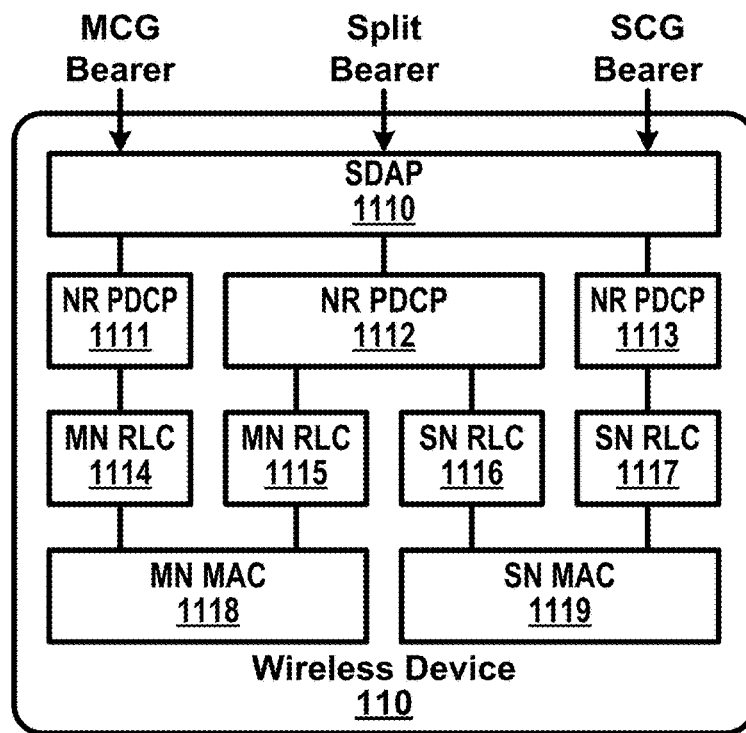
FIG. 11A and FIG. 11B show examples of multi connectivity.
Figure 11B:
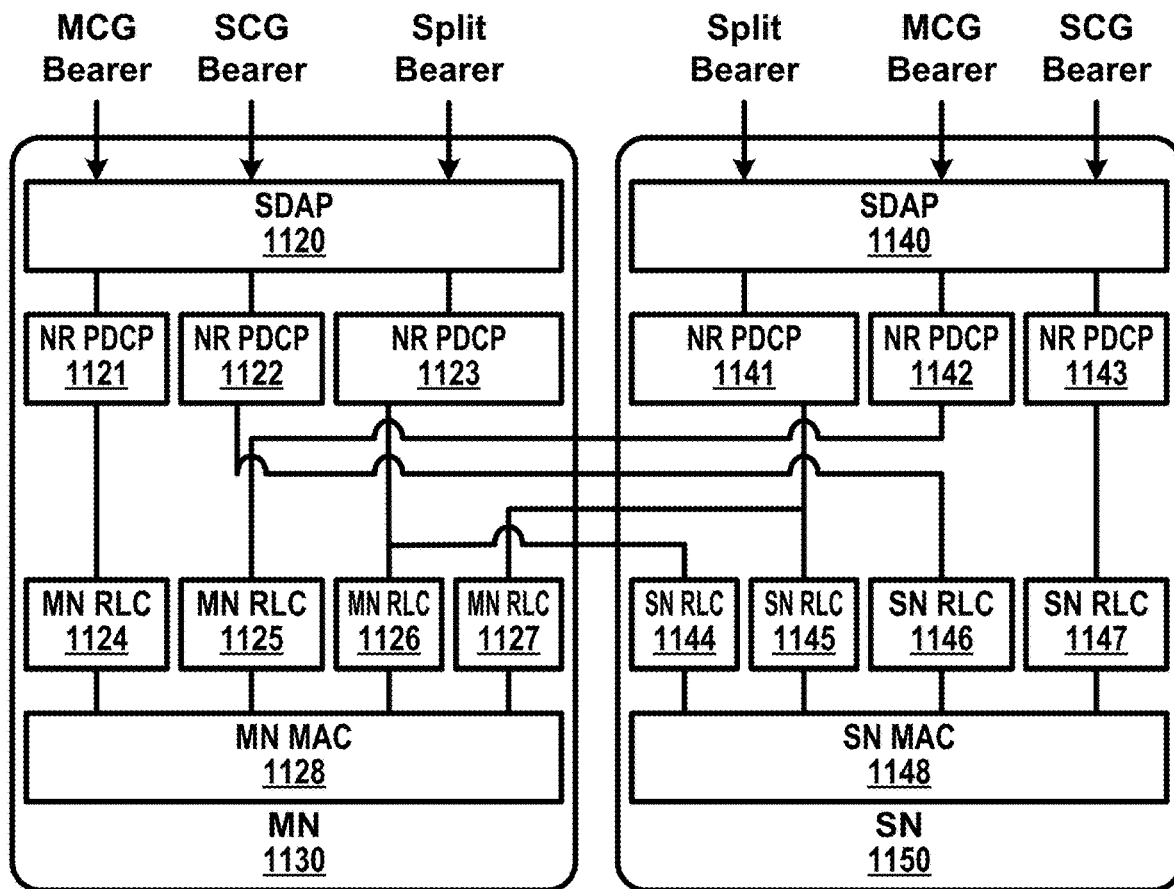

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
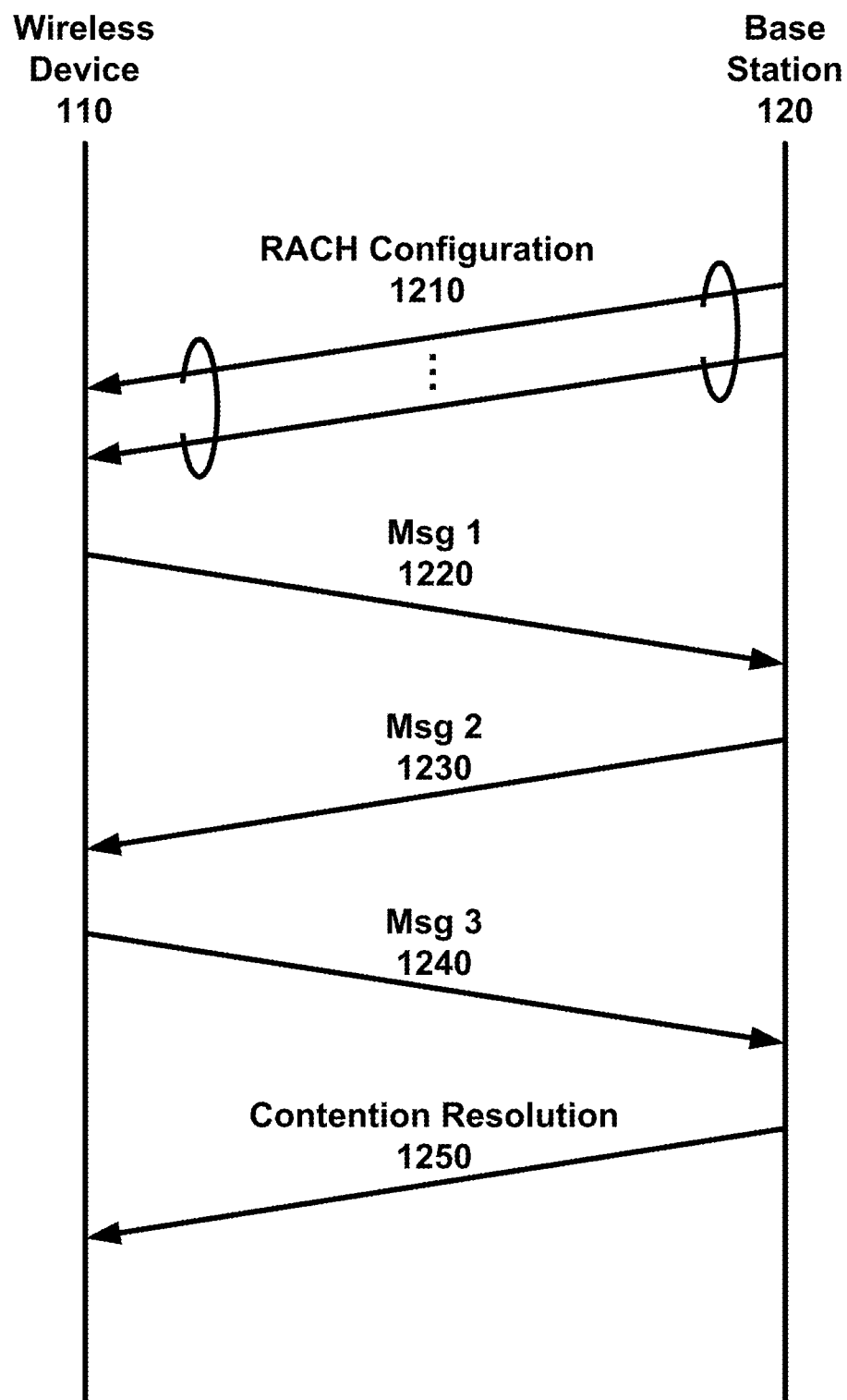
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
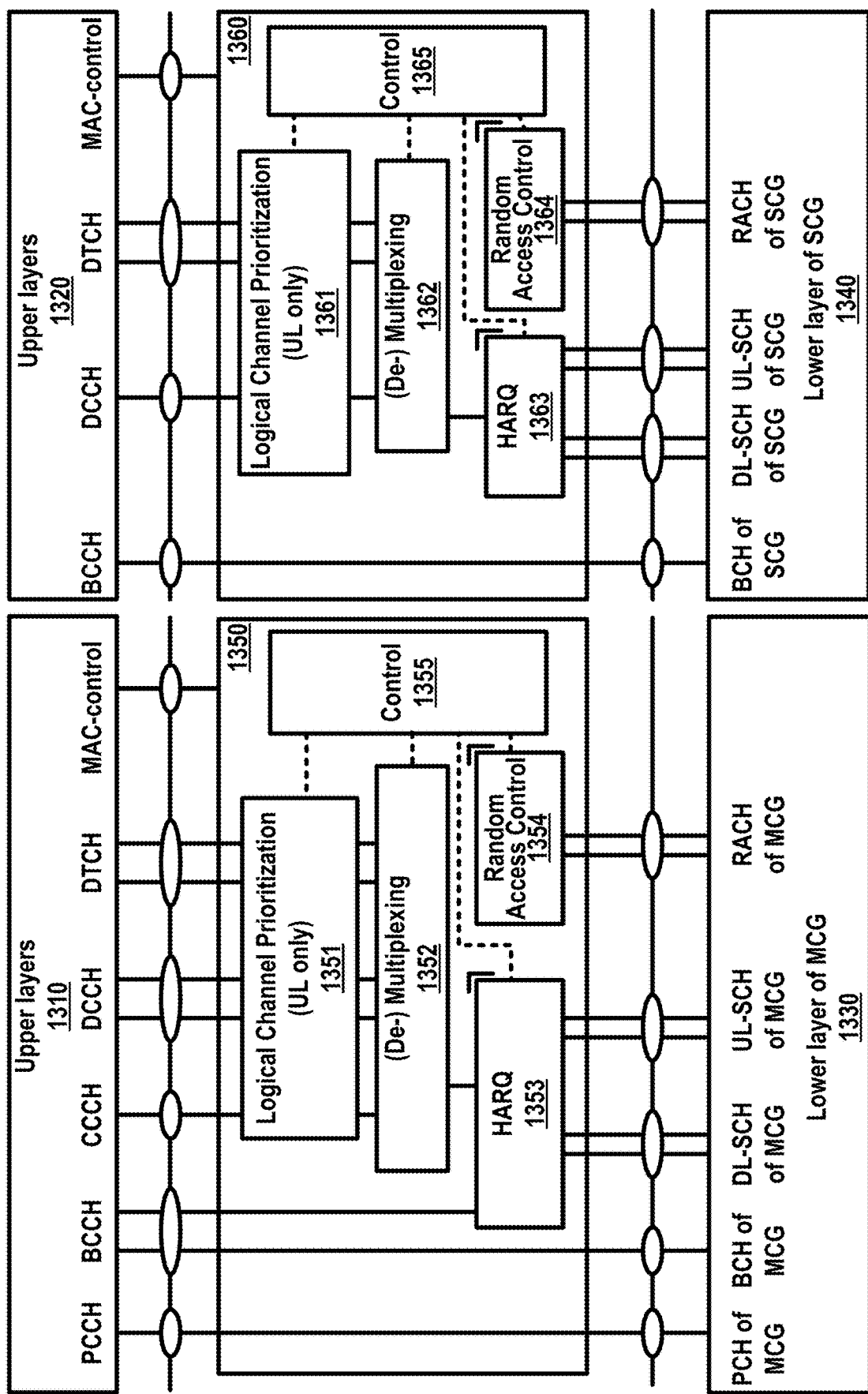
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
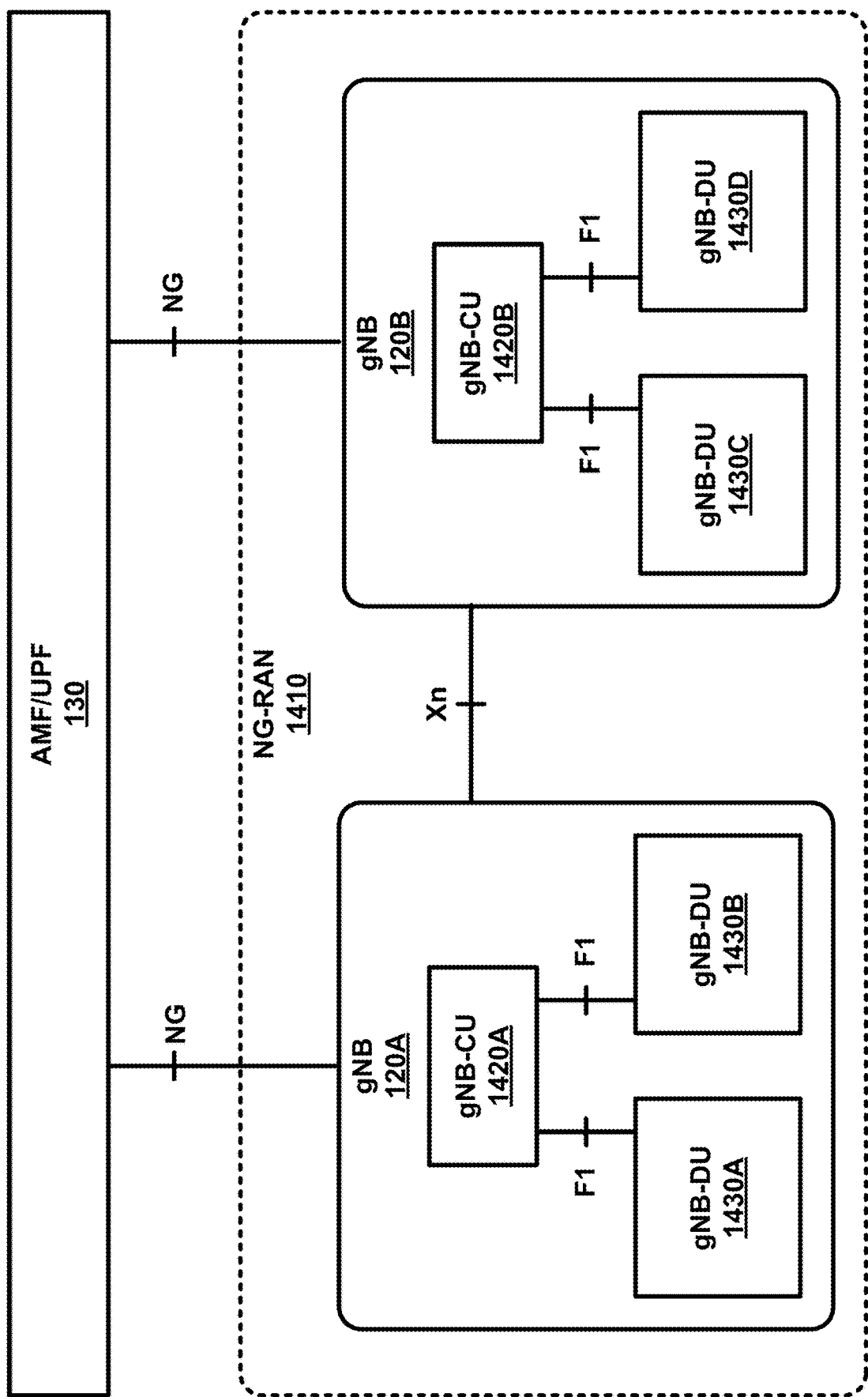
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
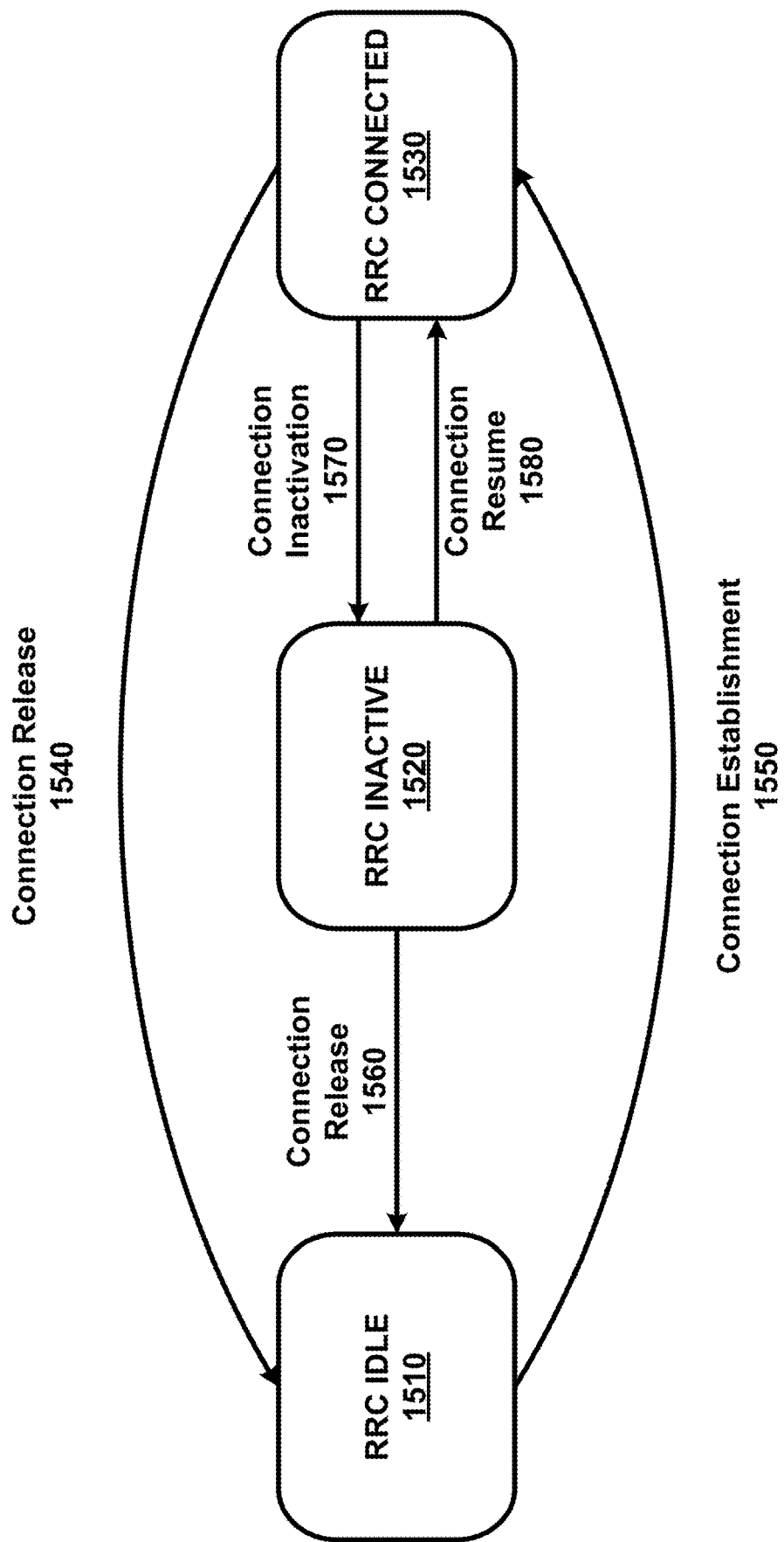
FIG. 15 shows example radio resource control (RRC) states.

FIG. 15 shows example RRC state transitions of a wireless device. A wireless device may be in at least one RRC state among an RRC connected state (e.g., RRC_Connected 1530, RRC_Connected, etc.), an RRC idle state (e.g., RRC Idle 1510, RRC_Idle, etc.), and/or an RRC inactive state (e.g., RRC_Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station.

Wireless communications may be associated with various services, such as for ultra reliable low latency communications (URLLC), enhanced mobile broadband (eMBB) communications, and/or other communications. Some wireless communications (e.g., eMBB) may be preempted over other wireless communications (e.g., URLLC), for example, based on service type(s), latency requirements, message size, device capability, device processing time, and/or any other information. Preemption may comprise uplink preemption and/or downlink preemption. A first message may preempt a second message by using radio resources (e.g., time and/or frequency resources) previously assigned to the second message (e.g., via a downlink grant for a downlink radio resource, or via an uplink grant for an uplink radio resource). In some systems, a base station may initiate a preemption, for example, by sending (e.g., transmitting) group common downlink control information (DCI) (e.g., for stopping an uplink transmission) and/or a power control group common DCI (e.g., for reducing power for an uplink transmission). Such a base station may send (e.g., transmit), for example, a group common DCI using a first format (e.g., using DCI format 2_1) indicating uplink preemption for stopping an uplink transmission and/or the base station may send (e.g., transmit) a power group common DCI using a second format (e.g., using DCI format 2_2) for reducing a power of an uplink transmission. By sending (e.g., transmitting) different DCI formats, downlink signal overhead of such a base station may increase. A wireless device in communication with such a base station may increase power consumption by the wireless device, for example, by performing DCI blind decoding of such different DCI formats.

Wireless communications may be improved by using a single DCI format to indicate stopping transmission and/or a particular power level (e.g., reduced power level). A base station may send (e.g., transmit), to a wireless device that may receive, a first DCI to indicate stopping transmission and a second DCI to indicate a power reduction, wherein the first DCI and the second DCI may have the same format. A base station may use the single DCI format, for example, to indicate whether one or more resources are preempted (e.g., an uplink preemption of an uplink resource, and/or a downlink preemption of a downlink resource). The base station may use the single DCI format, for example, to indicate a power level for a group of wireless devices (e.g., a reduced power level for a group of wireless devices communicating eMBB messages). The single DCI format may comprise, for example, a preemption indicator field and a power control field. A wireless device may stop an uplink transmission, for example, based on or in response to receiving DCI comprising an uplink preemption indicator indicating one or more uplink radio resources are preempted. A wireless device may adjust its transmission power by a value indicated by the power control field (e.g., a power control command of the power control field). The power control field may comprise a predefined value, for example, to indicate a transmission power for one or more transmissions. The single DCI format may comprise a first value in the preemption indicator field and a second value in the power control field. The wireless device may stop transmission and/or adjust its transmission power for a transmission, for example, based on or in response to the preemption indicator field in the DCI and/or the power control field in the DCI.

A base station may reduce downlink signaling overhead and/or increase downlink transmission throughput, for example, by sending (e.g., transmitting) a single DCI indicating a power reduction and/or a preemption. A base station may be able to send (e.g., transmit) a single DCI in place of at least two DCIs (e.g., a first DCI for preemption and at least a second DCI for power control). A wireless device may be able to reduce power consumption by receiving, from the base station, DCI for preemption and power control having a single DCI format. For example, by monitoring for a single DCI format for preemption and power control, the wireless device may avoid monitoring a physical downlink control channel (PDCCH) for a plurality of DCI formats and/or the wireless device may reduce DCI blind decoding of different DCI formats, which may result in reduced power consumption.

A base station (e.g., a gNB) may communicate with a wireless device via a wireless network using one or more new radio technologies. The one or more radio technologies may comprise at least one of: multiple technologies related to a physical layer, multiple technologies related to a medium access control layer, and/or multiple technologies related to a radio resource control layer. Enhancing the one or more radio technologies may improve performance of a wireless network, increase the system throughput, increase data rate of transmission, reduce battery consumption of a wireless device, improve latency of data transmission between a base station and a wireless device, improve network coverage of a wireless network, and/or improve transmission efficiency of a wireless network.

A base station may send (e.g., transmit) to and/or receive from a wireless device one or more data packets via one or more radio resources. The one or more data packets may be one or more URLLC data packets. The one or more data packets (e.g., URLLC packets) may be of a small packet size (e.g., <100 bytes, <1 kB, etc.), which may require ultra-reliable (e.g., a block error rate less than 0.00001, less than 0.000001, etc.) and low latency delivery between the base station and the wireless device. The one or more data packets may be one or more eMBB data packets. The one or more data packets (e.g., eMBB packets) may be of a large packet size (e.g., >1000 bytes, >10 kB, etc.), which may require large bandwidth and/or a large amount of radio resources. Multiplexing packets of a variety of types and/or for a variety of services, such as URLLC packets and eMBB packets, in a wireless system may improve the efficiency of radio resource utilization.

A base station may send (e.g., transmit) DCI via a PDCCH for at least one of: a scheduling assignment, a scheduling grant, a slot format notification, a preemption indication, and/or a power-control command. The DCI may comprise at least one of: an identifier of a DCI format, a downlink scheduling assignment, an uplink scheduling grant, a slot format indicator, a preemption indication, a power-control for PUCCH and/or PUSCH, and/or a power-control for SRS.

A downlink scheduling assignment DCI may comprise parameters indicating at least one of: an identifier of a DCI format, a PDSCH resource indication, a transport format, HARQ information, control information (e.g., which may be related to multiple antenna schemes), and/or a command for a power control of the PUCCH.

An uplink scheduling grant DCI may comprise parameters indicating at least one of: an identifier of a DCI format, a PUSCH resource indication, a transport format, HARQ related information, and/or a power control command of the PUSCH. Different types of control information may correspond to different DCI message sizes. Supporting multiple beams and/or spatial multiplexing in the spatial domain, and noncontiguous allocation of resource blocks (RBs) in the frequency domain, may require a larger scheduling message relative to an uplink grant allowing for frequency-contiguous allocation. DCI may be categorized into different DCI formats corresponding to a certain message size and/or usage.

A wireless device may monitor one or more PDCCHs for detecting one or more DCI with one or more DCI formats. The wireless device may monitor one or more PDCCHs, for example, in a common search space or in a wireless device-specific search space. A wireless device may monitor PDCCH with a limited set of DCI formats, for example, to save power consumption. A wireless device may consume power proportional to the number of DCI formats to be detected.

The information in the DCI formats for downlink scheduling may comprise at least one of: an identifier of a DCI format, a carrier indicator, an RB allocation, a time resource allocation, a bandwidth part indicator, a HARQ process number, one or more MCSs, one or more NDIs, one or more RVs, MIMO related information, a downlink assignment index (DAI), a TPC for PUCCH, an SRS request, and/or padding. MIMO related information may comprise at least one of: a PMI, precoding information, a transport block swap flag, a power offset between PDSCH and a reference signal, a reference-signal scrambling sequence, a number of layers, one or more antenna ports for the transmission, and/or a transmission configuration indication (TCI).

The information in the DCI formats used for uplink scheduling may comprise at least one of: an identifier of a DCI format, a carrier indicator, a bandwidth part indication, a resource allocation type, an RB allocation, a time resource allocation, an MCS, an NDI, a phase rotation of the uplink DMRS, precoding information, a CSI request, an SRS request, an uplink index/DAI, a TPC for PUSCH, and/or padding.

A base station may perform CRC scrambling for DCI, for example, before sending (e.g., transmitting) the DCI via a PDCCH. The base station may perform CRC scrambling, for example, by adding multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, etc.) on the CRC bits of the DCI. The addition may be binary addition. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different control resource sets (coresets), for example to support a wide bandwidth operation. A base station may send (e.g., transmit) one or more RRC message comprising configuration parameters of one or more coresets. A coreset may comprise at least one of: a first OFDM symbol, a number of consecutive OFDM symbols, a set of resource blocks, and/or a control channel element (CCE)-to-resource element group (REG) mapping. A base station may send (e.g., transmit) a PDCCH in a dedicated coreset for particular purpose, such as beam failure recovery confirmation.

A wireless device may monitor PDCCH for detecting DCI in one or more configured coresets, for example, to reduce the power consumption. A base station may send, to a group of wireless devices, common information, for example, by transmitting DCI with a dedicated DCI format via a PDCCH. The common information may comprise at least one of: a slot format indication, one or more downlink preemption indications, one or more group power control commands for PUCCH/PUSCH of a group of wireless devices, and/or one or more group power control commands for SRS transmission of one or more wireless devices.

A base station may send (e.g., transmit), to a wireless device, at least one message comprising parameters indicating a group common identifier (e.g., RNTI). The group common RNTI may be the same for each wireless device in a group of wireless devices. A wireless device may monitor a PDCCH for detecting DCI with a CRC scrambled by the group common RNTI, for example, if the wireless device is configured with the group common RNTI. A wireless device may detect the DCI if a bit string, scrambled on the CRC bits of the DCI, is the same as at least a part of a bit string of the group common RNTI.

A base station may send (e.g., transmit) first DCI with a first DCI format (e.g., DCI format 2_0) to each wireless device of a group of wireless devices to indicate one or more slot formats. CRC bits of the first DCI may be scrambled by a first group common RNTI (e.g., SFI-RNTI). The one or more slot formats may be identified by at least one of: a number of downlink symbols, a number of uplink symbols, and/or a number of flexible symbols. A wireless device may monitor a PDCCH, for detecting the first DCI, on one or more control resource sets and/or one or more search spaces, for example, if the wireless device is configured with the first group common RNTI. The wireless device may determine a slot format for a slot based on the first DCI, for example, based on detecting the first DCI. The wireless device may send (e.g., transmit) one or more uplink signals via uplink symbols. The wireless device may receive one or more downlink signals via downlink symbols. The sending of uplink signals and/or the receiving of downlink signals may be according to the one or more slot formats indicated in the first DCI.

A first data packet (e.g., a URLLC packet) of a first wireless device may be multiplexed with a second data packet (e.g., an eMBB packet) of a second wireless device on a PDSCH resource. The first data packet may be sent (e.g., transmitted) with a first format (e.g., a first numerology and/or a first scheduling granularity) on a first PDSCH resource. The second data packet may be sent (e.g., transmitted) with a second format (e.g., a second numerology and/or a second scheduling granularity) on a second PDSCH resource. The first PDSCH resource may be a part of the second PDSCH resource. The second PDSCH resource may be allocated for the second wireless device by a downlink assignment indicated via a PDCCH. The first data packet (e.g., the URLLC data packet) for the first wireless device may be sent (e.g., transmitted) via the first PDSCH resource that is a part of the second PDSCH resource, for example, if the first data packet (e.g., the URLLC packet) is required to be sent with low latency. The second wireless device may receive, via the second PDSCH resource, data that may comprise signals (e.g., on the part of the second PDSCH resource) for the first wireless device. The second wireless device may incorrectly detect the second data packet, for example, if there is no mechanism to indicate if there is a URLLC data transmission via the allocated PDSCH resource. A base station may send (e.g., transmit) DCI comprising fields indicating one or more downlink preemption indicators to a group of wireless devices (e.g., including the second wireless device), indicating whether one or more time/frequency resources are preempted (e.g., reserved for the first wireless device), for example, to multiplex first data (e.g., URLLC data or other data associated with a first service) and second data (e.g., eMBB data or other data associated with a second service) on a PDSCH.

A wireless device may determine that there may be no transmission on one or more time/frequency resources for the wireless device, for example, if the wireless device detects the DCI and if the field(s), in the DCI, that indicate the one or more time/frequency resources are preempted (e.g., reserved for other wireless devices). The wireless device may puncture a received signal on the one or more time/frequency resources, for example, if the wireless device attempts to decode a downlink packet sent (e.g., transmitted) on a PDSCH resource at least partially overlapped with the one or more time/frequency resources.

The wireless device may determine that there may be one or more transmissions on the one or more time/frequency resources for the wireless device, for example, if the wireless device detects the DCI and if the field(s) in the DCI indicate the one or more time/frequency resources are not preempted (e.g., not reserved for other wireless devices). The wireless device may decode a downlink packet sent (e.g., transmitted) on a PDSCH resource at least partially overlapped with the one or more time/frequency resources, for example, if the PDSCH resource is not allocated to other wireless devices.

A base station may send (e.g., transmit) DCI comprising fields indicating one or more downlink preemption indicators to a group of wireless devices. The base station may send (e.g., transmit) the DCI with a dedicated DCI format (e.g., DCI format 2_1). The DCI may be CRC scrambled by a second group common RNTI, for example, INT-RNTI. The base station may send (e.g., transmit) at least one message comprising parameters indicating the second group common RNTI to a wireless device and/or to multiple wireless devices. The at least one message may comprise an RRC message, for example, an RRC connection reconfiguration message, an RRC connection reestablishment message, and/or an RRC connection setup message. The wireless device may monitor a PDCCH on a search space and/or on a control resource set for detecting the DCI, for example, if the wireless device is configured with the second group common RNTI.

Figure 16:
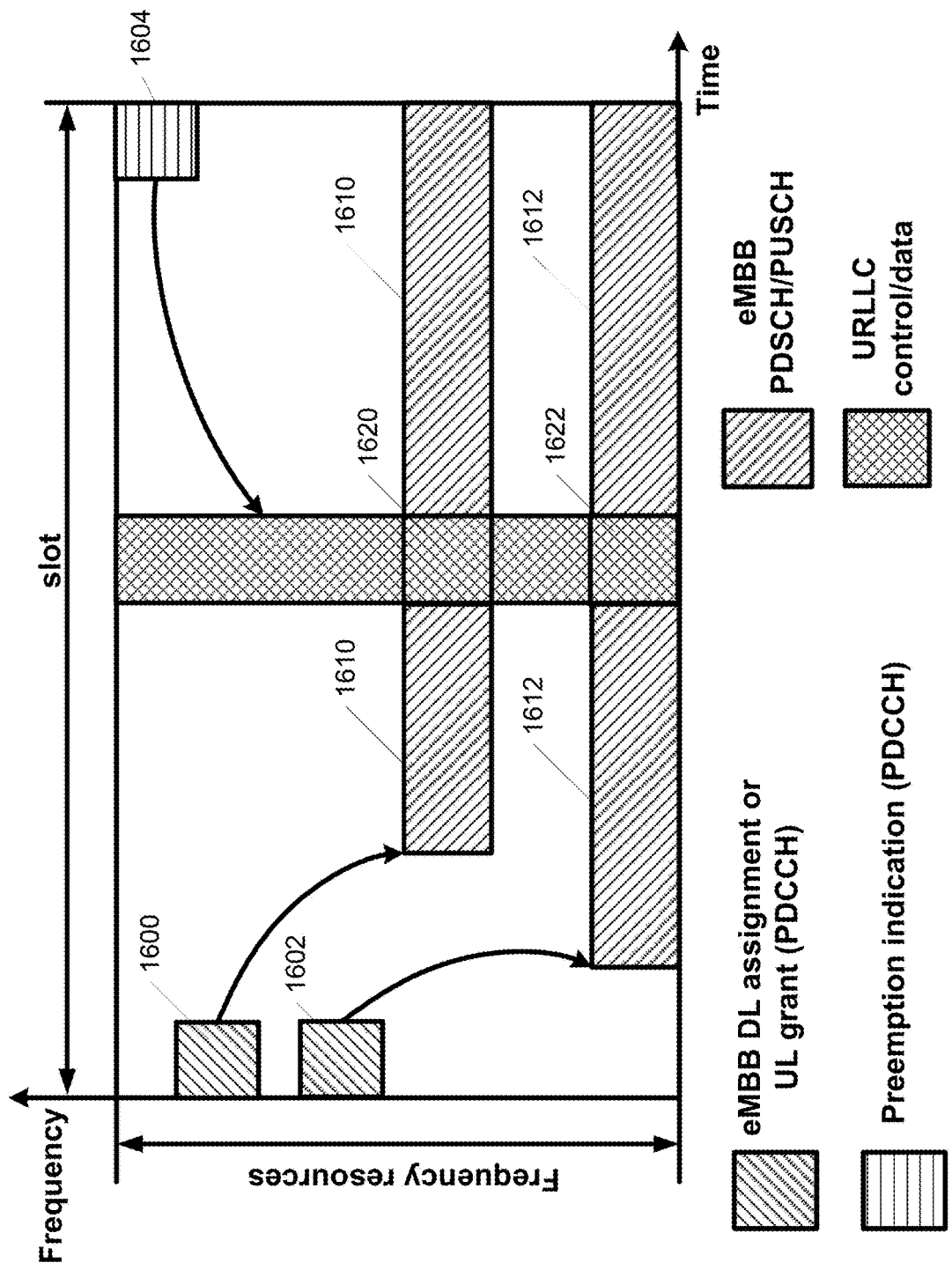
FIG. 16 shows an example of preemption control signaling.

FIG. 16 shows an example of preemption control signaling. The preemption control signaling may be applicable for a downlink preemption control or an uplink preemption control. A base station may multiplex first data (e.g., URLLC data) and second data (e.g., eMBB data) on a PDSCH. The base station may send (e.g., transmit) first DCI 1600, via a first PDCCH for a first wireless device, indicating a first downlink assignment in a slot. The base station may send (e.g., transmit) second DCI 1602, via a second PDCCH for a second wireless device, indicating a second downlink assignment in the slot. The base station may send (e.g., transmit), to at least one wireless device, at least one message comprising parameters indicating a first RNTI value (e.g., INT-RNTI) for detecting third DCI 1604 comprising a preemption indication (e.g., a downlink preemption indication and/or an uplink preemption indication). The first RNTI may be the same for each of the at least one wireless device. The at least one message may further comprise a first control resource set, and/or a first search space (e.g., a common search space or a wireless device specific search space) for detecting the third DCI 1604 comprising the preemption indication.

The base station may send (e.g., transmit), via a third PDCCH on the first control resource set and/or the first search space, the third DCI 1604 to the at least one wireless device (e.g., the first wireless device and/or the second wireless device). The third DCI 1604 may be of a DCI format (e.g., DCI format 2_1) and of a CRC scrambled by the first RNTI. The third DCI 1604 may comprise fields indicating whether one or more downlink radio resources are preempted. The one or more downlink radio resources may be indicated in the at least one message. The base station may send (e.g., transmit) the third DCI 1604 at the end of the slot or at the beginning of the next slot. Resources 1620 and resources 1622 may be indicated as preempted. The third DCI 1604 may be used for indicating uplink preemption. The third DCI 1604 may be sent (e.g., transmitted) before or during an eMBB uplink transmission, for example, if indicating uplink preemption on a PUSCH. The wireless device may stop and/or pause the eMBB transmission in a preempted PUSCH, for example, based on the third DCI 1604.

The first wireless device may detect the third DCI 1604 received via the first control resource set and/or the first search space, for example, if the wireless device is configured with the first RNTI. The first wireless device may buffer the received data on the PDSCH 1610. The first wireless device may buffer the received data on the PDSCH 1610 before decoding, for example, if the third DCI 1604 is configured to be sent (e.g., transmitted) at the end of the slot. The first wireless device may puncture the received data on resource 1620, for example, if the first wireless device determines that the resource 1620 is preempted (e.g., which may be indicated by the third DCI 1604). The first wireless device may decode the downlink data by using the buffered data after the puncturing, for example, if the first wireless device determines that the resource 1620 is preempted (e.g., which may be indicated by the third DCI 1604). The second wireless device may detect the third DCI 1604 received via the first control resource set and/or the first search space, for example, if the second wireless device is configured with the first RNTI. The second wireless device may buffer the received data on the PDSCH 1612. The second wireless device may buffer the received data on the PDSCH 1612 before decoding, for example, if the third DCI 1604 is configured to be sent (e.g., transmitted) at the end of the slot. The second wireless device may puncture the received data via the resource 1612, for example, if the second wireless device determines that resource 1622 is preempted (e.g., which may be indicated by the third DCI 1604). The second wireless device may decode the downlink data by using the buffered data after the puncturing, for example, if the second wireless device determines that resource 1622 is preempted (e.g., which may be indicated by the third DCI 1604).

The third DCI 1604 may comprise one or more fields indicating whether one or more radio resources are preempted. The one or more radio resources may be indicated in the at least one message. The third DCI 1604 may comprise one preemption indicator and/or a DCI format indicator, for example, if a wireless device (e.g., the first wireless device, the second wireless device, etc.) is configured with one cell. The DCI format indicator may indicate the third DCI 1604 is used to send (e.g., transmit) the one preemption indicator, if the DCI format indicator is set to a first value. One or more bits of the preemption indicator may correspond to one of the one or more radio resources. The correspondence between a bit in the preemption indicator and a radio resource may be indicated by the at least one message. A radio resource associated with a bit of the preemption indicator may be preempted, for example, if the bit of the preemption indicator is set to a first value, such as one. A radio resource associated with a bit of the preemption indicator may not be preempted, for example, if the bit of the preemption indicator is set to a second value, such as zero.

The third DCI 1604 may comprise multiple preemption indicators and/or a DCI format indicator, for example, if a wireless device (e.g., the first wireless device, the second wireless device, etc.) is configured with multiple cells. The DCI format indicator may indicate the third DCI 1604 may be used to send (e.g., transmit) the multiple preemption indicators, for example, if the DCI format indicator is set to a first value. One or more of the multiple preemption indicators may correspond to one of the multiple cells. The correspondence between a preemption indicator and a cell may be indicated by the at least one message. One or more bits of a preemption indicator may correspond to one of multiple radio resources of a cell corresponding to the preemption indicator, for example, if the cell is associated with the preemption indicator. The correspondence may be indicated by the at least one message. A radio resource associated with a bit of a preemption indicator, on a cell associated with the preemption indicator, may be preempted, for example, if the bit of the preemption indicator is set to a first value, such as one. A radio resource associated with a bit of a preemption indicator, on a cell associated with the preemption indicator, may not be preempted, for example, if the bit of the preemption indicator is set to a second value, such as zero.

A base station may send (e.g., transmit) fourth DCI for a third wireless device (e.g., a URLLC wireless device, a vehicle-to-everything (V2X) wireless device, an Internet-of-Things (IoT) wireless device, etc.) indicating a downlink assignment for a transmission comprising URLLC data, V2X data, IoT data, or any other type of data. The downlink assignment may be overlapped with PDSCH 1610 and/or PDSCH 1612. The base station may send (e.g., transmit) URLLC data, for the third wireless device via the resource 1620 and/or the resource 1622, that may be indicated as preempted by the third DCI 1604. The third wireless device may receive the URLLC data on the slot, for example, after receiving the fourth DCI. This procedure may reduce the transmission latency by not waiting for the next slot. The first wireless device may receive the data transmitted on PDSCH 1610, for example, after receiving the third DCI 1604. The first wireless device may identify that the resource 1620 is not for the first wireless device. The first wireless device may determine that the corresponding data received on the resource 1620 may be punctured. The second wireless device may receive the data transmitted on PDSCH 1622. The second wireless device may identify that the resource 1622 is not for the second wireless device. The second wireless device may determine that the corresponding data received on the resource 1622 may be punctured.

Figure 17:
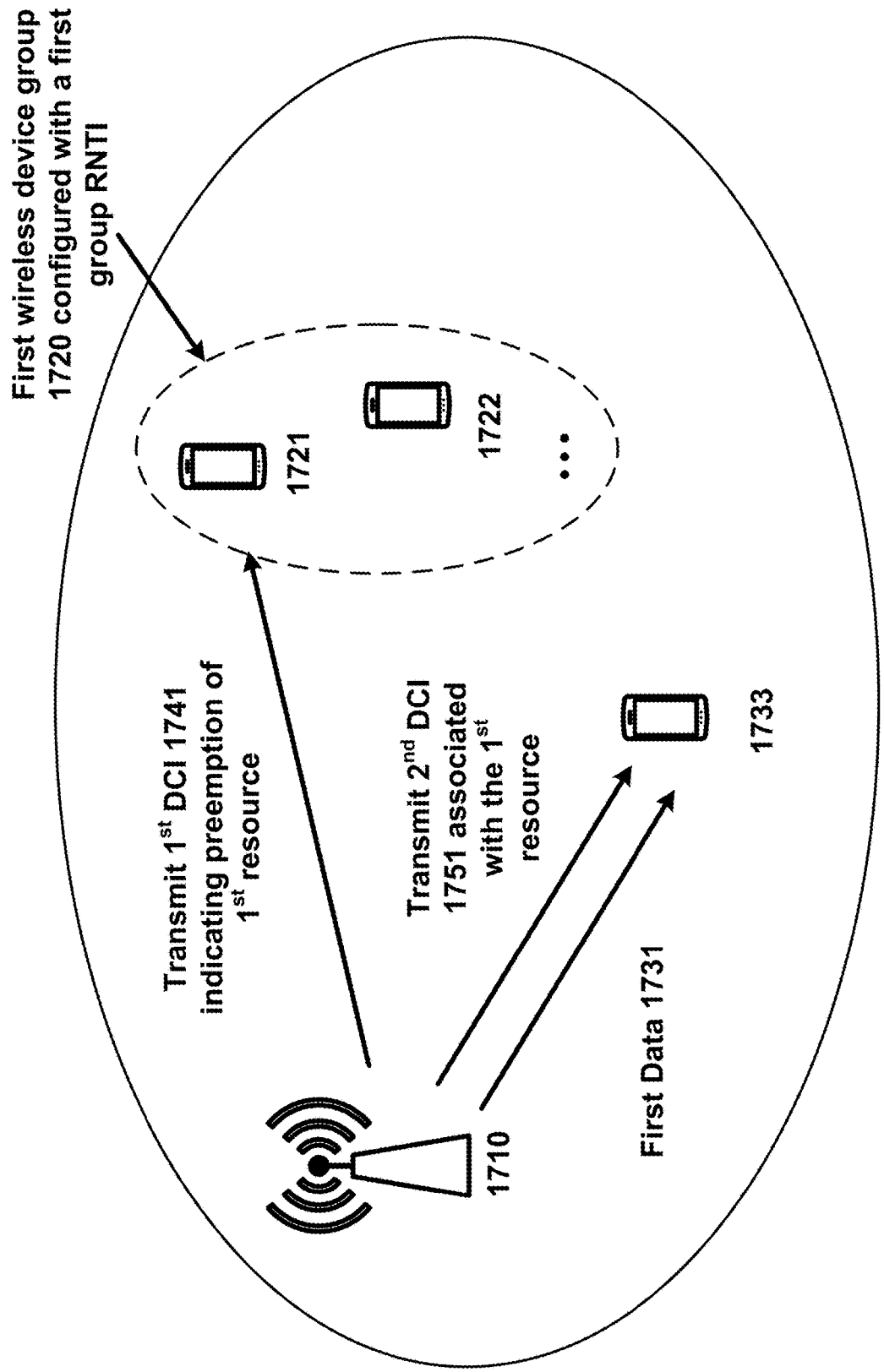
FIG. 17 shows an example of preemption control signaling.

FIG. 17 shows an example of preemption control signaling. The preemption control signaling may be applicable for a downlink preemption control or an uplink preemption control. A base station 1710 may multiplex downlink transmissions with different transmission durations and/or reliability requirements. A wireless device 1721 and a wireless device 1722 may be configured with a first group RNTI. The wireless device 1721 or the wireless device 1722 may send (e.g., transmit) or receive one or more data packets for a first transmission duration (e.g., 1 slot, a transmission duration of the PDSCH 1610, a transmission duration of the PDSCH 1612, etc.). The wireless device 1733 may be capable of sending (e.g., transmitting) or receiving one or more data packets for a second transmission duration (e.g., less than 1 slot, such as 1, 2, or several symbols, a transmission duration in the resources 1620 and 1622, etc.). The wireless device 1721 may send or receive first data (e.g., the wireless device 1721 may receive a first DL packet via a first DL assignment or send a first UL packet via a first UL grant). The wireless device 1722 may send or receive second data (e.g., the wireless device 1722 may receive a second DL packet via a second DL assignment or send a second UL packet via a second UL grant). The base station may send (e.g., transmit) first DCI 1741 addressed to the first group RNTI indicating whether one or more radio resources (e.g., DL radio resources or UL radio resources) are preempted (or reserved for other wireless devices, such as the wireless device 1733) or not preempted. The first DCI 1741 may be scrambled with the first group RNTI. The first DCI 1741 may be similar to the third DCI 1604. The wireless device 1721 may puncture the first data on a first one of the one or more radio resources, for example, if the first DCI 1741 indicates the first one of the one or more radio resources is preempted and if the first DL assignment or the first UL grant indicates a data transmission in the first one of the one or more radio resources. The wireless device 1721 may decode the first data without puncturing, for example, if the first DCI 1741 does not indicate the one or more radio resources are preempted. The wireless device 1722 puncture the second data on a second one of the one or more radio resources, for example, if the first DCI 1741 indicates the second one of the one or more radio resources is preempted and if the second DL assignment or the second UL grant indicates a data transmission in the second one of the one or more radio resources. The wireless device 1722 may decode the second data without puncturing, for example, if the first DCI 1741 does not indicate the one or more radio resources are preempted. The first one of the one or more radio resources and the second one of the one or more radio resources may comprise the same time resource(s). The base station 1710 may send (e.g., transmit) second DCI 1751 for the wireless device 1733 indicating a third DL assignment associated with a third one of the one or more radio resources (or indicating a third UL grant associated with the third one of the one or more radio resources). The wireless device 1733 may receive a downlink packet (or send an uplink packet) via the third one of the one or more radio resources, for example, based on detecting the second DCI 1751. The third one of the one or more radio resources may be overlapped with the first one of the one or more radio resources and with the second one of the one or more radio resources.

A base station may send (e.g., transmit), to a group of wireless device, a wireless device group common DCI indicating downlink preemption information, for example, for multiplexing URLLC data and eMBB data in a downlink transmission. The wireless device group common DCI may have DCI format 2_1 and may be CRC scrambled by a wireless device group RNTI (e.g., INT_RNTI). The group common signaling using the wireless device group common DCI may reduce downlink signaling overhead, instead of sending different DCIs for each wireless device of the group of wireless devices for a preemption indication.

Data with different durations (e.g., URLLC data and eMBB data) may be multiplexed in downlink for one or more wireless devices. A base station may send (e.g., transmit) a group common signal (e.g., DCI with DCI format 2_1 and CRC scrambled by INT-RNTI) to a group of wireless devices (e.g., including a first wireless device), indicating whether one or more radio resources in one or more slots are preempted, for example, if the base station multiplexes a first type of data (e.g., eMBB data) of the first wireless device with a second type of data (e.g., URLLC data) of a second wireless device. The base station may reliably send (e.g., transmit) the URLLC data for the second wireless device via the one or more radio resources, for example, based on the group common signaling.

A wireless device may have data (e.g., URLLC data) to be sent within a short duration (e.g., a transmission duration shorter than a transmission duration for eMBB data) in an uplink slot. A transmission of the URLLC data may be more urgent than a transmission of the eMBB data. It may be preferable (e.g., necessary) to schedule an uplink radio resource for the transmission of the URLLC data in the uplink slot as soon as possible. There may be no available uplink radio resource in the uplink slot, for example, if uplink radio resources are fully allocated to other wireless devices. The URLLC data may be scheduled with a higher priority over other scheduled data (e.g., eMBB data). It may be beneficial to stop and/or suspend an ongoing uplink transmission (e.g., eMBB data or other scheduled data) on one or more uplink radio resources, for example, to schedule the URLLC data quickly. One or more group common signaling schemes may not support multiplexing of uplink transmissions with different transmission durations or reliabilities (e.g., multiplexing URLLC data with eMBB data). Group common signaling may be configured and provided to support multiplexing of uplink transmissions with different durations and/or reliabilities.

A base station may be capable of receiving, from multiple wireless devices, multiplexed data packets on an uplink radio resource, for example, by using an interference cancellation. The base station may detect a first data packet transmitted from a first wireless device. The base station may detect one or more second data packet transmitted from at least one second wireless device, for example, by cancelling interference caused by the first data packet multiplexed with the one or more second data packet. The capability of detecting the one or more second data packet based on one or more interference cancelation algorithms may allow the base station to flexibly schedule uplink data with different transmission duration, for example, if the interference is in a tolerable range.

A base station may send, to a plurality of wireless devices, power control indications, for example, if the base station is capable of receiving, from the plurality of wireless devices, multiplexed data packets sent (e.g., transmitted) on one or more uplink radio resources. The power control indications may be used to control (e.g., limit, reduce, etc.) interference on first data (e.g., URLLC data). A power control signaling may be used, by the base station, to control the interference within a tolerable range and to detect the first data, for example, if multiplexing of data transmissions is performed with different transmission durations. A base station may send (e.g., transmit) a power control command in first DCI addressed to a wireless device or a power control command in second DCI addressed to a group of wireless devices.

FIG. 18A shows an example of a power control command transmission. A base station 1810A may send (e.g., transmit) a transmission power control (TPC) command comprised in DCI addressed to a wireless device (e.g., a wireless device 1820A in FIG. 18A). The DCI may comprise an uplink grant with a particular DCI format (e.g., DCI format 0_0 or 0_1). The wireless device 1820A may send (e.g., transmit) an uplink signal with a transmission power determined based on the TPC command.

FIG. 18B shows an example of a power control command transmission. A base station 1810B may send (e.g., transmit) one or more transmission power control (TPC) commands comprised in DCI addressed to a group of wireless devices 1820B. The DCI may comprise indications of TPC commands for PUCCH and/or PUSCH transmission. The DCI may be sent (e.g., transmitted) on a PDCCH with a first DCI format (e.g., DCI format 2_2). The DCI may be addressed to a group of wireless devices associated with a group RNTI (e.g., TPC-PUCCH-RNTI, TPC-PUSCH-RNTI, etc.). The DCI may comprise indications of TPC commands for SRSs, and the DCI may be sent (e.g., transmitted) on a PDCCH with a second DCI format (e.g., DCI format 2_3). The DCI may be addressed to a group of wireless devices associated with a group RNTI (e.g., TPC-SRS-RNTI).

Figure 19:
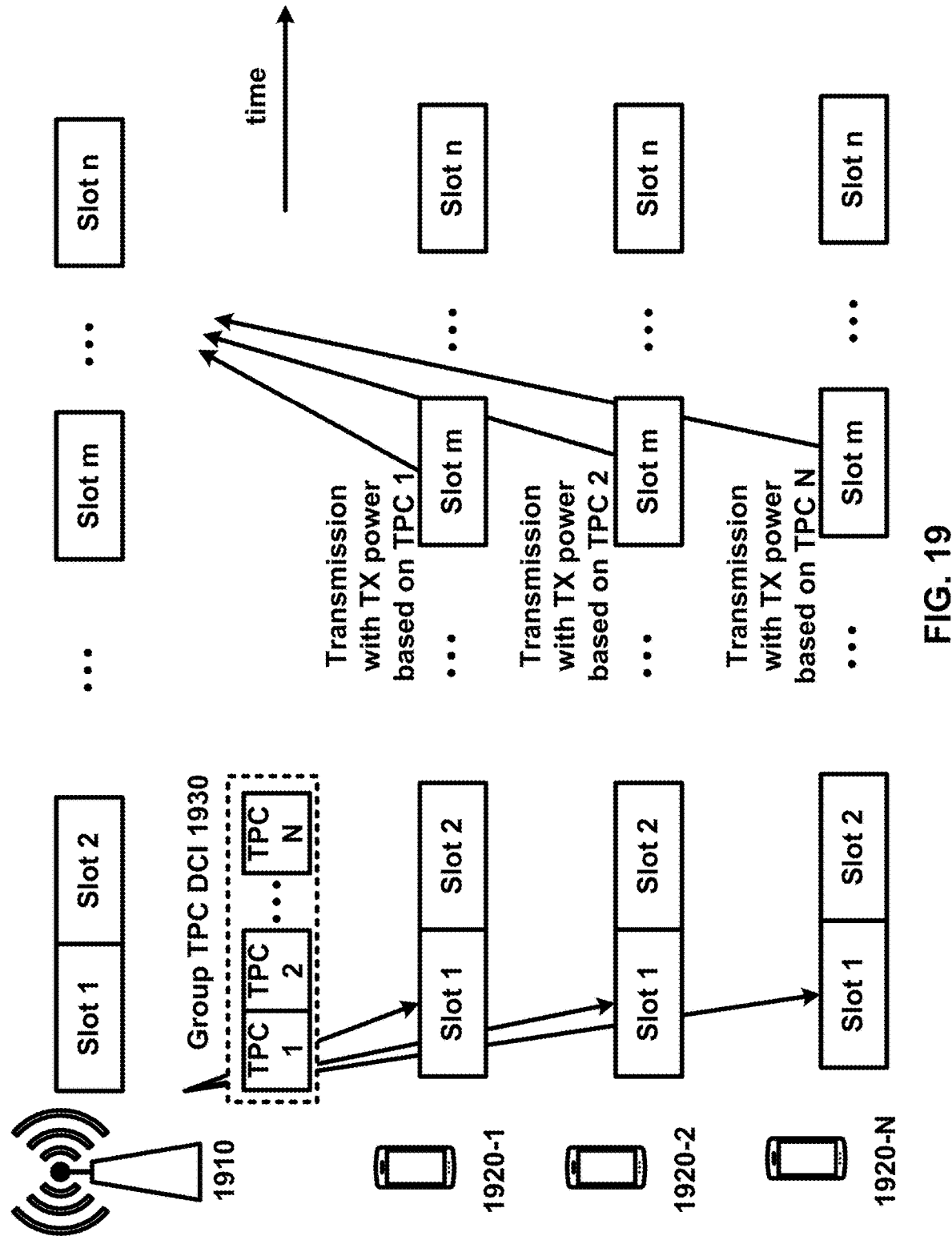
FIG. 19 shows an example of an uplink transmission power adjustment based on a power control command.

FIG. 19 shows an example of an uplink transmission power adjustment based on a power control command. A base station may send (e.g., transmit) one or more TPC commands (e.g., N TPC commands) comprised in DCI 1930 addressed to one or more wireless devices. TPC command 1 in the DCI 1930 may be associated with a wireless device 1920-1. TPC command 2 in the DCI 1930 may be associated with a wireless device 1920-2. TPC command N in the DCI 1930 may be associated with a wireless device 1920-N. The association between a TPC command and a wireless device may be configured by one or more messages (e.g., an RRC message).

The one or more wireless devices 1920-1, 1920-2, . . . , 1920-N may determine a transmission power according to the one or more TPC commands in the DCI 1930. The wireless device 1920-1 may send (e.g., transmit) a first uplink signal with a first transmission power based on the TPC command 1. The wireless device 1920-2 may send (e.g., transmit) a second uplink signal with a second transmission power based on the TPC command 2. The wireless device 1920-N may send (e.g., transmit) an Nth uplink signal with an Nth transmission power based on the TPC command N. The time for applying a TPC command may depend on a system configuration (e.g., FDD or TDD). A wireless device may determine a transmission power of an uplink transmission to be sent in slot 5, based on a TPC command received in slot 1, for example, in an FDD system. A time gap between a TPC command reception and an uplink transmission may be differently configured, for example, in a TDD system.

A TPC command in DCI may be a bit string in a length (e.g., bitwidth) of 1 or 2 bits. A TPC command with a first TPC value (e.g., "00") may indicate a first power adjustment value (e.g., −1 dB). A wireless device may reduce, based on the first power adjustment value (e.g., −1 dB), a transmission power of a next transmission from the current transmission power, for example, if the wireless device determines that the TPC command indicates the first TPC value (e.g., "00"). A wireless device may reduce a transmission power at most by 1 dB or increase a transmission power at most by 3 dB, according to a TPC command of one or more power control configurations.

A base station may indicate a wireless device to stop (or suspend) an ongoing uplink transmission or may indicate a wireless device to reduce, based on interference cancellation capability of the base station, a transmission power for the ongoing uplink transmission, for example, if the base station and/or the wireless device support multiplexing uplink transmissions with different transmission durations. Some power control procedures (e.g., the power control procedure shown in FIG. 18A) may not be efficient in terms of DCI overhead, because each involved wireless device (e.g. in a group of wireless devices) in multiplexing may be indicated with individual DCI addressed to that wireless device. Some power control procedures (e.g., the power control procedure shown in FIG. 18B) may not support an indication of stopping (or suspending) an ongoing uplink transmission. Some power control procedures (e.g., both the power control procedure shown in FIG. 18A and the power control procedure shown in FIG. 18B) may not support an indication of a power reduction with more than 1 dB, for example, since the TPC command in the power control procedures may at most indicate −1 dB. A greater power reduction (e.g., reducing more than 1 dB) may be necessary to ensure that interference on a first type of data (e.g., an URLLC data packet) is in a tolerable range. An efficient power control and/or interference control procedure for supporting multiplexing uplink transmission with different transmission durations and/or reliabilities may be configured.

Figure 20:
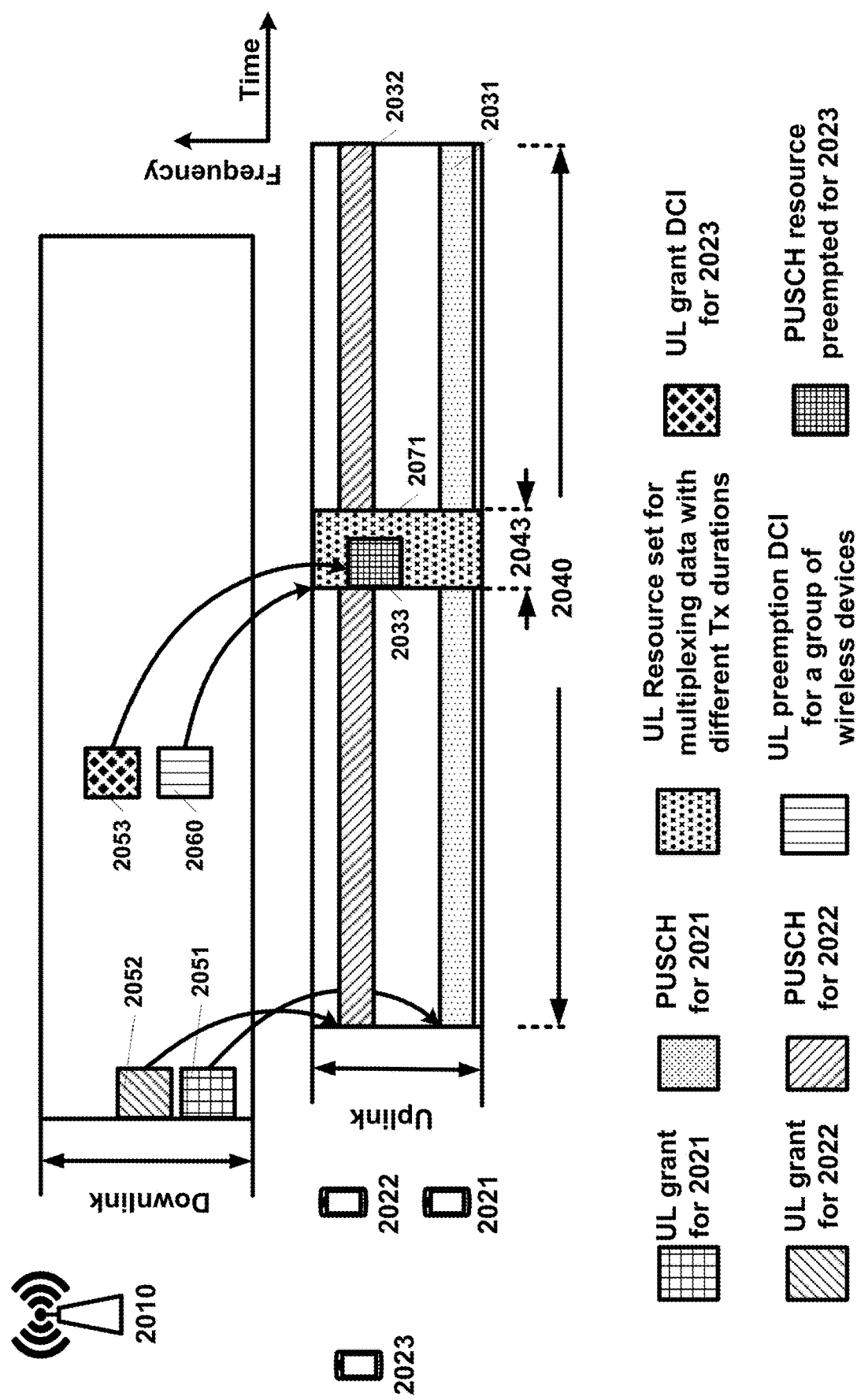
FIG. 20 shows an example of signaling for multiplexing uplink data with different transmission durations.

FIG. 20 shows an example of signaling for multiplexing uplink data with different transmission durations. A base station may send (e.g., transmit), to one or more wireless devices of a group of wireless devices (e.g., wireless devices 2021 and 2022), at least one first message comprising parameters indicating at least one of: an RNTI value and/or a DCI format. The RNTI value may be a value for a group RNTI which may be the same for the group of wireless devices. The DCI format may be DCI format 2_1, DCI format 2_2, DCI format 2_3, or other DCI formats.

The RNTI value may be different from a second RNTI (e.g., INT-RNTI), for example, if the DCI format is DCI format 2_1. The RNTI value may be different from a third RNTI (e.g., TPC-PUCCH-RNTI or TPC-PUSCH-RNTI), for example, if the DCI format is DCI format 2_2. The RNTI value may be different from a fourth RNTI (e.g., TPC-SRS-RNTI), for example, if the DCI format is DCI format 2_3. A base station and/or a wireless device may correctly determine content and/or information in the DCI, for example, by associating different RNTI values with different group common signaling while using the same DCI format.

The wireless device 2021 may be identified by a first C-RNTI. The wireless device 2022 may be identified by a second C-RNTI. A wireless device 2023 may be identified by a third C-RNTI. The wireless device 2021 may send (e.g., transmit) one or more uplink data within a first transmission duration 2040 (e.g., in one or more slots). The wireless device 2022 may send (e.g., transmit) one or more uplink data 2022 within the first transmission duration 2040 (e.g., in one or more slots). The wireless device 2023 may send (e.g., transmit) one or more uplink data 2033 within a second transmission duration 2043 (e.g., in less than one slot, such as 1, 2 or several symbols).

The at least one first message may further comprise at least one of: a first control resource set, a first search space, a first monitoring periodicity, and/or at least a set of multiple uplink radio resources for the group of wireless devices. Each of multiple uplink radio resources may be identified by at least one of: a time resource, a frequency resource, a beam index, and/or an orthogonal code index. The base station may send (e.g., transmit) at least one second message comprising parameters indicating at least one of: a second control resource set, a second search space, and/or a second monitoring periodicity for the wireless device 2023.

The wireless device 2021 may send (e.g., transmit) first uplink data via a first PUSCH resource 2031 allocated via a first uplink grant 2051. The wireless device 2022 may send (e.g., transmit) second uplink data via a second PUSCH resource 2032 allocated via a second uplink grant 2052.

The base station 2010 may send (e.g., transmit) first DCI 2060 addressed to the first RNTI (e.g., for the group of wireless devices comprising the wireless devices 2021 and 2022). The first DCI 2060 may be sent via the first control resource set and/or the first search space of a PDCCH with the first periodicity (e.g., in a first slot or in a first symbol duration). The first DCI 2060 with the DCI format may comprise at least one of: a TPC command and/or one preemption indicator comprising a number of bits (e.g., 7 or 14 bits).

Figure 21:
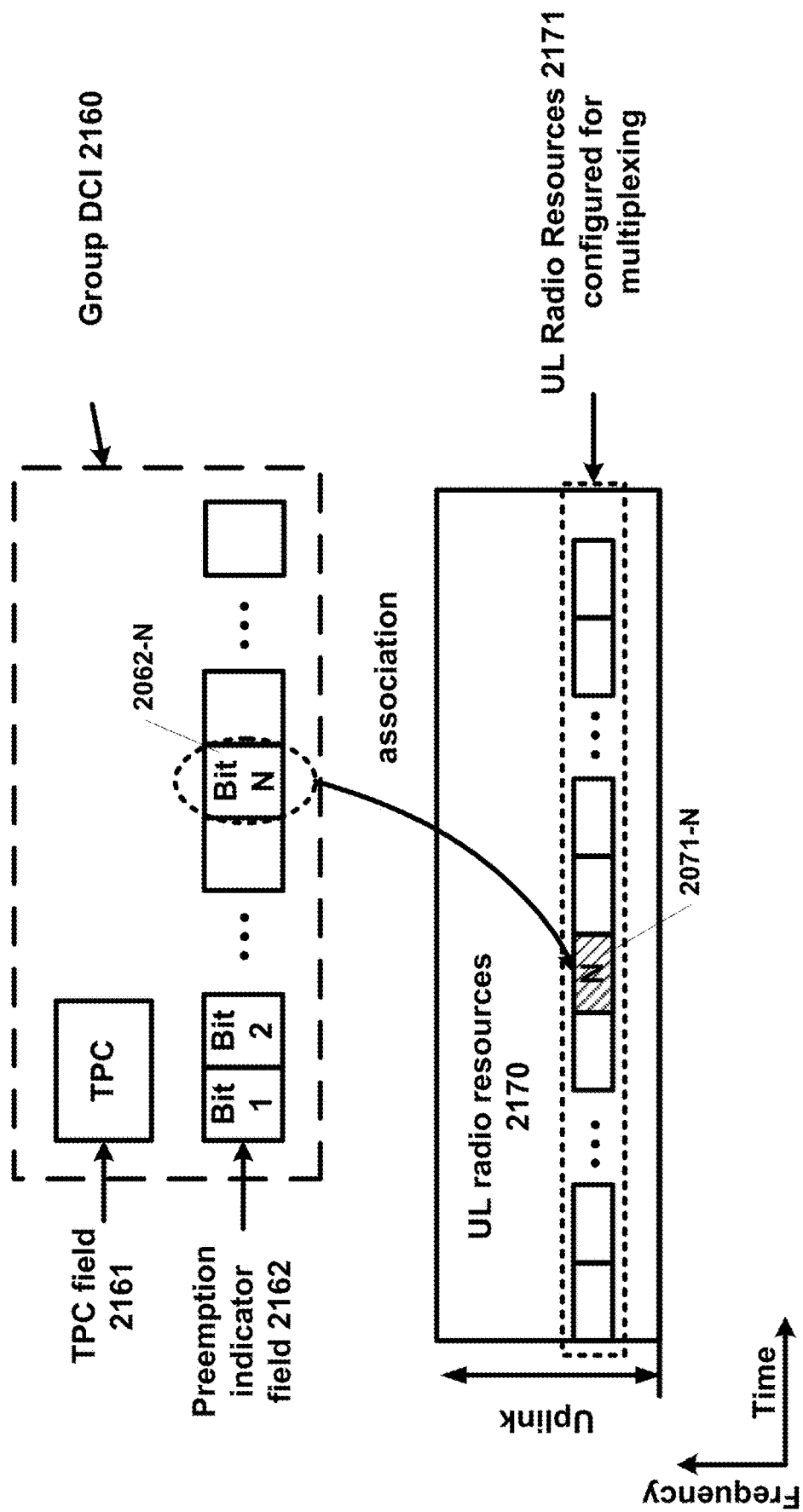
FIG. 21 shows an example of DCI signaling for multiplexing uplink data with different transmission durations.

FIG. 21 shows an example of DCI signaling for multiplexing uplink data with different transmission durations. Group DCI 2160 (e.g., the first DCI 2060) may comprise a TPC field 2161 and a preemption indicator field 2162. The TPC field 2161 may comprise one or more values of one or more TPC commands. The preemption indicator field 2162 may comprise one or more values of one or more preemption indicators. Each bit of the one or more preemption indicators may be associated with one of multiple uplink radio resources 2171. The multiple uplink radio resources 2171 (e.g., multiple uplink radio resources 2071 of FIG. 20) may comprise frequency and time resources configured for multiplexing uplink data with different transmission durations. The first bit of the one or more preemption indicators may be associated with the first uplink radio resource of the multiple uplink radio resources 2171. The Nth bit 2162-N of the one or more preemption indicators may be associated with the Nth uplink radio resource 2171-N of the multiple uplink radio resources 2171.

Each TPC command may have a value represented by a number of bits (e.g., 1 or 2 bits). A TPC command may indicate a power reduction value based on the value of the TPC command. A power reduction corresponding to a first value (e.g., zero) of the TPC command may be a first dB value (e.g., 3 dB), for example, if the TPC command has a value of 1 bit. A power reduction corresponding to a second value (e.g., one) of the TPC command may be a second dB value (e.g., 6 dB), for example, if the TPC command has a value of 1 bit. A power reduction corresponding to a first value (e.g., "00") of the TPC command may be a first dB value (e.g., 1 dB), a power reduction corresponding to a second value (e.g., "01") of the TPC command may be a second dB value (e.g., 3 dB), a power reduction corresponding to a third value (e.g., "10") of the TPC command may be a third dB value (e.g., 6 dB), and a power reduction corresponding to a fourth value (e.g., "11") of the TPC command may be a fourth dB value (e.g., 9 dB), for example, if the TPC command has a value of 2 bits.

The one or more preemption indicators in the group DCI 2160 may indicate whether one or more resources of the multiple uplink radio resources 2171 are preempted (e.g., reserved) or not. One of the multiple uplink radio resources 2171 associated with a bit of the preemption indicator field 2162 may not be preempted, for example, if the bit of the preemption indicator field 2162 is set to a first value (e.g., zero). One of the multiple uplink radio resources 2171 associated with a bit of the preemption indicator field 2162 may be preempted, for example, if the bit of the preemption indicator field 2162 is set to a second value (e.g., one). A wireless device (e.g., the wireless devices 2021 and 2022) may determine that an uplink radio resource being preempted as an uplink radio resource being assigned for other wireless devices.

The wireless device 2021 of FIG. 20 may determine whether one or more resources of the multiple uplink radio resources 2071 are preempted or not, for example, based on a preemption indicator field comprised in the first DCI 2060. The wireless device 2022 may adjust a transmission power for a PUSCH transmission scheduled on one or more preempted resources of the second PUSCH resource 2032, for example, based on a TPC command field and the preemption indicator field of the first DCI 2060.

Figure 22A:
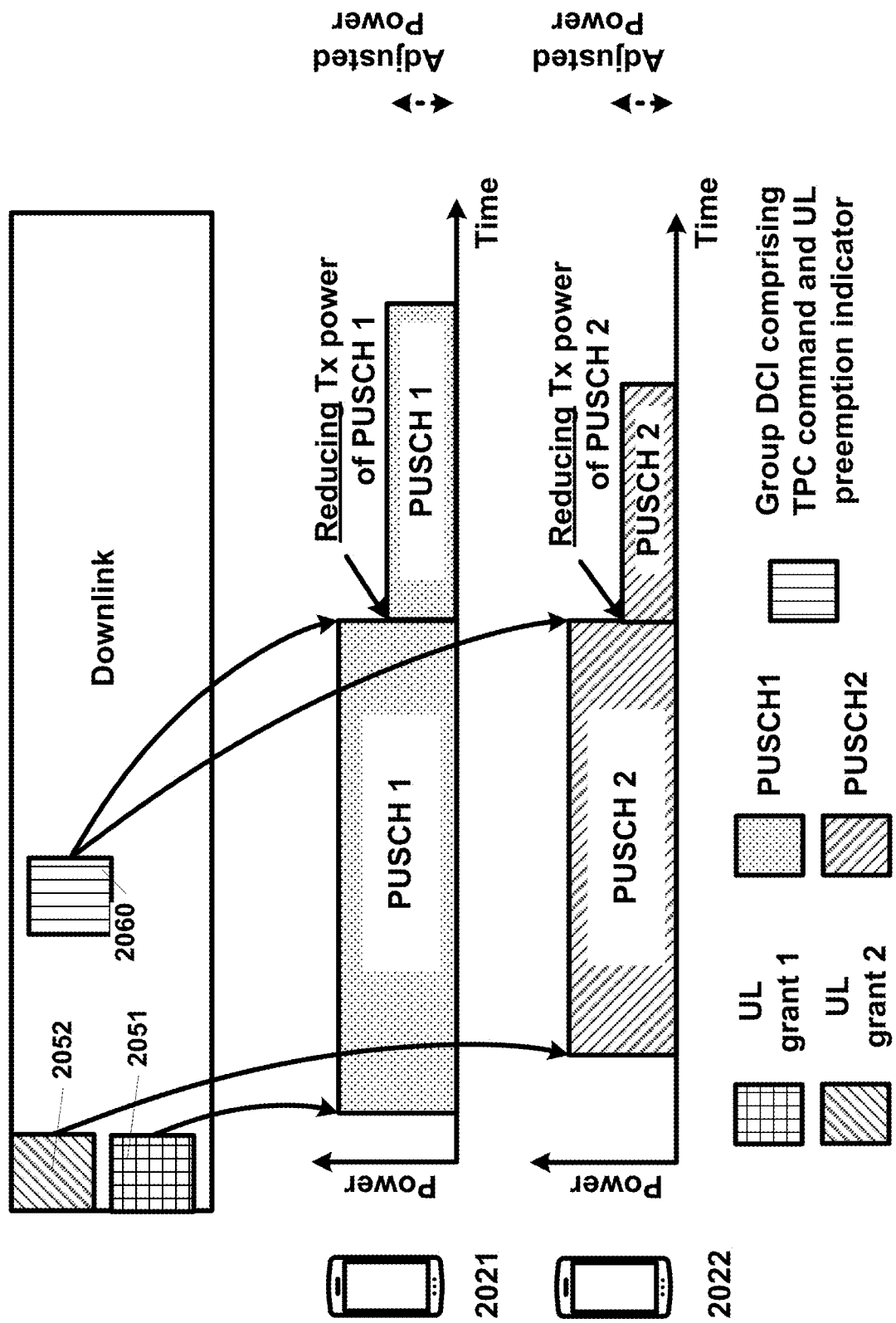
FIG. 22A shows an example of a power control for multiplexing uplink data with different transmission durations.
Figure 22B:
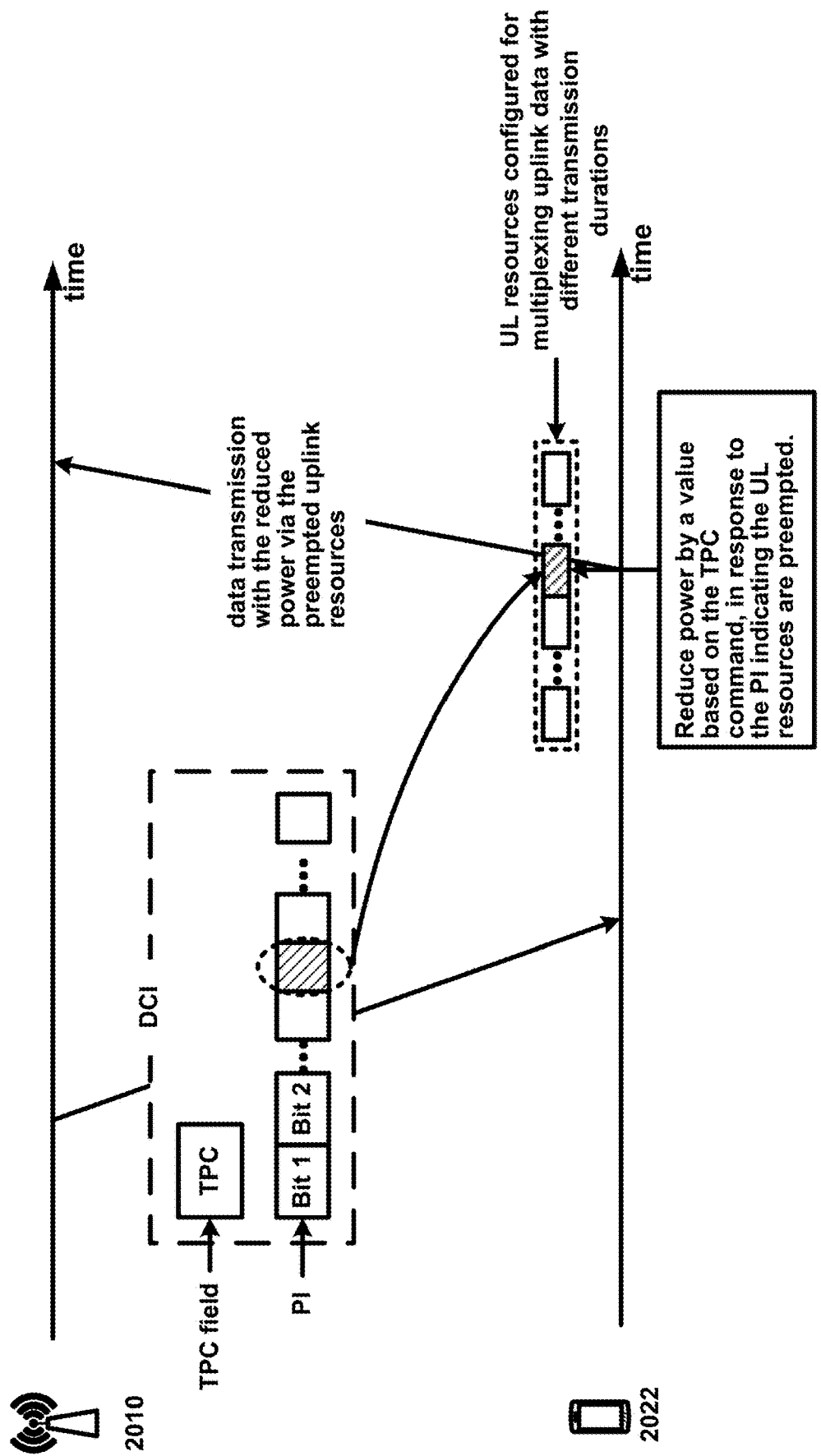
FIG. 22B shows an example of DCI signaling for multiplexing uplink data with different transmission durations.

FIG. 22A shows an example of a power control for multiplexing uplink data with different transmission durations. FIG. 22B shows an example of DCI signaling for multiplexing uplink data with different transmission durations. The first PUSCH resource 2031 may comprise at least one of the multiple uplink radio resources 2071. The at least one of the multiple uplink radio resources 2071 may be preempted, and the preemption may be indicated by the first DCI 2060. The wireless device 2021 may determine a power reduction, for example, based on a value of the TPC command field of the first DCI 2060. The wireless device 2021 may determine an adjusted transmission power, for example, based on the power reduction and a normal transmission power. The normal transmission power may be a transmission power for a transmission via a non-preempted radio resource. The adjusted transmission power may be determined by reducing the normal transmission power by a value of the power reduction. The normal transmission power may be a transmission power with which the wireless device 2021 transmits the first uplink data before receiving the first DCI 2060. The wireless device 2021 may continue transmitting a subsequent portion of the first uplink data with the adjusted transmission power (e.g., in a second slot or in a second symbol duration).

Figure 23:
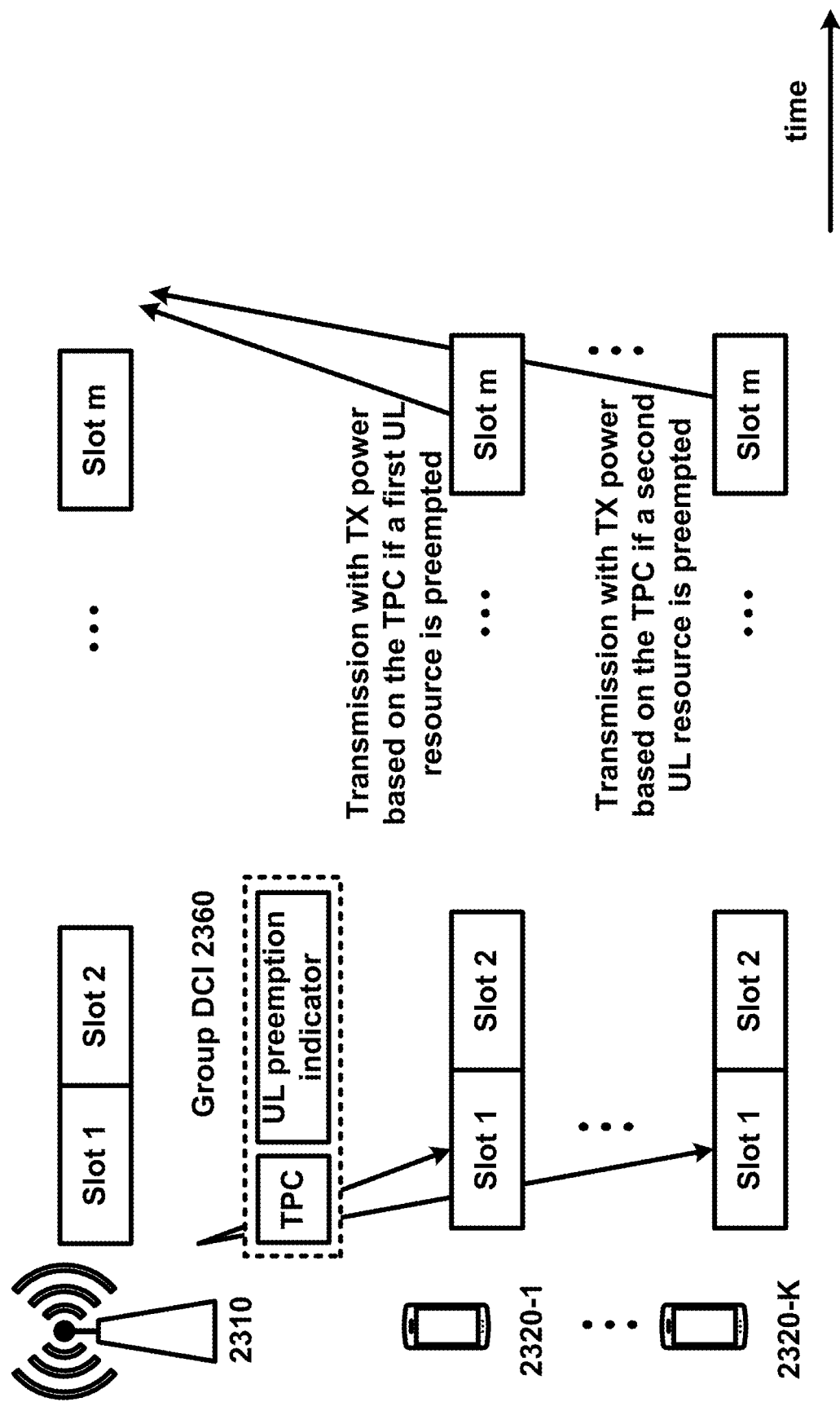
FIG. 23 shows an example of a power control for multiplexing uplink data with different transmission durations.

FIG. 23 shows an example of a power control for multiplexing uplink data with different transmission durations. The base station 2010 (e.g., the base station 2310) may send, to a plurality of wireless devices 2320-1, 2320-2, . . . , and 2320-K (e.g., the wireless devices 2021 and 2022), the first DCI 2060 (e.g., group DCI 2360) within the first slot (e.g., slot 1). The group DCI 2360 may comprise a TPC command field and a UL preemption indicator field. The plurality of wireless devices 2320-1, 2320-2, . . . , and 2320-K may send, to the base station 2310 and based on the TPC command field of the group DCI 2360, PUSCHs within the second slot (e.g., slot m). The transmission powers of the PUSCHs transmitted within the second slot may be adjusted based on a value of the TPC command field of the group DCI 2360. A duration of the second slot, or the second symbol duration, for applying the adjusted transmission power may be the same as a duration of the first slot, or a first symbol duration, for receiving the first DCI 2060. The second slot for applying the adjusted transmission power may begin a number of slots (e.g., 1, 2, 3, or 4 slots) after the first slot for receiving the first DCI 2060 (e.g., the DCI 2360). The second symbol duration for applying the adjusted transmission power may begin a number of symbols (e.g., 1, 2, . . . , or 13 symbols) after the first symbol duration for receiving the first DCI 2060.

The first PUSCH resource 2031 of FIG. 20 may comprise at least one of the multiple uplink radio resources 2071, which is not preempted (e.g., indicated by the first DCI 2060). The wireless device 2021 may continue to perform the first uplink data transmission without adjusting the normal transmission power (e.g., the TPC command for adjusting the normal transmission power may not be used for non-preempted resources).

The wireless device 2022 may determine whether the multiple uplink radio resources 2071 are preempted or not, for example, based on the preemption indicator field comprised in the first DCI 2060. The wireless device 2022 may adjust a transmission power for a PUSCH transmission scheduled on one or more preempted resources of the second PUSCH resource 2032, for example, based on the TPC command field and the preemption indicator field of the first DCI 2060. The second PUSCH resource 2032 may comprise at least one of the multiple uplink radio resources 2071, which may be preempted (e.g., the preemption may be indicated by the first DCI 2060). The wireless device 2022 may determine a power reduction, for example, based on a TPC command of the first DCI 2060. The wireless device 2022 may determine an adjusted transmission power for a next uplink transmission occasion in the multiple uplink radio resources 2071, for example, based on the power reduction and a normal transmission power of the wireless device 2022. The normal transmission power of the wireless device 2022 may be a transmission power, of the wireless device 2022, for an uplink transmission via a non-preempted radio resource. The wireless device 2022 may continue transmitting the second uplink data with the adjusted transmission power (e.g., in the second slot or in the second symbol duration). A duration of the second slot, or the second symbol duration, for applying the adjusted transmission power may be the same as a duration of the first slot, or the first symbol duration, for receiving the first DCI 2060. The second slot for applying the adjusted transmission power may begin a number of slots (e.g., 1, 2, 3, or 4 slots) after the first slot for receiving the first DCI 2060 (e.g., the DCI 2360). The second symbol duration for applying the adjusted transmission power may begin a number of symbols (e.g., 1, 2, . . . , or 13 symbols) after the first symbol duration for receiving the first DCI 2060.

The second PUSCH resource 2032 may comprise at least one of the multiple uplink radio resources 2071, which may not be preempted (e.g., the preemption may be indicated by the first DCI 2060). The wireless device 2022 may continue the second uplink data transmission without adjusting the normal transmission power (e.g., the TPC command for adjusting the normal transmission power may not be used for non-preempted resources).

A base station may send (e.g., transmit) second DCI (e.g., DCI 2053) addressed to one or more wireless devices (e.g., the wireless device 2023) associated with the third C-RNTI. The second DCI may indicate an uplink grant for the wireless device 2023. The uplink grant may comprise at least one of the multiple radio resources 2071. The wireless device 2023 may send (e.g., transmit), via the preempted resource(s) 2033 and based on the uplink grant, uplink data.

Figure 24A:
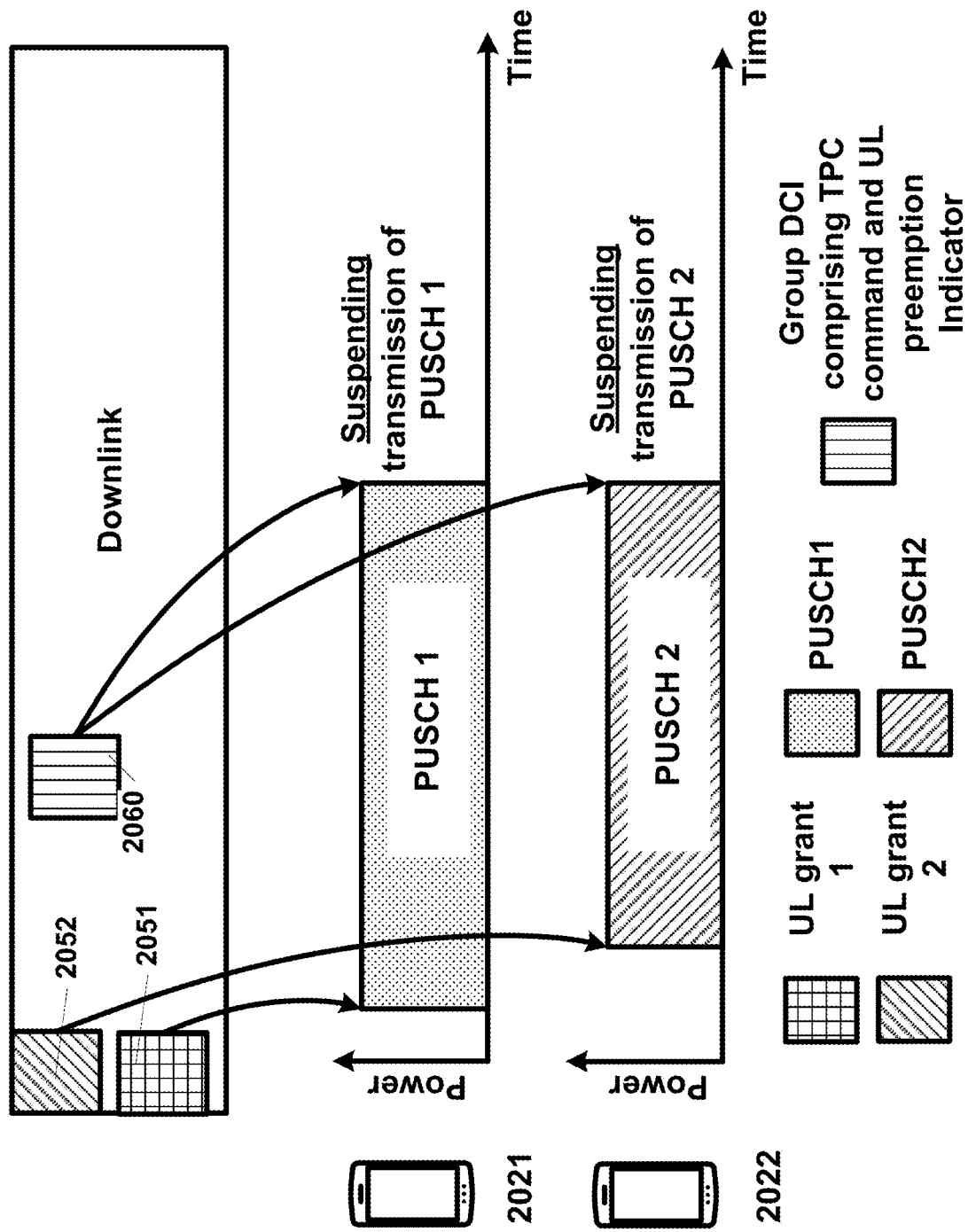
FIG. 24A shows an example of a power control for multiplexing uplink data with different transmission durations.
Figure 24B:
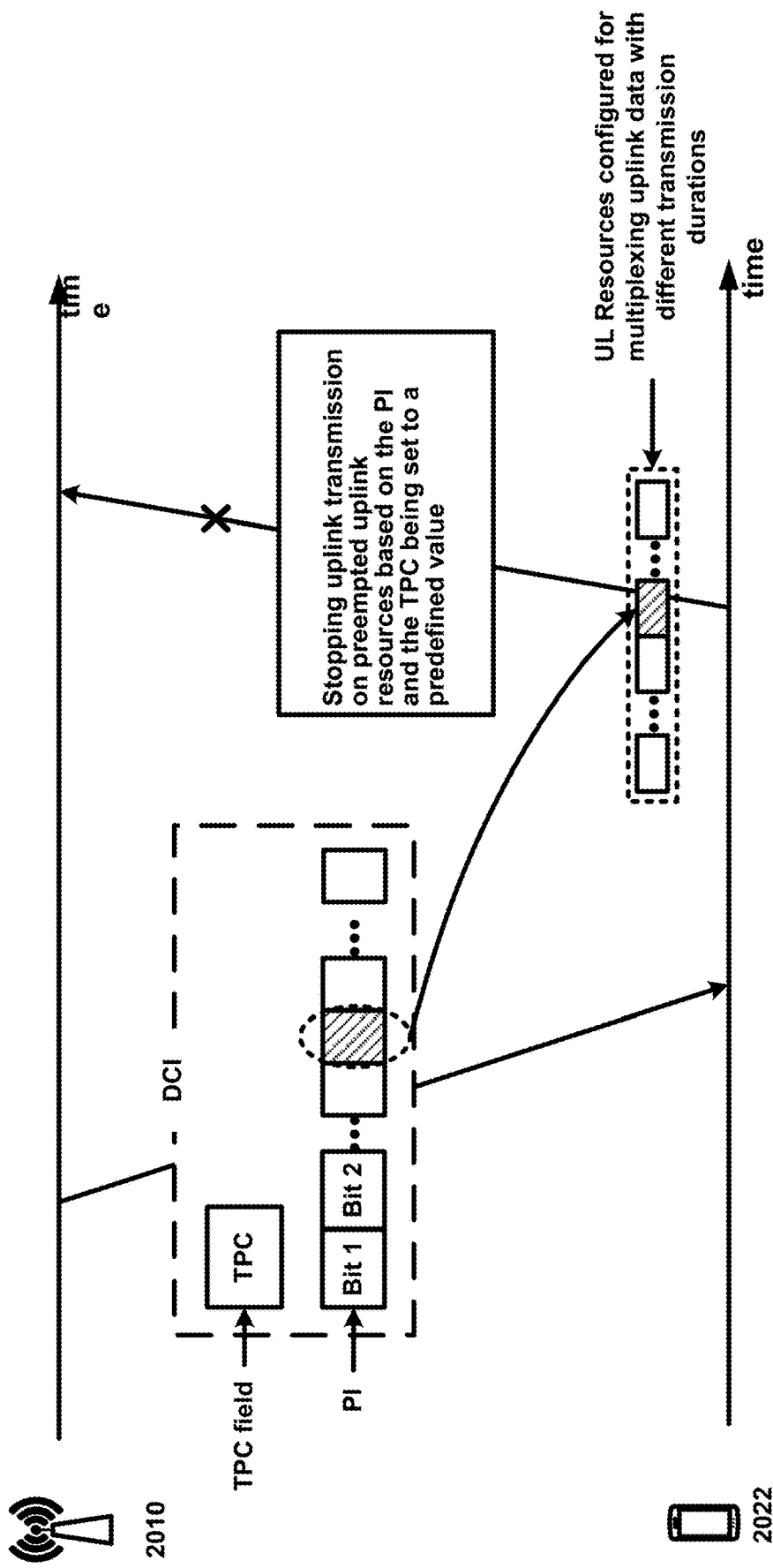
FIG. 24B shows an example of DCI signaling for multiplexing uplink data with different transmission durations.

FIG. 24A shows an example of a power control for multiplexing uplink data with different transmission durations. FIG. 24B shows an example of DCI signaling for multiplexing uplink data with different transmission durations. The TPC command of the first DCI 2060 may be set to a predefined value. The predefined value may indicate a suspending or stopping of an ongoing uplink transmission.

A first value (e.g., zero) of a TPC command field of the first DCI 2060 may indicate a power reduction of a first value (e.g., a 3 dB power reduction), for example, if the TPC command of the first DCI 2060 is a 1-bit value. A second value (e.g., one) of the TPC command field of the first DCI 2060 may indicate that one or more wireless devices stop or suspend an ongoing uplink transmission on at least one of the multiple uplink radio resources 2071, for example, based on the one or more preemption indicators of the first DCI 2060. A TPC command of the first DCI 2060 may have a 2-bit value or an m-bit value having more than 2 bits. A third value (e.g., "00" or "11") of a TPC command field of the first DCI 2060 may indicate that one or more wireless devices stop or suspend an ongoing uplink transmission on at least one of the multiple uplink radio resources 2071, for example, based on the one or more preemption indicators of the first DCI 2060.

The first PUSCH resource 2031 may comprise at least one of the multiple uplink radio resources 2071, which may be preempted by the first DCI 2060. The wireless device 2021 may stop or suspend the first uplink data transmission, for example, if the TPC command is set to the predefined value. The wireless device 2021 may stop or suspend transmitting the first uplink data. The wireless device 2021 may stop the transmission from the beginning of the second slot or the second symbol duration.

The first PUSCH resource 2031 may comprise at least one of the multiple uplink radio resources 2071, which is not preempted by the first DCI 2060. The wireless device 2021 may continue the first uplink data transmission without stopping or suspending the transmission (e.g., the TPC command for stopping or suspending the uplink transmission may not be used for non-preempted resources).

The second PUSCH resource 2032 may comprise at least one of the multiple uplink radio resources 2071, which is preempted by the first DCI 2060. The wireless device 2022 may stop or suspend the second uplink data transmission, for example, if the TPC command is set to the predefined value. The wireless device 2022 may stop or suspend transmitting the second uplink data. The wireless device 2022 may stop the transmission from the beginning of the second slot or the second symbol duration.

The second PUSCH resource 2032 may comprise at least one of the multiple uplink radio resources 2071, which is not preempted by the first DCI 2060. The wireless device 2022 may continue the second uplink data transmission without stopping or suspending the transmission (e.g., the TPC command for stopping or suspending the uplink transmission may not be used for non-preempted resources).

A base station may indicate a power control value (e.g., a power value for reducing power or stopping or suspending a transmission for one or more preempted resources) via higher layer signaling (e.g., an RRC message), for example, if the power control value to support multiplexing uplink data with different transmission durations is not dynamic (e.g., semi-static). The power reduction indication or the power stopping indication may be provided by one or more RRC messages.

A base station may send (e.g., transmit) at least one first message comprising parameters indicating at least one of: a first RNTI value, a DCI format, and/or at least one power reduction indication for a group of wireless devices (e.g., the wireless devices 2021 and 2022). The at least one first message may further comprise at least one of: a first control resource set, a first search space, a first monitoring periodicity, and/or at least a set of multiple uplink radio resources. Each of the multiple uplink radio resources may be identified by at least one of: a time resource, a frequency resource, a beam index, and/or an orthogonal code index. An indication of the at least one power reduction may be set to a predefined value indicating stopping (or suspending) an ongoing uplink transmission. A value of at least one power reduction may indicate a power reduction value (e.g., in dB).

The base station may send (e.g., transmit) first DCI addressed to one or more wireless devices associated with a first RNTI. The first DCI may be sent, for example, via the first control resource set and/or the first search space of a PDCCH with the first monitoring periodicity in a first slot or a first symbol. The first DCI with the DCI format may comprise at least a preemption indicator comprising a number of bits (e.g., 7 or 14 bits). Each bit of the preemption indicator may be associated with one of the multiple uplink radio resources. The first bit of the preemption indicator may be associated with the first uplink radio resource of the multiple uplink radio resources, the second bit of the preemption indicator may be associated with the second uplink radio resource of the multiple uplink radio resources, and the Nth bit of the preemption indicator may be associated with the Nth uplink radio resource of the multiple uplink radio resources.

The preemption indicator in the first DCI may indicate whether or not one or more resources of the multiple uplink radio resources are preempted (e.g. or reserved). One of the multiple uplink radio resources associated with a bit of the preemption indicator may not be preempted, for example, if the bit of the preemption indicator is set to a first value (e.g., zero). One of the multiple uplink radio resources associated with a bit of the preemption indicator may be preempted, for example, if the bit of the preemption indicator is set to a second value (e.g., one). One or more wireless devices may determine an uplink radio resource being preempted as an uplink radio resource being assigned to other wireless devices.

One or more wireless devices may determine whether one or more resources of the multiple uplink radio resources are preempted or not, for example, based on the preemption indicator comprised in the first DCI. The one or more wireless devices may adjust a transmission power on first PUSCH resource(s), for example, based on an indication of the at least one power reduction and the preemption indicator.

The first PUSCH resource(s) may comprise at least one of the multiple uplink radio resources, which may be preempted by the first DCI. The one or more wireless devices may determine a power reduction, for example, based on the indication of the at least one power reduction. The one or more wireless devices may determine an adjusted transmission power, for example, based on the power reduction and a normal transmission power (e.g., the current transmission power before the transmission power adjustment). The one or more wireless devices may continue transmitting the first uplink data with the adjusted transmission power (e.g., in a second slot or in a second symbol duration). The one or more wireless devices may stop (or suspend) transmitting the first uplink data, for example, if the indication of the at least one power reduction indicates the stopping (or suspending) of the uplink transmission (e.g., in the second slot or in the second symbol duration).

The first PUSCH resource(s) may comprise at least one of the multiple uplink radio resources, which is not preempted by the first DCI. The one or more wireless devices may continue the first uplink data transmission without stopping or suspending the transmission (e.g., the indication of the at least one power reduction may not be used for non-preempted resources).

Figure 25:
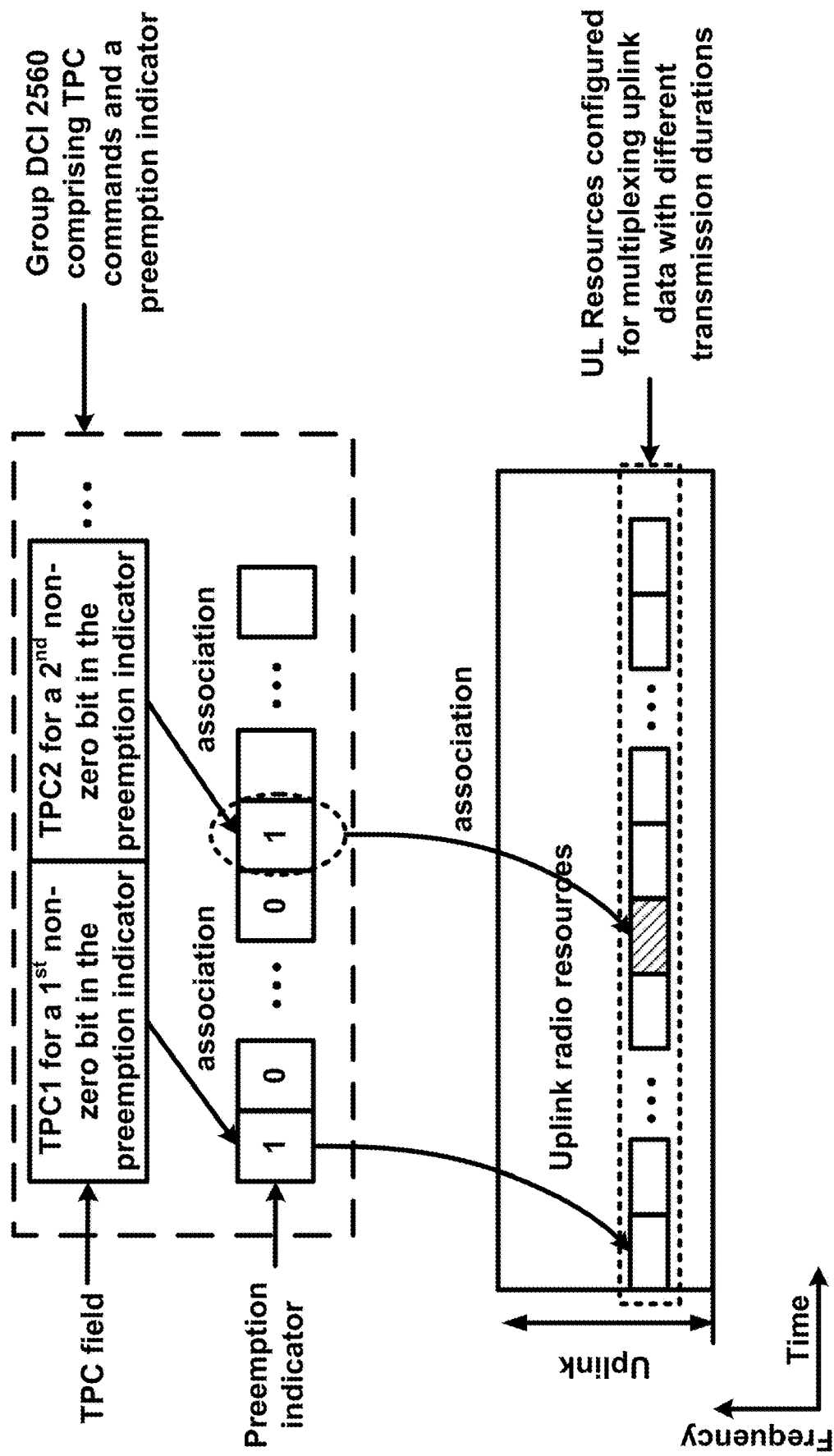
FIG. 25 shows an example of DCI signaling for multiplexing uplink data with different transmission durations.
Figure 26:
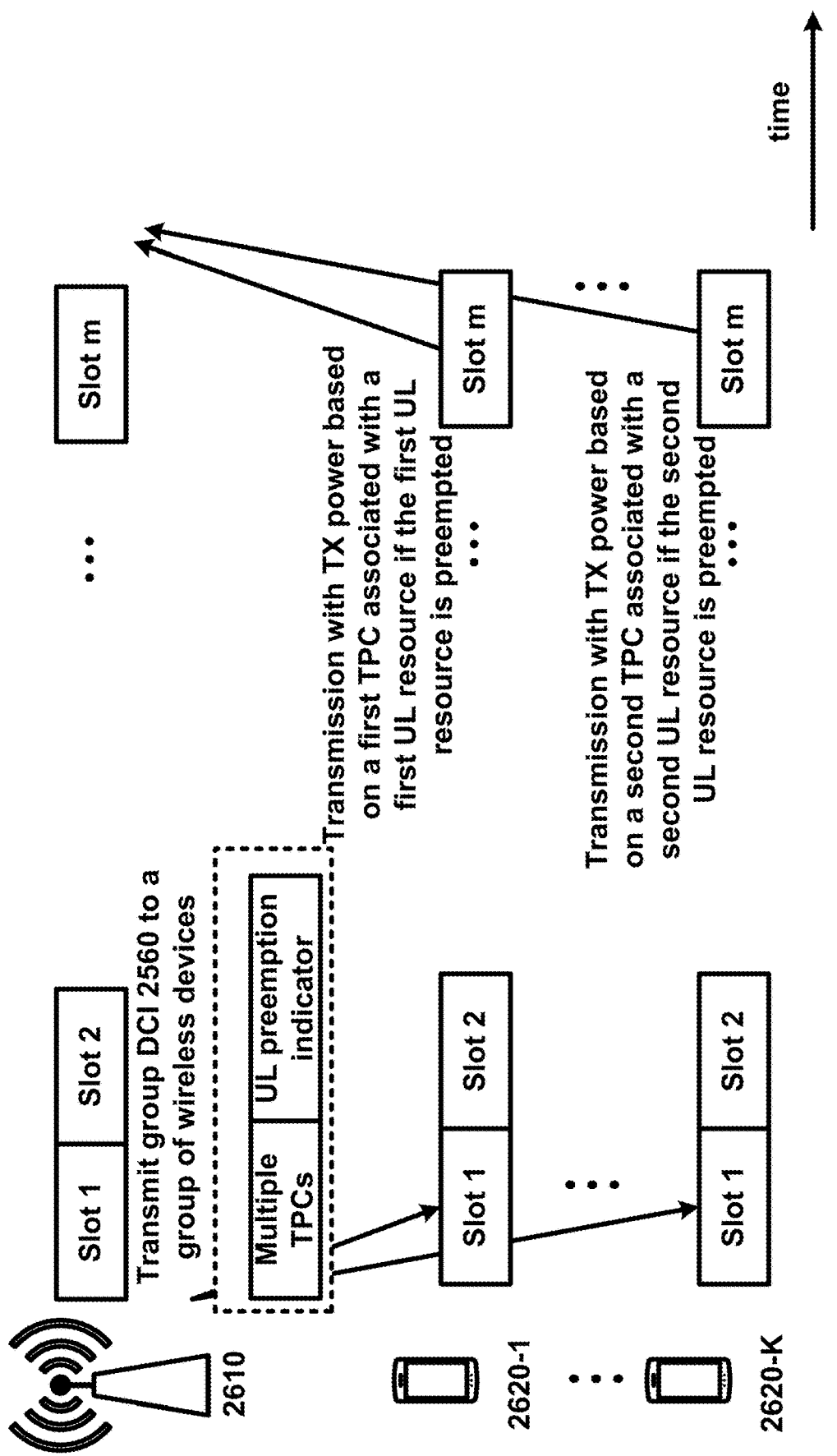
FIG. 26 shows an example of a power control for multiplexing uplink data with different transmission durations.

FIG. 25 shows an example of DCI signaling for multiplexing uplink data with different transmission durations. FIG. 26 shows an example of a power control for multiplexing uplink data with different transmission durations. A base station may indicate a first power reduction of a transmission on a first uplink radio resource, which may be different from a second power reduction of a transmission on a second radio uplink resource.

A base station 2610 (e.g., the base station 2010) may send, to a group of wireless devices 2620-1, 2620-2, ..., and 2620-K (e.g., the wireless devices 2021 and 2022), the first DCI 2060 (e.g., in slot 1). The first DCI 2060 (e.g., group DCI 2560) may comprise one or more TPC commands and/or a preemption indicator. A first one of the one or more TPC commands may be associated with a first one of multiple uplink radio resources, and the first one of multiple uplink radio resources may be preempted. There may be no TPC command associated with a second one of the multiple uplink radio resources, for example, if the second one of the multiple uplink radio resources is not preempted.

A wireless device may determine whether the multiple uplink radio resources are preempted or not, for example, based on the preemption indicator comprised in the first DCI 2060. The wireless device may adjust a transmission power on a first PUSCH, for example, based on the indication of the at least one power reduction and the preemption indicator.

The wireless device may determine a power reduction based on a TPC command associated with the at least one uplink radio resource, for example, if the first PUSCH resource comprises at least one of the multiple uplink radio resources, which may be preempted based on an indication by the first DCI 2060. The wireless device may determine an adjusted transmission power, for example, based on the power reduction and a current transmission power. The wireless device may continue transmitting the first uplink data with the adjusted transmission power in a second slot (e.g., slot m) or in a second symbol duration.

The wireless device may continue transmitting the first uplink data without applying a power reduction (e.g., indicated by any TPC command in the first DCI), for example, if the first PUSCH resource comprises at least one of the multiple uplink radio resources, which may not be preempted based on an indication in the first DCI.

Figure 27:
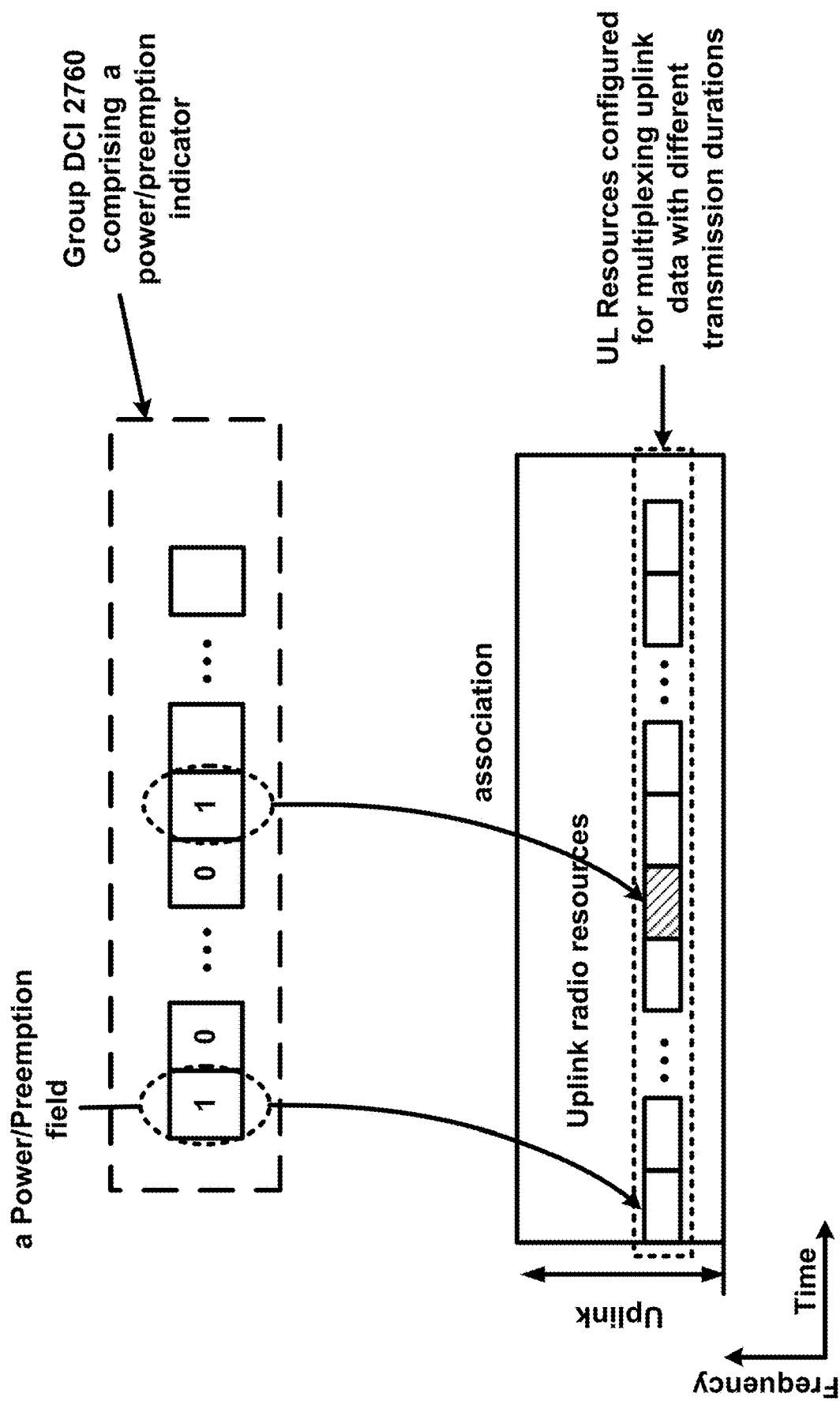
FIG. 27 shows an example of DCI signaling for multiplexing uplink data with different transmission durations.

FIG. 27 shows an example of signaling in which a preemption indication may be jointly indicated with a power control command. The first DCI 2060 (e.g., group DCI 2760) may comprise a power/preemption indicator. The power/preemption indicator may comprise multiple power/preemption fields. The power/preemption indicator may comprise any number of bits (e.g., 14 bits or any other number). Each power/preemption field may be one bit. Each power/preemption field may be associated with one of the multiple uplink radio resources. An uplink radio resource associated with the power/preemption field may not be preempted (or reserved), for example, if a power/preemption field of the power/preemption indicator is set to a first value (e.g., zero). An uplink radio resource associated with the power/preemption field may be preempted (or reserved), and/or a transmission power on an uplink transmission on the uplink radio resource may be reduced with a first value, for example, if a power/preemption field of the power/preemption indicator is set to a second value (e.g., one). The first value may be predefined (e.g., 3 dB, or 6 dB, 9 dB). The first value may be indicated in an RRC message.

The power/preemption indicator may comprise, for example, 28 bits (or any other number of bits). Each power/preemption field may be two bits. Each power/preemption field may be associated with one of the multiple uplink radio resources. An uplink radio resource associated with the power/preemption field may not be preempted (or reserved), for example, if a power/preemption field of the power/preemption indicator is set to a first value (e.g., "00"). An uplink radio resource associated with the power/preemption field may be preempted (or reserved), and a transmission power on an uplink transmission on the uplink radio resource may be reduced with a first value (e.g., 3 dB), for example, if a power/preemption field of the power/preemption indicator is set to a second value (e.g., "01"). An uplink radio resource associated with the power/preemption field may be preempted (or reserved), and a transmission power on an uplink transmission on the uplink radio resource may be reduced with a second value (e.g., 6 dB), for example, if a power/preemption field of the power/preemption indicator is set to a third value (e.g., "10"). An uplink radio resource associated with the power/preemption field may be preempted (or reserved), and a transmission power on an uplink transmission on the uplink radio resource may be reduced with a third value (e.g., 9 dB), for example, if a power/preemption field of the power/preemption indicator is set to a fourth value (e.g., "11"). The power/preemption indicator may have M times N bits. Each power/preemption field may be M bits. Each power/preemption field may be associated with one of N multiple uplink radio resources. Each power/preemption field may indicate a power/preemption indication on an uplink radio resource associated with the each power/preemption field.

First DCI may be sent (e.g., transmitted) using a DCI format that is the same as second DCI (e.g., DCI format 2_0, 2_1, 2_2, or 2_3), for example, if the first DCI comprises one power/preemption indicator. The first DCI may be addressed to wireless device(s) associated with a group common RNTI different from the second DCI (e.g., DCI format 2_0 with SFI-RNTI, or DCI format 2_1 with INT-RNTI, DCI 2-2 with TPC-PUCCH-RNTI or TPC-PUSCH-RNTI, DCI 2_3 with TPC-SRS-RNTI).

The first DCI may comprise multiple TPC commands and/or multiple preemption indicators, for example, if the first DCI is configured with multiple cells. The first DCI may comprise multiple power/preemption indicators, for example, if the first DCI is configured with multiple cells.

Figure 28:
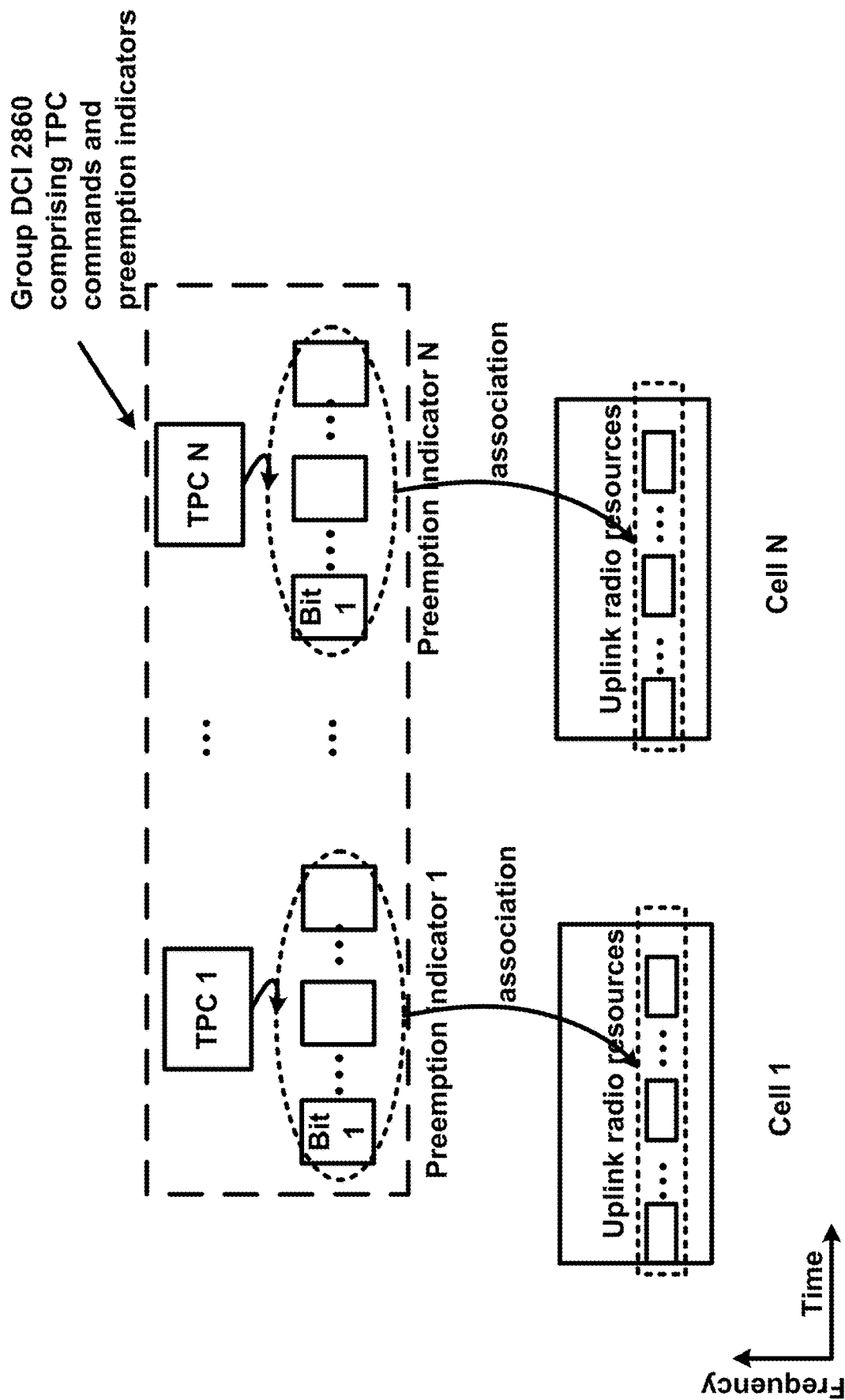
FIG. 28 shows an example of DCI signaling for multiplexing uplink data with different transmission durations in multiple cells.

FIG. 28 shows an example of signaling in which TPC commands may be associated with one of the multiple preemption indicators. Group DCI 2860 may comprise a plurality of TPC fields and a plurality of preemption indicators. A preemption indicator may be associated with one of the multiple cells (e.g., Cell 1, Cell 2, . . . , and Cell N). The association between a preemption indicator and a cell may be indicated in an RRC message. A first TPC command may be implicitly or explicitly associated with a first preemption indicator. A second TPC command may be implicitly or explicitly associated with a second preemption indicator. An Nth TPC command may be implicitly or explicitly associated with an Nth preemption indicator.

A wireless device may receive, from a base station, at least one uplink packet on a PUSCH in at least one uplink slot. The wireless device may monitor a PDCCH on at least a first part of at least one downlink slot, for example, for detecting DCI. The DCI may comprise at least one of: one power control command and/or one parameter indicating whether a second part of the at least one uplink slot is reserved (or preempted). The wireless device may determine a transmission power of the at least one uplink packet in the second part of the at least one uplink slot, for example, based on the one power control command. The wireless device may determine the transmission power of the at least one uplink packet in the second part of the at least one uplink slot, for example, based on or in response to detecting the DCI and the at least one parameter indicating the one second part of the at least one uplink slot is reserved (or preempted). The wireless device may send (e.g., transmit) the at least one uplink packet in the at least second part of the at least one uplink slot using the determined transmission power.

Figure 29:
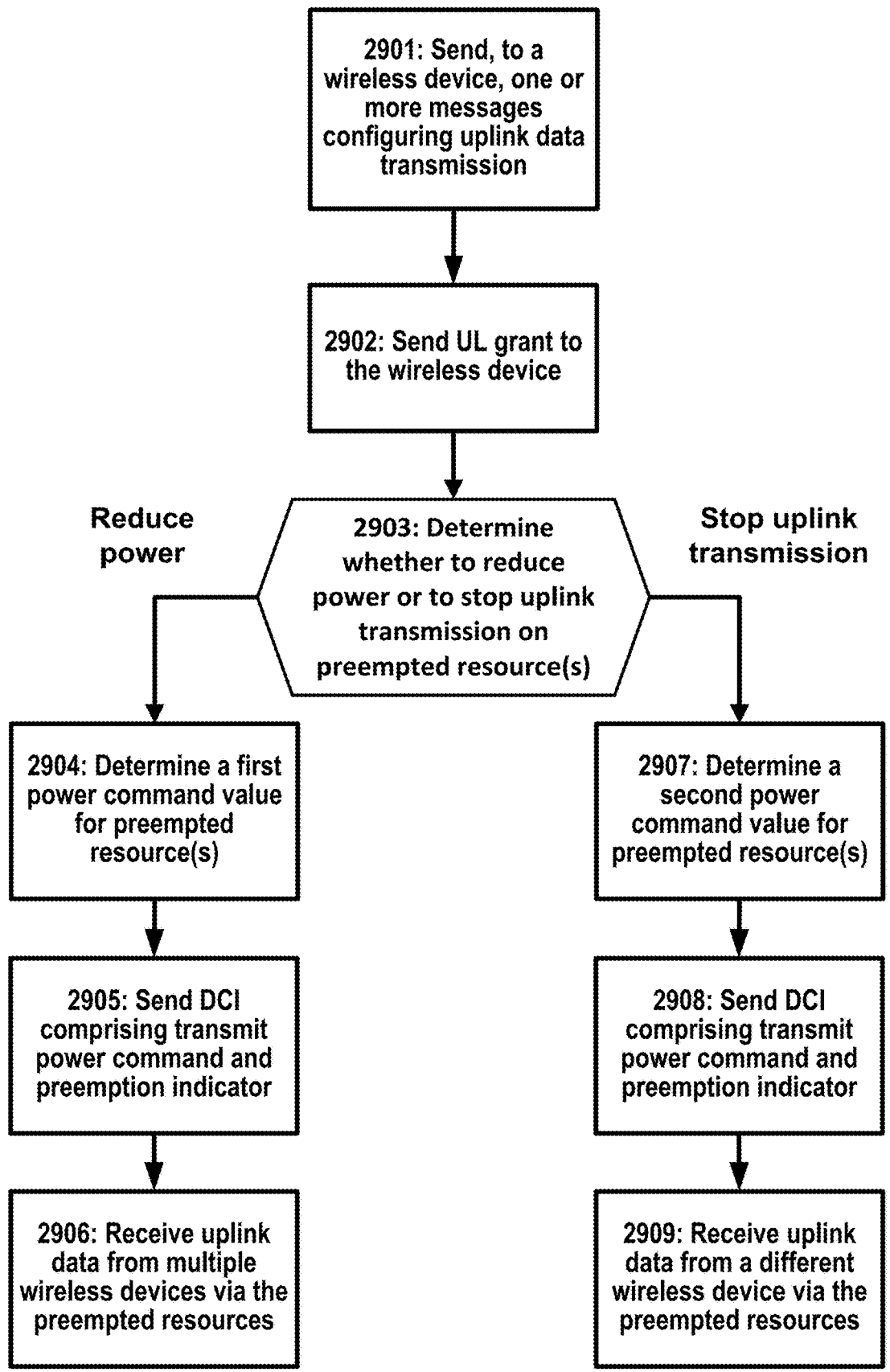
FIG. 29 shows an example method for a power control for multiplexing uplink data with different transmission durations.

FIG. 29 shows an example method for a power control for multiplexing uplink data with different transmission durations. One or more steps of FIG. 29 may be performed by a base station. At step 2901, the base station may establish an RRC connection with a first wireless device and may send, to the first wireless device, one or more messages (e.g., an RRC message) and/or one or more DCIs. The one or more messages may comprise configuration parameters for configuring a downlink transmission (e.g., a PDCCH transmission, a PDSCH transmission, etc.). The one or more messages and/or the one or more DCIs may comprise configuration parameters for configuring an uplink transmission (e.g., a PUCCH transmission, a PUSCH transmission, etc.). The first wireless device may receive configuration parameters comprising a first TPC command indicating a first transmission power adjustment of transmitting uplink data (e.g., PUSCH). At step 2902, the base station may send an uplink grant to the first wireless device. The base station may schedule and assign a plurality of uplink radio resources (e.g., the first PUSCH resource 2031, the second PUSCH resource 2032, etc.) for the first wireless device for an uplink data transmission. The first wireless device may begin to send a first portion of uplink data with a transmission power, for example, based on the uplink grant and the first TPC command. The base station may assign, to a second wireless device, at least one resource of the plurality of uplink radio resources, and may preempt the at least one resource. At step 2903, the base station may determine whether to reduce power or to stop an uplink transmission, of the first wireless device, on the preempted resource(s). The base station may determine, based on a capability of the base station and/or the first wireless device, whether to reduce power or to stop an uplink transmission on the preempted resource(s).

At step 2094, the base station may determine a first TPC value for one or more preempted resources, for example, if the base station determines to reduce a transmission power of the first wireless device for the one or more preempted resources. At step 2905, the base station may send, to the first wireless device, DCI comprising a TPC field and a preemption indicator field. The TPC field may indicate the first TPC value indicating the reduction of the transmission power of the first wireless device. At step 2906, the base station may receive, via the one or more preempted resources, uplink data from multiple wireless devices. The multiple wireless devices may comprise the first wireless device and the second wireless device. For the uplink transmissions via the one or more preempted resources, the second wireless device may set a transmission power greater than a transmission power of the first wireless device (e.g., based on configuration parameters for the second wireless device). The first wireless device may reduce a transmission power while the first wireless device sends a second portion of the uplink data via the one or more preempted resources. The first wireless device may increase (e.g., restore or recover) the transmission power, for example, if the first wireless device sends a third portion of the uplink data via one or more non-preempted resources. The first wireless device (e.g., the wireless device 2022) may send, via a first non-preempted portion of the second PUSCH resource 2032, the first portion of the uplink data. The first wireless device may send, via the one or more preempted resources (e.g., preempted resources 2033 in the multiple uplink radio resources 2071), the second portion of the uplink data with a reduced power. The first wireless device may send, via a second non-preempted portion of the second PUSCH resource 2032, the third portion of the uplink data with an increased (e.g., restored) power. The first non-preempted portion of the second PUSCH resource 2032 may precede in time the one or more preempted resources. The one or more preempted resources may precede in time the second non-preempted portion of the second PUSCH resource 2032.

At step 2907, the base station may determine a second TPC value for one or more preempted resources, for example, if the base station determines to stop an uplink transmission of the first wireless device for the one or more preempted resources. The second TPC value may be set to a predefined value. At step 2908, the base station may send, to the first wireless device, DCI comprising a TPC field and a preemption indicator field. The TPC field may indicate the second TPC value indicating stopping of an uplink transmission of the first wireless device. At step 2909, the base station may receive, via the one or more preempted resources, uplink data from the second wireless device but not from the first wireless device. The first wireless device may stop an uplink transmission while the second wireless device sends uplink data via the one or more preempted resources. The first wireless device may resume an uplink transmission by transmitting a second portion of the uplink data, for example, if the first wireless device sends the second portion of the uplink data via one or more non-preempted resources. The first wireless device (e.g., the wireless device 2022) may send, via a first non-preempted portion of the second PUSCH resource 2032, the first portion of the uplink data. The first wireless device may stop an uplink transmission on the one or more preempted resources (e.g., preempted resources 2033 in the multiple uplink radio resources 2071). The first wireless device may send, via a second non-preempted portion of the second PUSCH resource 2032, the second portion of the uplink data. The first non-preempted portion of the second PUSCH resource 2032 may precede in time the one or more pre-empted resources. The one or more preempted resources may precede in time the second non-preempted portion of the second PUSCH resource 2032.

A single DCI may comprise a first TPC field indicating reducing of a transmission power for a first preempted resource and comprise a second TPC field indicating stopping of an uplink transmission for a second preempted resource. The first TPC field may be associated with a first UL preemption indicator that indicates the first preempted resource. The second TPC field may be associated with a second UL preemption indicator that indicates the second preempted resource. The single DCI may have a format of the DCI 2560 shown in FIG. 26, a format of the DCI 2760 shown in FIG. 27, or other formats.

Figure 30:
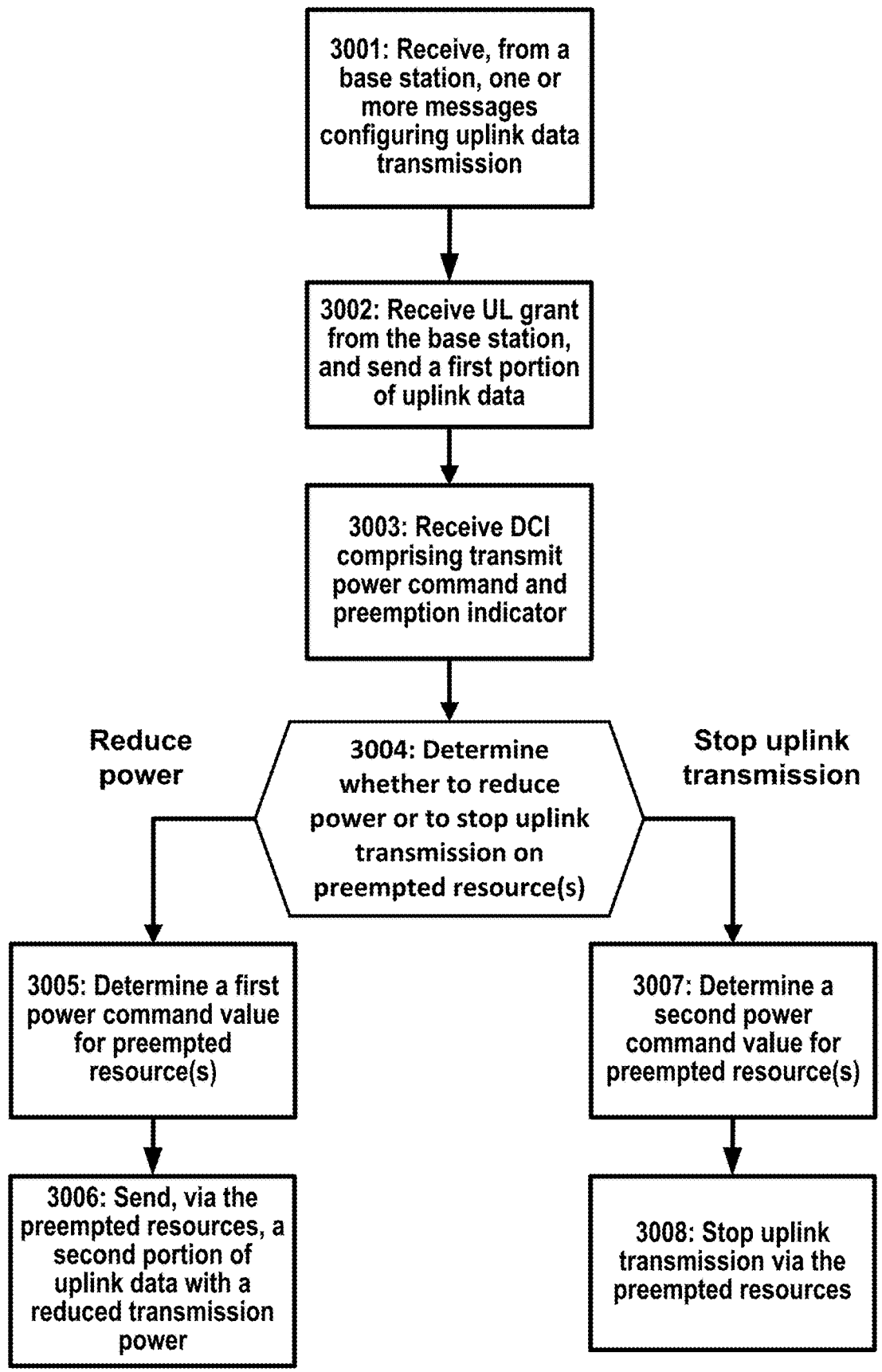
FIG. 30 shows an example method for a power control for multiplexing uplink data with different transmission durations.

FIG. 30 shows an example method for a power control for multiplexing uplink data with different transmission durations. One or more steps of FIG. 30 may be performed by a first wireless device. At step 3001, the first wireless device may establish an RRC connection with a base station and may receive, from the base station, one or more messages (e.g., an RRC message) and/or one or more DCIs. The one or more messages may comprise configuration parameters for configuring a downlink transmission (e.g., a PDCCH transmission, a PDSCH transmission, etc.). The one or more messages and/or the one or more DCIs may comprise configuration parameters for configuring an uplink transmission (e.g., a PUCCH transmission, a PUSCH transmission, etc.). The first wireless device may receive configuration parameters comprising a first TPC command indicating a first transmission power adjustment of transmitting uplink data (e.g., PUSCH). At step 3002, the first wireless device may receive an uplink grant from the base station. The base station may schedule and assign a plurality of uplink radio resources (e.g., the first PUSCH resource 2031, the second PUSCH resource 2032, etc.) for the first wireless device for an uplink data transmission. At step 3002, the first wireless device may begin to send a first portion of uplink data, for example, based on the uplink grant and the first TPC command. The base station may determine to assign, to a second wireless device, at least one resource of the plurality of uplink radio resources, and may determine to preempt the at least one resource. At step 3003, the first wireless device may receive DCI comprising a second TPC field and a preemption indicator field. At step 3004, the first wireless device may determine, based on a value of the second TPC field, whether to reduce power or to stop an uplink transmission on one or more preempted resources. The preemption indicator field may be associated with the second TPC field and may indicate the one or more preempted resources.

At step 3005, the first wireless device may determine that the second TPC field indicates a first TPC value for one or more preempted resources. The first TPC value may indicate the reduction of the transmission power of the first wireless device. At step 3006, the first wireless device may send, via the one or more preempted resources, a second portion of the uplink data. The first wireless device may reduce a transmission power while the first wireless device sends the second portion of the uplink data via the one or more preempted resources. The first wireless device may increase (e.g., restore or recover) the transmission power, for example, if the first wireless device sends a third portion of the uplink data via one or more non-preempted resources.

At step 3007, the first wireless device may determine that the second TPC field indicates a second TPC value for one or more preempted resources (e.g., the second TPC value may be set to a predefined value). The second TPC value may indicate the stopping of the uplink transmission of the first wireless device. At step 3008, the first wireless device may stop an uplink transmission via the one or more preempted resources. The first wireless device may stop the uplink transmission while a second wireless device sends uplink data via the one or more preempted resources. The first wireless device may resume an uplink transmission by transmitting a second portion of the uplink data, for example, if the first wireless device sends the second portion of the uplink data via one or more non-preempted resources.

A base station may send, to a wireless device, one or more messages comprising configuration parameters indicating uplink radio resources for the wireless device. The base station may send, to the wireless device, a first DCI. The first DCI may comprise a first power control command associated with one or more preempted resources and comprise an uplink preemption indicator indicating that at least one resource of the uplink radio resources is preempted. The wireless device may determine, based on the first power control command and the uplink preemption indicator, an adjusted transmission power associated with transmission, via the at least one resource, of a first portion of uplink data (e.g., one or more uplink data packets). The wireless device may transmit, based on the adjusted transmission power and via the at least one resource, the first portion of the uplink data. The wireless device may determine, based on the uplink preemption indicator and based on a value of the first power control command, whether to reduce a transmission power to the adjusted transmission power or to stop transmission of the first portion of the uplink data. The wireless device may transmit the first portion of the uplink data further based on the determining. The wireless device may monitor a first downlink control channel for the first DCI. The uplink preemption indicator may comprise a value of one bit or multiple bits. The configuration parameters may indicate at least second radio resources. The uplink radio resources may comprise a first number of frequency resources and a second number of time resources. The wireless device may determine, based on the first power control command and the uplink preemption indicator, a power value for reducing the transmission power. The wireless device may receive a second DCI indicating a second transmission power value. The wireless device may subtract, from a second transmission power value, the power value to determine the reduced transmission power. The second transmission power value may be comprised in second DCI. The wireless device may receive the second DCI during a first time interval that is a number of time interval before the wireless device receives the first DCI. The wireless device may determine, based on the second transmission power value, a second transmission power associated with transmission, via a second resource of the uplink radio resources, of a second portion of the uplink data. The second resource may not be preempted by the uplink preemption indicator. The wireless device may adjust the transmission power by determining, based on the first power control command, a power reduction value and determining, based on the second transmission power value and the power reduction value, the adjusted transmission power. The uplink preemption indicator may comprise a plurality of preemption indicator values each associated with a different uplink radio resource of the uplink radio resources. The wireless device may determine that one or more values of the plurality of preemption indicator values is set to a first value indicating preemption of a corresponding radio resource. The wireless device may identify, based on a location of the one or more values in the first DCI, one or more preempted uplink resources of the uplink radio resources. The first DCI may comprise at least one second preemption indicator. The at least one second preemption indicator may be associated with at least one second uplink radio resource. The at least one second preemption indicator may be associated with the at least one second uplink radio resource, for example, based on a location of the at least one second preemption indicator in the first DCI. The wireless device may determine, based on a second uplink preemption indicator of the first DCI, one or more second uplink radio resources are not preempted. The wireless device may determine, based on a second power control command, a second transmission power associated with transmission, via the one or more second uplink radio resources, of a second portion of the uplink data. The wireless device may transmit, via the one or more second uplink radio resources and based on the second transmission power, the second portion of the uplink data. The wireless device may receive, during a first time interval, a second DCI comprising the second power control command.

A base station may send, to a wireless device, one or more messages comprising configuration parameters. The base station may send, to the wireless device, first DCI indicating a first power control command and a plurality of uplink radio resources for the wireless device. The base station may send, to the wireless device, second DCI comprising a second power control command associated with one or more preempted resources and an uplink preemption indicator indicating that a first uplink radio resource of the plurality of uplink radio resources is not preempted. The wireless device may determine, based on the uplink preemption indicator indicating that the first uplink radio resource is not preempted, to transmit a portion of uplink data based on the first power control command. The wireless device may select the first power control command, for example, based on the uplink preemption indicator. The wireless device may transmit, via the first uplink radio resource and based on the first power control command, the portion of the uplink data. The uplink preemption indicator may indicate that a second uplink radio resource of the plurality of uplink radio resources is preempted. The wireless device may determine, based on the uplink preemption indicator and based on a value of the second power control command, whether to reduce a transmission power associated with transmission, via the second uplink radio resource, of a second portion of the uplink data or to stop transmission of the second portion of the uplink data. The wireless device may transmit, via the second uplink radio resource and based on a reduced transmission power, the second portion, or stop transmission, via the second uplink radio resource, of the second portion, for example, based on the determining. The wireless device may determine, based on the second power control command and the uplink preemption indicator, an adjusted transmission power associated with transmission, via the second uplink radio resource, of a second portion of the uplink data. The wireless device may transmit, based on the adjusted transmission power and via the second uplink radio resource, the second portion of the uplink data. A wireless device may transmit a first portion of uplink data. A bases station may send, to the wireless device, a DCI comprising one or more parameters indicating a power control associated with one or more resources. The wireless device may determine, based on the one or more parameters of the DCI, whether to reduce a transmission power associated with transmission, via a preempted resource, of a second portion of the uplink data or to stop transmission of the second portion of the uplink data. The wireless device may transmit, via the preempted resource and based on a reduced transmission power, the second portion, or stop transmission, via the preempted resource, of the second portion, for example, based on the determining. The one or more parameters of the DCI may comprise a power control command and an uplink preemption indicator. The wireless device may determine, based on the power control command and the uplink preemption indicator, the reduced transmission power. The wireless device may determine, based on the one or more parameters of the DCI, a non-preempted resource. The wireless device may transmit, via the non-preempted resource and based on a second power control command, a third portion of the uplink data. A predefined value of the one or more parameters indicates the stopping. The one or more parameters may comprise a first transmission power control field associated with a first cell and a second transmission power control field associated with a second cell. The one or more parameters may comprise a first uplink preemption indicator field associated with the first cell and associated with the first transmission power control field and a second uplink preemption indicator field associated with the second cell and associated with the second transmission power control field.

Figure 31:
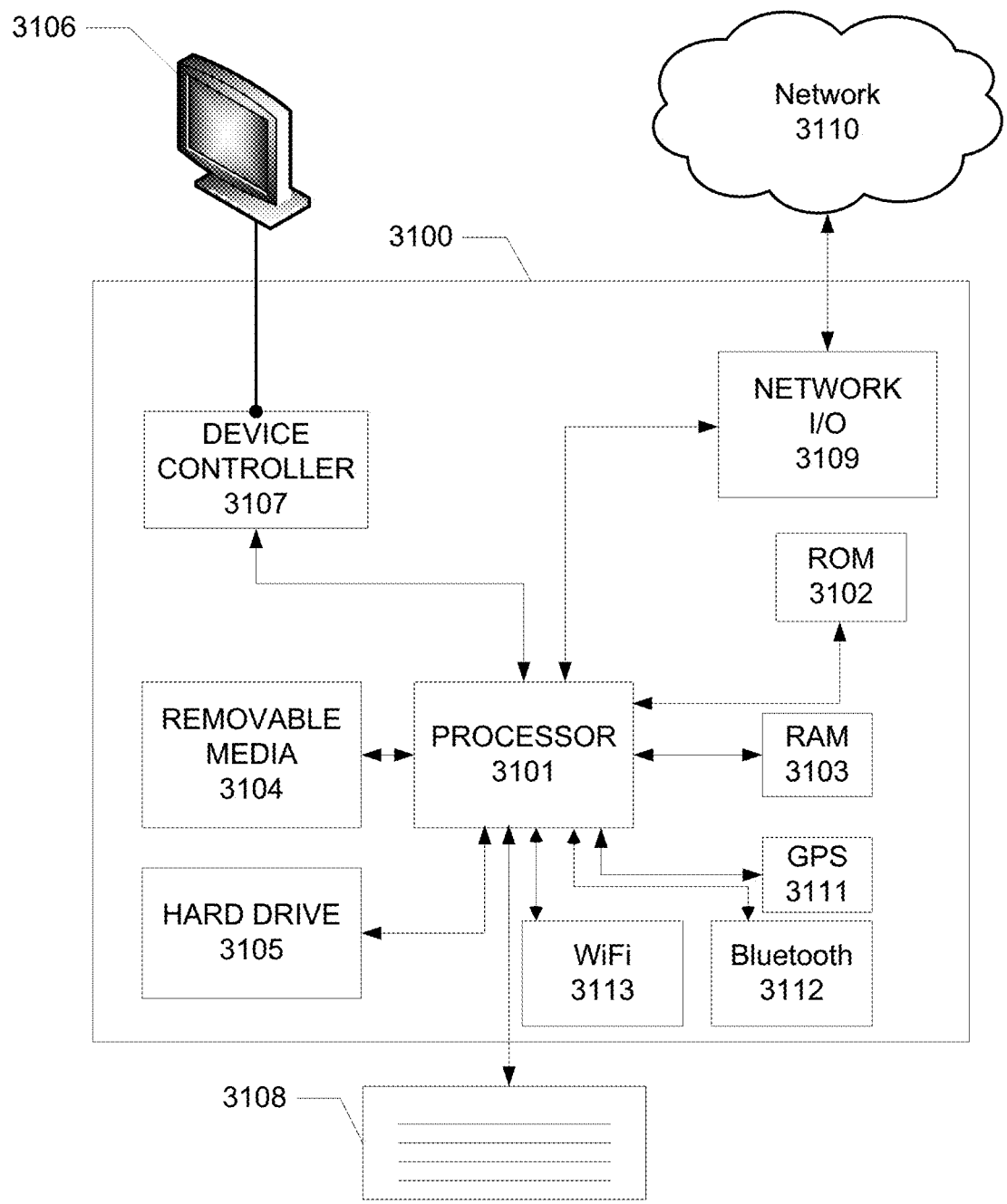
FIG. 31 shows example elements of a computing device that may be used to implement any of the various devices described herein.

FIG. 31 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3100 may include one or more processors 3101, which may execute instructions stored in the random access memory (RAM) 3103, the removable media 3104 (such as a Universal Serial Bus (USB) drive, compact disk (CD) or digital versatile disk (DVD), or floppy disk drive), or any other desired storage medium. Instructions may also be stored in an attached (or internal) hard drive 3105. The computing device 3100 may also include a security processor (not shown), which may execute instructions of one or more computer programs to monitor the processes executing on the processor 3101 and any process that requests access to any hardware and/or software components of the computing device 3100 (e.g., ROM 3102, RAM 3103, the removable media 3104, the hard drive 3105, the device controller 3107, a network interface 3109, a GPS 3111, a Bluetooth interface 3112, a WiFi interface 3113, etc.). The computing device 3100 may include one or more output devices, such as the display 3106 (e.g., a screen, a display device, a monitor, a television, etc.), and may include one or more output device controllers 3107, such as a video processor. There may also be one or more user input devices 3108, such as a remote control, keyboard, mouse, touch screen, microphone, etc. The computing device 3100 may also include one or more network interfaces, such as a network interface 3109, which may be a wired interface, a wireless interface, or a combination of the two. The network interface 3109 may provide an interface for the computing device 3100 to communicate with a network 3110 (e.g., a RAN, or any other network).

The network interface 3109 may include a modem (e.g., a cable modem), and the external network 3110 may include communication links, an external network, an in-home network, a provider's wireless, coaxial, fiber, or hybrid fiber/coaxial distribution system (e.g., a DOCSIS network), or any other desired network. Additionally, the computing device 3100 may include a location-detecting device, such as a global positioning system (GPS) microprocessor 3111, which may be configured to receive and process global positioning signals and determine, with possible assistance from an external server and antenna, a geographic position of the computing device 3100.

The example in FIG. 31 may be a hardware configuration, although the components shown may be implemented as software as well. Modifications may be made to add, remove, combine, divide, etc. components of the computing device 3100 as desired. Additionally, the components may be implemented using basic computing devices and components, and the same components (e.g., processor 3101, ROM storage 3102, display 3106, etc.) may be used to implement any of the other computing devices and components described herein. For example, the various components described herein may be implemented using computing devices having components such as a processor executing computer-executable instructions stored on a computer-readable medium, as shown in FIG. 31. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
  receiving, by a wireless device, downlink control information (DCI) comprising:
    a plurality of uplink preemption indicators indicating uplink resources that are preempted; and
    a plurality of power control commands associated with the uplink resources;
  determining, based on a first power control command of the plurality of power control commands and a first uplink preemption indicator of the plurality of uplink preemption indicators, an adjusted transmission power associated with transmission, via at least one first resource of the uplink resources, of a first portion of uplink data;
  transmitting, using the adjusted transmission power and via the at least one first resource, the first portion of the uplink data; and
  dropping, based on a second power control command of the plurality of power control commands and a second uplink preemption indicator of the plurality of uplink preemption indicators, a scheduled transmission, of a second portion of the uplink data, associated with at least one second resource of the uplink resources.

2. The method of claim 1, further comprising:
  determining, based on the first uplink preemption indicator and based on a value of the first power control command, whether to reduce a transmission power to the adjusted transmission power or to drop a scheduled transmission of the first portion of the uplink data,
  wherein the transmitting the first portion of the uplink data is further based on the determining whether to reduce the transmission power to the adjusted transmission power or to drop the scheduled transmission of the first portion.

3. The method of claim 1, further comprising:
  determining, based on the first power control command and the first uplink preemption indicator, a power value for reducing a transmission power.

4. The method of claim 1, further comprising:
  receiving second DCI indicating a transmission power value; and
  determining, based on the transmission power value, a second transmission power associated with transmission, via a third resource of third uplink resources, of a third portion of the uplink data, wherein the third resource is not preempted.

5. The method of claim 4, wherein the determining the adjusted transmission power comprises:
  determining, based on the first power control command, a power reduction value; and
  determining, based on the transmission power value and the power reduction value, the adjusted transmission power.

6. The method of claim 1, wherein the first uplink preemption indicator comprises a plurality of preemption indicator values each associated with a different uplink resource of the uplink resources.

7. The method of claim 6, further comprising:
  determining that one or more values of the plurality of preemption indicator values is set to a first value indicating preemption of a corresponding uplink resource; and
  determining, based on a location of the one or more values in the DCI, the at least one first resource.

8. The method of claim 1, further comprising:
  determining, based on a third uplink preemption indicator of the DCI, that one or more third uplink resources are not preempted;
  determining, based on a third power control command, a second transmission power associated with transmission, via the one or more third uplink resources, of a third portion of the uplink data; and
  transmitting, via the one or more third uplink resources and using the second transmission power, the third portion of the uplink data.

9. The method of claim 8, further comprising receiving, during a first time interval, second DCI comprising the third power control command.

10. The method of claim 1, further comprising:
  transmitting, prior to receiving the first DCI, a second third portion of the uplink data.

11. A method comprising:
  receiving, by a wireless device, first downlink control information (DCI) indicating:
    a first power control command; and
    a plurality of uplink radio resources for the wireless device;
  receiving second DCI comprising:
    a second power control command associated with one or more preempted resources; and
    an uplink preemption indicator, associated with the one or more preempted resources, indicating a first uplink radio resource of the plurality of uplink radio resources that is not preempted;
  determining, based on the uplink preemption indicator indicating that the first uplink radio resource that is not preempted, a transmission power associated with the first power control command; and
  transmitting, via the first uplink radio resource and using the transmission power, a portion of uplink data.

12. The method of claim 11, wherein the uplink preemption indicator indicates a second uplink radio resource of the plurality of uplink radio resources that is preempted.

13. The method of claim 12, further comprising:
  determining, based on the uplink preemption indicator and based on a value of the second power control command, whether to reduce a second transmission power associated with transmission, via the second uplink radio resource, of a second portion of the uplink data or to drop a scheduled transmission of the second portion of the uplink data; and
  based on the determining whether to reduce the second transmission power or to drop the scheduled transmission of the second portion:

transmitting, via the second uplink radio resource and based on using a reduced transmission power, the second portion, or dropping the scheduled transmission of the second portion.

14. The method of claim 12, further comprising:

determining, based on the second power control command and the uplink preemption indicator, an adjusted transmission power associated with transmission, via the second uplink radio resource, of a second portion of the uplink data; and transmitting, using the adjusted transmission power and via the second uplink radio resource, the second portion of the uplink data.

15. The method of claim 11, wherein the second power control command comprises:

a first transmission power control field associated with a first cell; and a second transmission power control field associated with a second cell.

16. A method comprising:

receiving, by a wireless device, downlink control information (DCI) comprising:

a plurality of uplink preemption indicators indicating first uplink resources that are preempted; and a plurality of power control commands associated with the plurality of uplink preemption indicators;

determining, based on the plurality of uplink preemption indicators and based on the plurality of power control commands, whether to reduce transmission powers to adjusted transmission powers, wherein each of the adjusted transmission powers is associated with transmission via a different uplink resource of the first uplink resources; and transmitting, using the adjusted transmission powers and via the first uplink resources, uplink data.

17. The method of claim 16, further comprising:

determining, based on a first power control command of the plurality of power control commands and a first uplink preemption indicator of the plurality of uplink preemption indicators, a first adjusted transmission power of the adjusted transmission powers; and determining, based on a second power control command of the plurality of power control commands and a second uplink preemption indicator of the plurality of uplink preemption indicators, a second adjusted transmission power of the adjusted transmission powers, wherein the first uplink preemption indicator is associated with at least one first resource of the first uplink resources, and wherein the second uplink preemption indicator is associated with at least one second resource of the first uplink resources.

18. The method of claim 16, further comprising:

determining, based on a first power control command of the plurality of power control commands and a first uplink preemption indicator of the plurality of uplink preemption indicators, a power value for reducing a first transmission power of the transmission powers.

19. The method of claim 16, wherein a first uplink preemption indicator of the plurality of uplink preemption indicators comprises a plurality of preemption indicator values each associated with a different uplink radio resource of the first uplink resources.

20. The method of claim 16, further comprising:

determining, based on an uplink preemption indicator of the DCI, that one or more second uplink resources that are not preempted;

determining, based on a power control command of second DCI, a transmission power associated with transmission, via the one or more second uplink resources, of second uplink data; and transmitting, via the one or more second uplink resources and using the transmission power, the second portion of the uplink data.

21. The method of claim 16, further comprising:

determining, based on an uplink preemption indicator of the DCI and a power control command of the DCI, to drop a scheduled transmission of second uplink data.

* * * * *